(12) United States Patent
Bruce

(10) Patent No.: US 11,158,031 B1
(45) Date of Patent: Oct. 26, 2021

(54) SYSTEMS, METHODS, AND DEVICES FOR IMAGE PROCESSING

(71) Applicant: ReportsNow, Inc., Greenwood Village, CO (US)

(72) Inventor: Christopher J. Bruce, Greenwood Village, CO (US)

(73) Assignee: ReportsNow, Inc., Greenwood Village, CO (US)

( * ) Notice: Subject to any disclaimer, the term of this patent is extended or adjusted under 35 U.S.C. 154(b) by 0 days.

(21) Appl. No.: 17/329,011

(22) Filed: May 24, 2021

(51) Int. Cl.
  *G06T 5/00* (2006.01)
(52) U.S. Cl.
  CPC .............. *G06T 5/002* (2013.01); *G06T 5/006* (2013.01); *G06T 2207/20192* (2013.01)
(58) Field of Classification Search
  None
  See application file for complete search history.

(56) References Cited

U.S. PATENT DOCUMENTS

| | | | |
|---|---|---|---|
| 5,490,246 A | 2/1996 | Brotsky et al. |
| 6,356,269 B1 | 3/2002 | Nakatsuka et al. |
| 6,400,842 B2 | 6/2002 | Fukuda |
| 7,142,697 B2 | 11/2006 | Huang et al. |
| 7,164,499 B1 | 1/2007 | Gupta |
| 7,181,081 B2 | 2/2007 | Sandrew |
| 7,447,353 B2 | 11/2008 | Diederichs et al. |
| 7,986,831 B2 | 7/2011 | Nielsen |
| 8,145,677 B2 | 3/2012 | Al-Shameri |
| 8,200,004 B2 | 6/2012 | Michelsson et al. |
| 8,374,383 B2 | 2/2013 | Long et al. |
| 8,666,430 B2 | 3/2014 | Wigren et al. |
| 8,694,515 B2 | 4/2014 | Takata et al. |
| 8,768,046 B2 | 7/2014 | Ernst et al. |
| 9,177,225 B1 | 11/2015 | Cordova-Diba et al. |
| 9,472,022 B2 | 10/2016 | Neumann et al. |
| 11,017,265 B1 | 5/2021 | Bruce |
| 2003/0001837 A1 | 1/2003 | Baumberg |
| 2004/0085313 A1 | 5/2004 | Moreton et al. |

(Continued)

OTHER PUBLICATIONS

U.S. Appl. No. 17/306,216, filed May 3, 2021, Bruce.

(Continued)

*Primary Examiner* — James A Thompson
(74) *Attorney, Agent, or Firm* — Jason H. Vick; Sheridan Ross, PC

(57) ABSTRACT

A device comprises processing circuitry to receive an input polygon comprised of a plurality of segments connected by a plurality of points, some of the plurality of segments extending in a first direction and remaining ones of the plurality of segments extending in a second direction perpendicular to the first direction. The processing circuitry performs a first set of operations on the input polygon to generate an intermediate polygon having a plurality of vertices, a number of the plurality of vertices being fewer than a number of the plurality of points. The processing circuitry performs a second set of operations on the intermediate polygon based on traits of the plurality of vertices to generate a final polygon with a contour that represents the input polygon, the contour including at least one section that extends in a third direction different than the first direction and the second direction.

23 Claims, 65 Drawing Sheets
(17 of 65 Drawing Sheet(s) Filed in Color)

(56) References Cited

U.S. PATENT DOCUMENTS

| | | | |
|---|---|---|---|
| 2005/0068333 A1 | 3/2005 | Nakahashi et al. | |
| 2005/0104893 A1 | 5/2005 | Kii et al. | |
| 2007/0139440 A1 | 6/2007 | Crow et al. | |
| 2008/0273034 A1 | 11/2008 | Fenney et al. | |
| 2010/0066739 A1 | 3/2010 | Ishibashi | |
| 2013/0100134 A1 | 4/2013 | Cervelli et al. | |
| 2015/0178584 A1 | 6/2015 | Aller | |
| 2017/0228867 A1* | 8/2017 | Baruch | G06K 9/00362 |
| 2018/0125443 A1* | 5/2018 | Takebe | A61B 6/5217 |
| 2019/0295297 A1 | 9/2019 | Mason | |
| 2021/0089808 A1* | 3/2021 | Yu | G06K 9/3216 |

OTHER PUBLICATIONS

International Search Report for International Application No. PCT/US2021/015499, dated Apr. 8, 2021.
Written Opinion for International Application No. PCT/US2021/015499, dated Apr. 8, 2021.
Office Action for U.S. Appl. No. 17/161,304, dated Mar. 17, 2021.
Notice of Allowance for U.S. Appl. No. 17/161,304, dated Mar. 30, 2021.
International Search Report for International Application No. PCT/US2021/033936, dated Sep. 10, 2021.
Written Opinion for International Application No. PCT/US2021/033936, dated Sep. 10, 2021.
Office Action for U.S. Appl. No. 17/306,216, dated Aug. 31, 2021.

\* cited by examiner

| Total Area | Symbol | Cluster | Polygon | Side | Edge points | Area (actual points) | Bounds |
|---|---|---|---|---|---|---|---|
| 53 pixels | 3 | 1 | 1 | Outer | 46 | 16 | 1,2 5x8 |
| | 9 | 2 | 2 | Outer | 36 | 18 | 11,2 5x8 |
| | | | 3 | Inner | 12 | | 12,3 3x3 |
| | 8 | 3 | 4 | Outer | 32 | 19 | 21,2 5x8 |
| | | | 5 | Inner | 10 | | 22,3 3x2 |
| | | | 6 | Inner | 12 | | 22,6 3x3 |

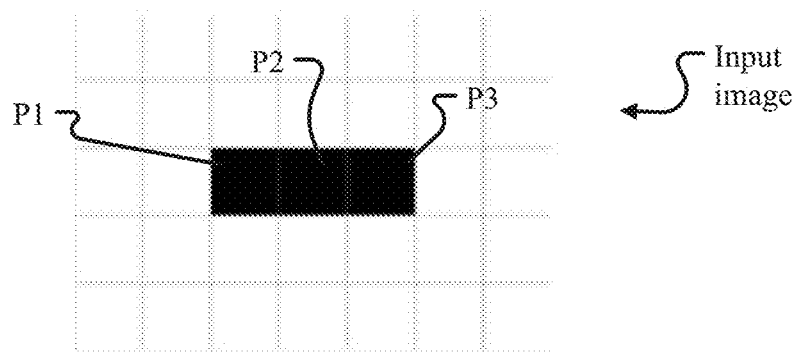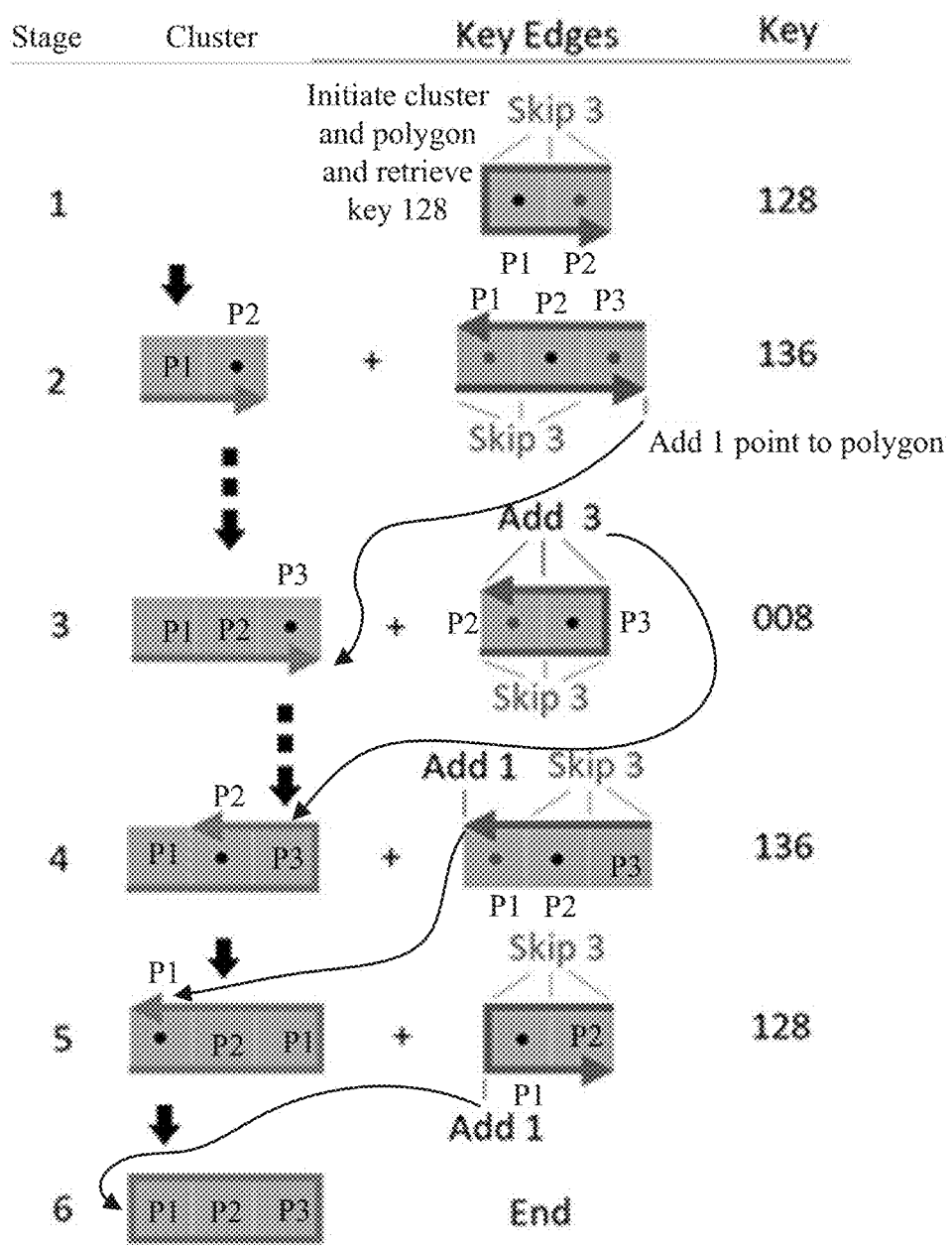
Fig. 6B

Key Sequence: 144, 25, 160, 19, 33, 34, 66, 100, 130, 76, 132, 136, 9, 145, 10, 49, 18, 34, 36, 70, 40, 196, 72, 136, 144

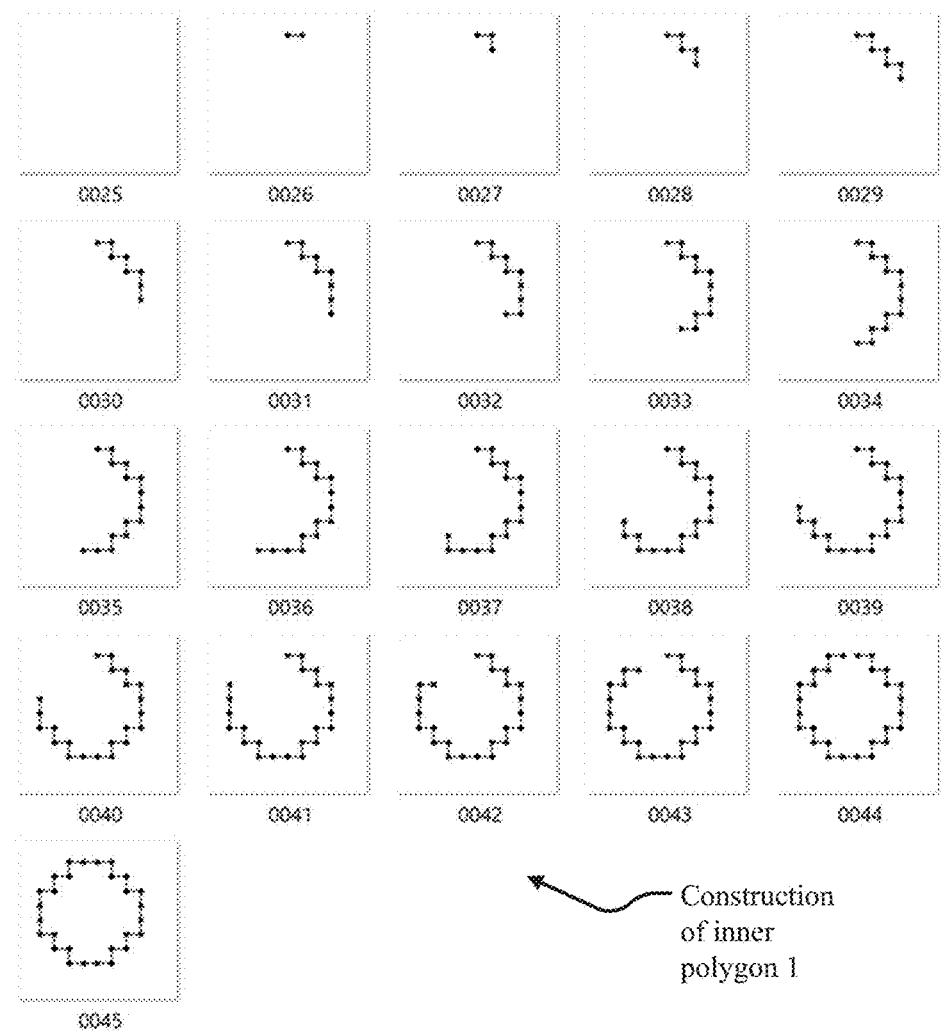
← Construction of inner polygon 1
Key sequence: 144, 136, 72, 196, 70, 36, 34, 18, 49, 145, 9, 136, 132, 76, 100, 66, 34, 33, 19, 25, 144
← Construction of inner polygon 4
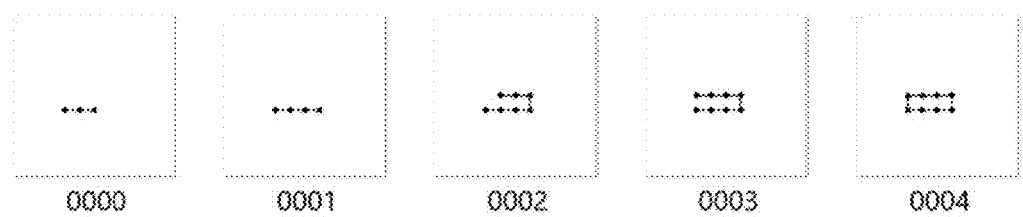
Key sequence: 128, 136, 8, 136, 128
*Fig. 7B*

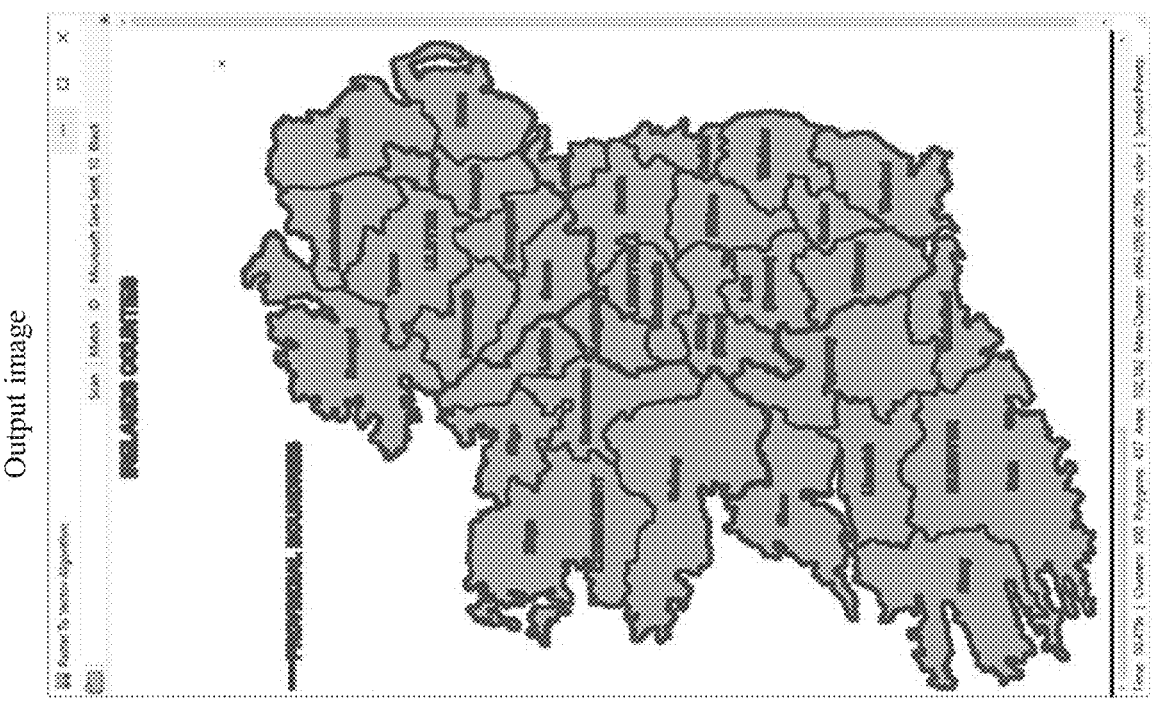
Fig. 10

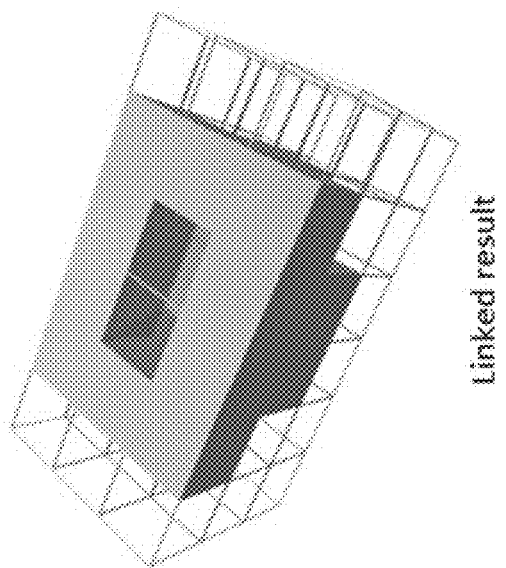
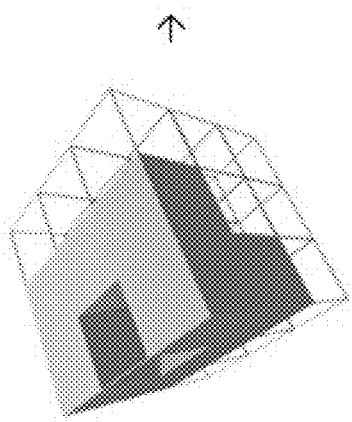
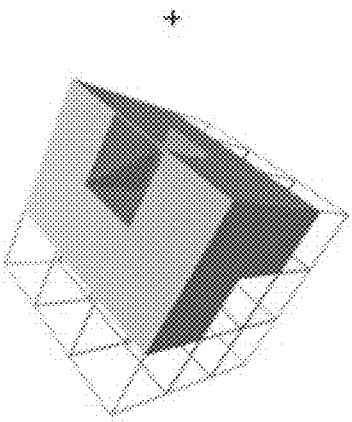
Fig. 12

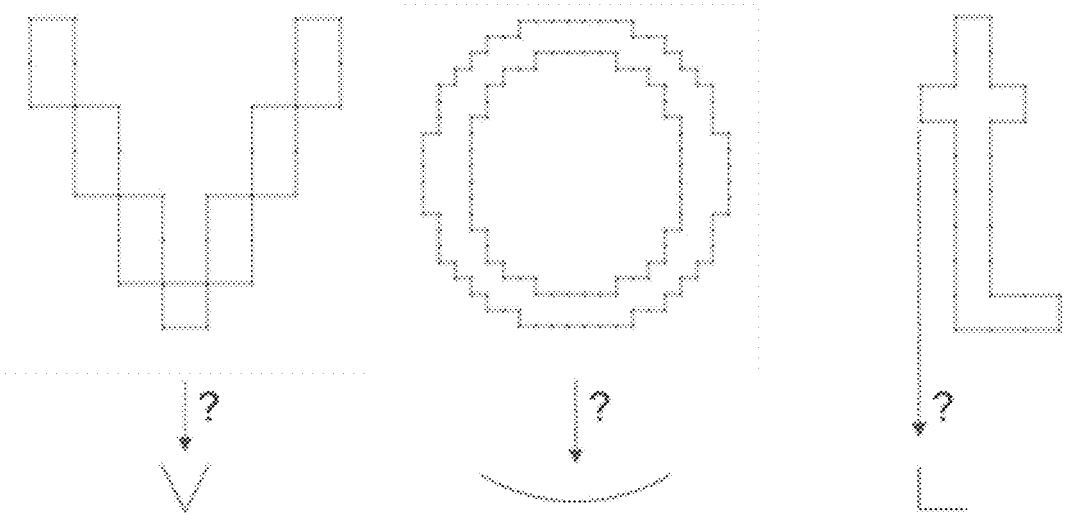
*Fig. 21*
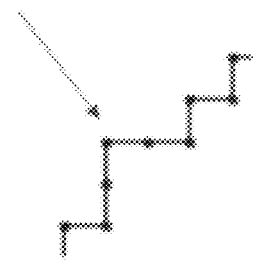
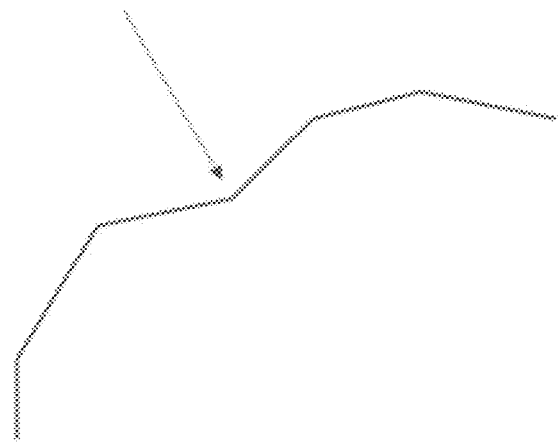
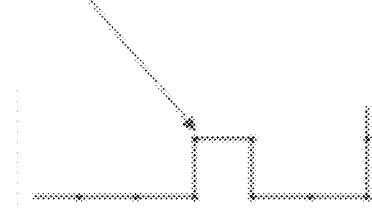
*Fig. 22*

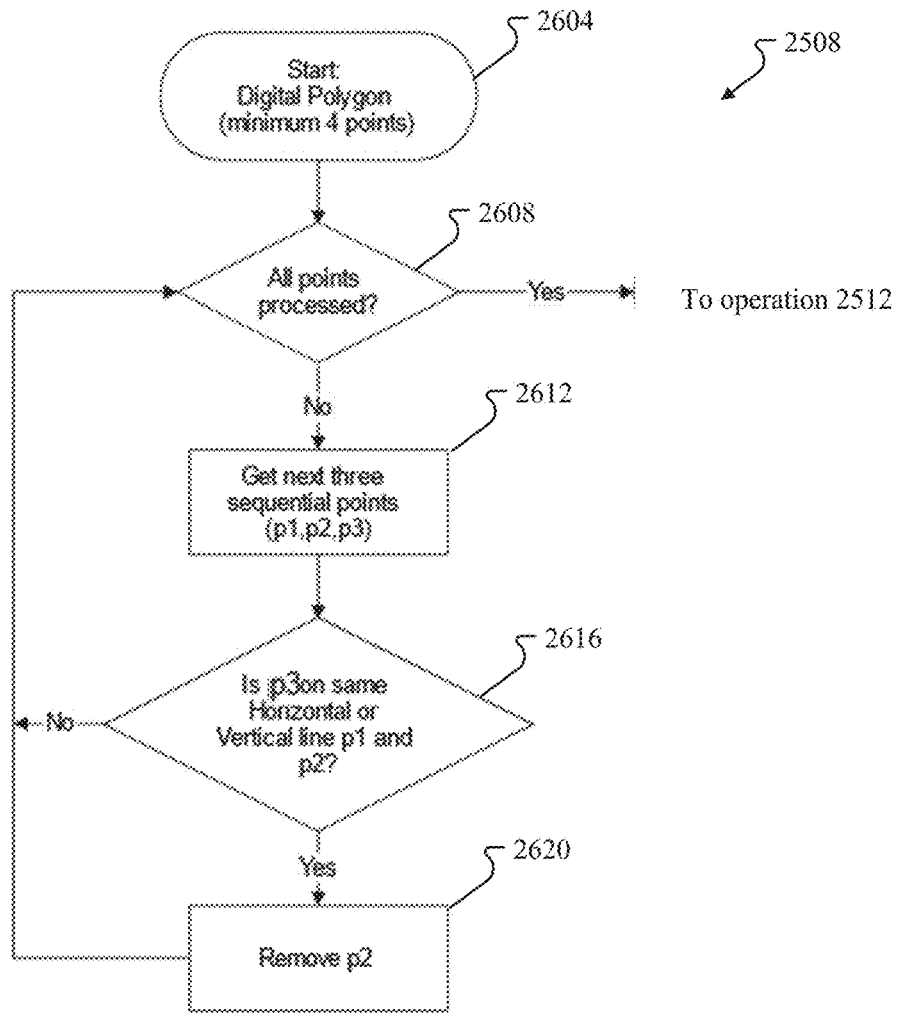
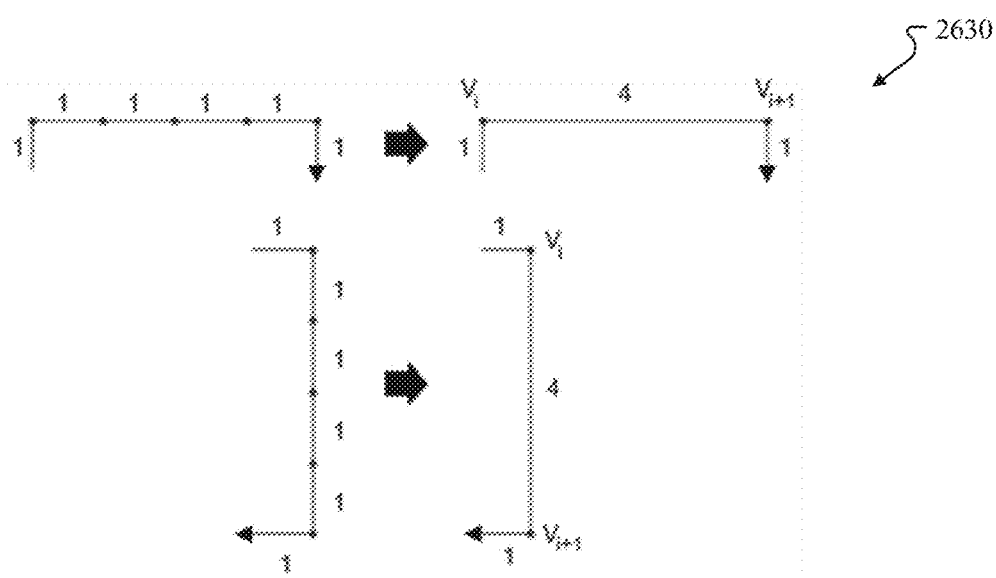
*Fig. 26*

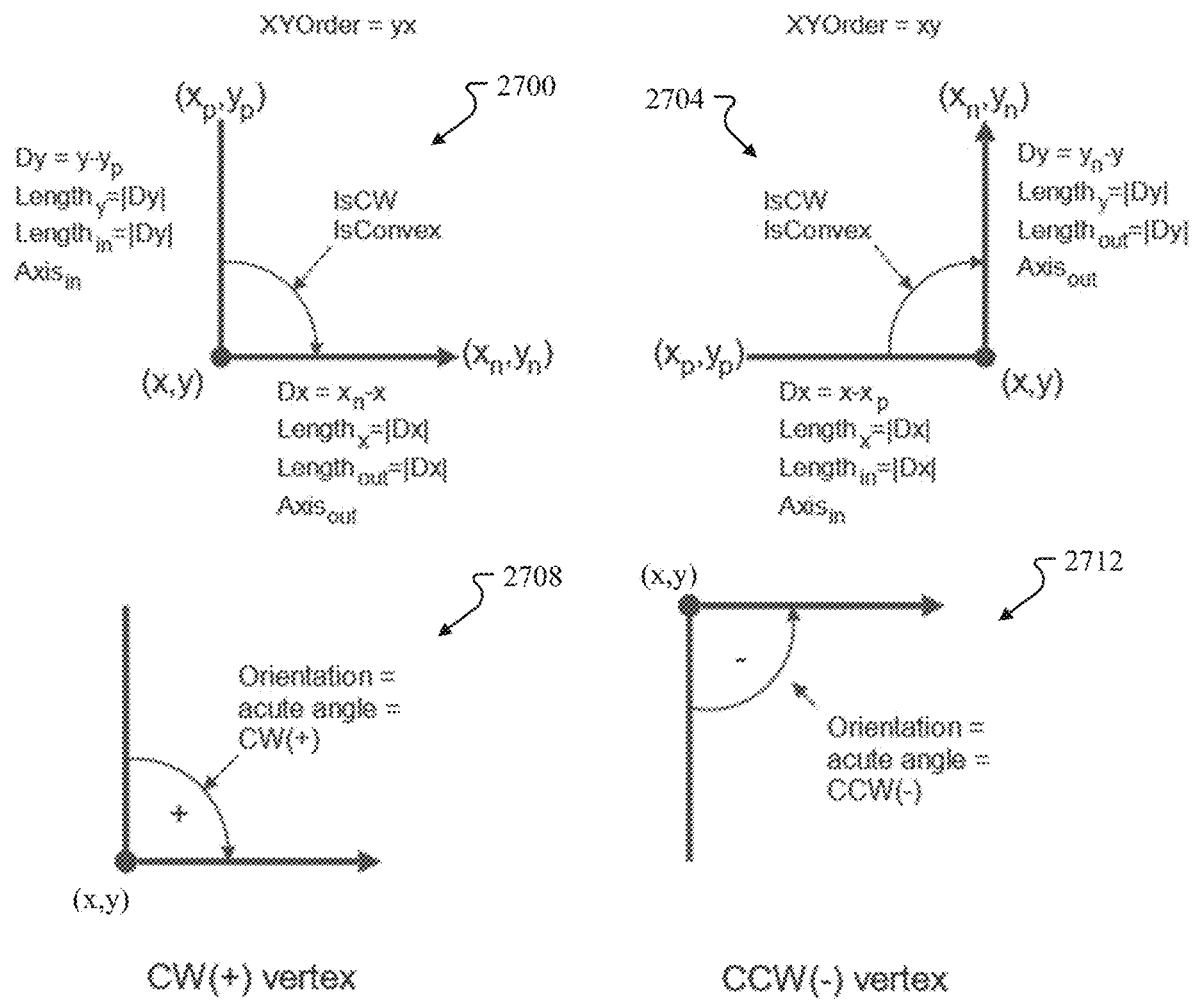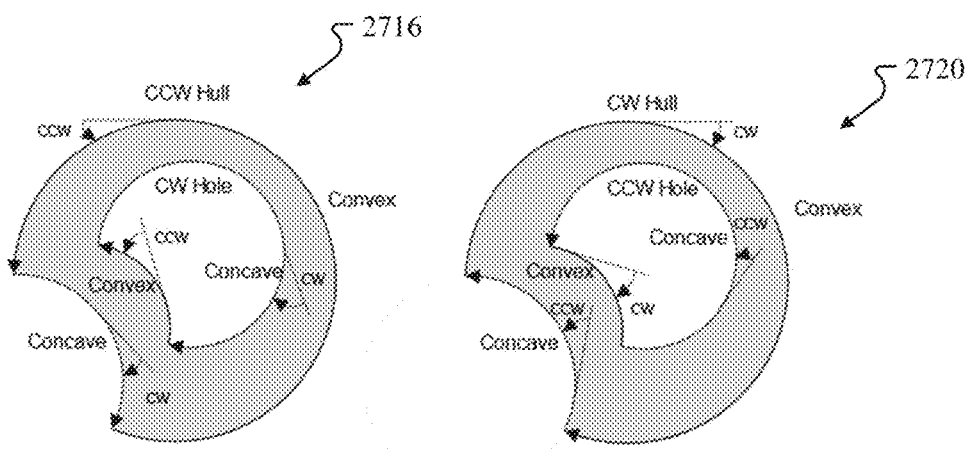
Fig. 27

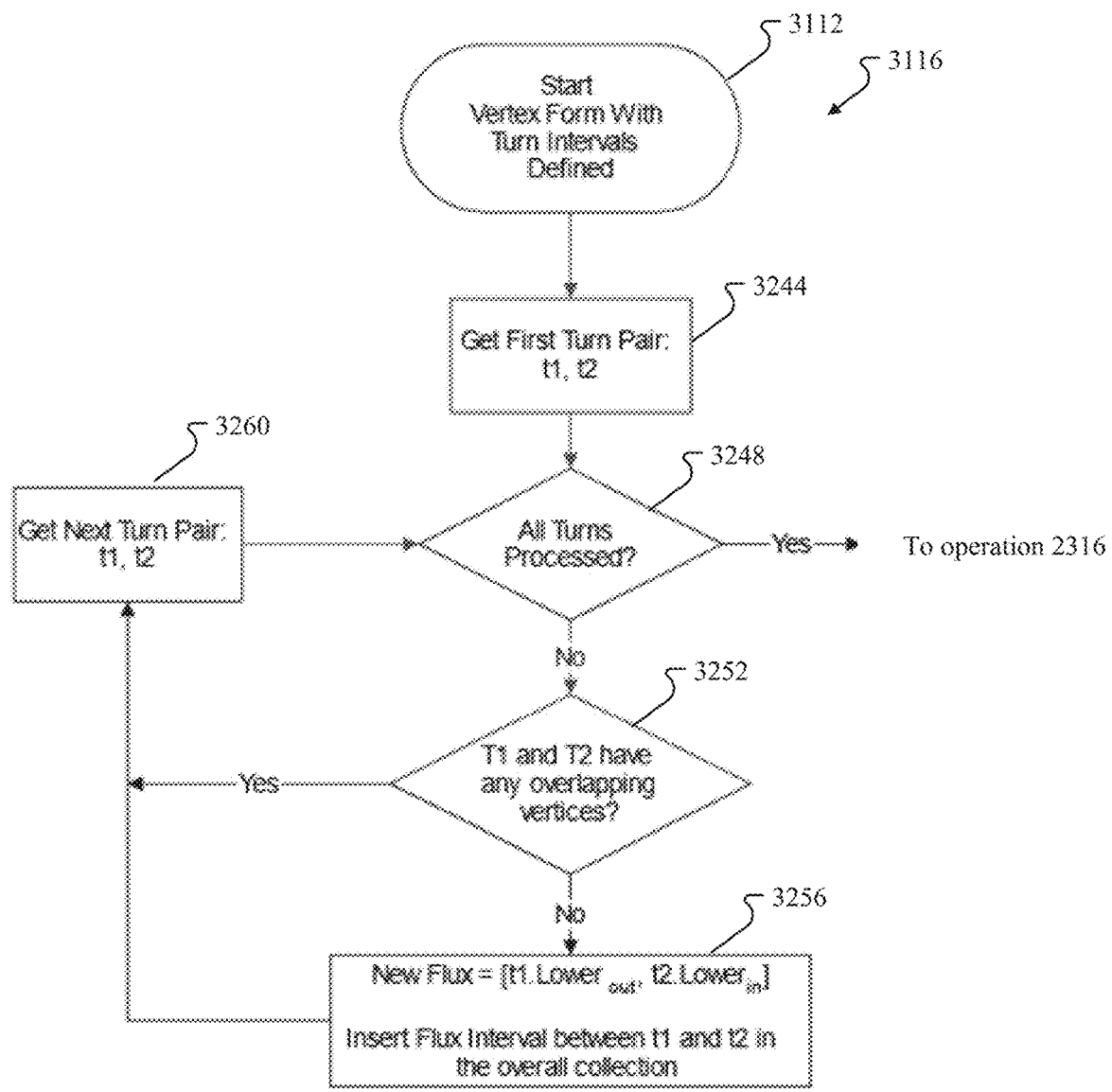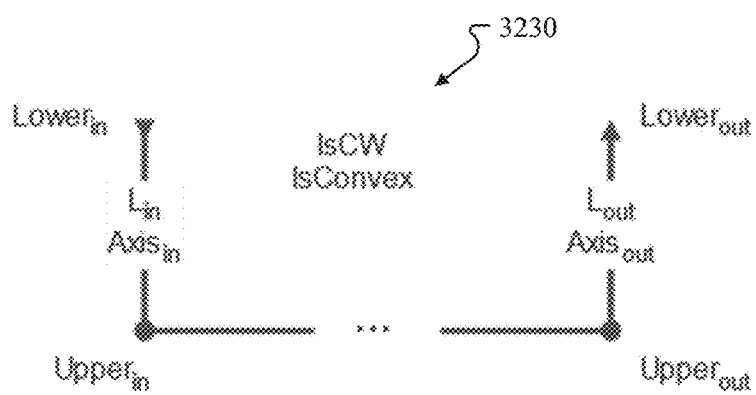
Fig. 32B

4100

| Linear Pattern | Example | Length Example | Axial |
|---|---|---|---|
| 1 | A | AAA... | 4444... | |
| 2 | AB | ABAB... | 3232... | Yes |
| 3³ | A$_n$B | AAABAAABAAA... | 77787778777... | Yes |
| 4⁴ | A$_n$B A$_m$B | AABAABABAAB... | 112112112112... | Yes |

³ In states 3 and 4, A is frequency of occurrence (n) of 1 or higher and B is always a frequency of 1.
⁴ Frequency of occurrence m is either n+1 or n-1 but not both

4104

| Pattern | Condition |
|---|---|
| A$_n$ | $r = 0$ |
| AB | $r = 0.5$ |
| A$_n$B | $r \neq 0 \cap r \neq 0.5 \cap (ratio = 0.5 \cup f = 0 \cup f = 1)$ |
| A$_n$B A$_m$B | $r \neq 0 \cap r \neq 0.5 \cap ratio \neq 0.5 \cap (0 < f < 1)$ |

*Fig. 41*

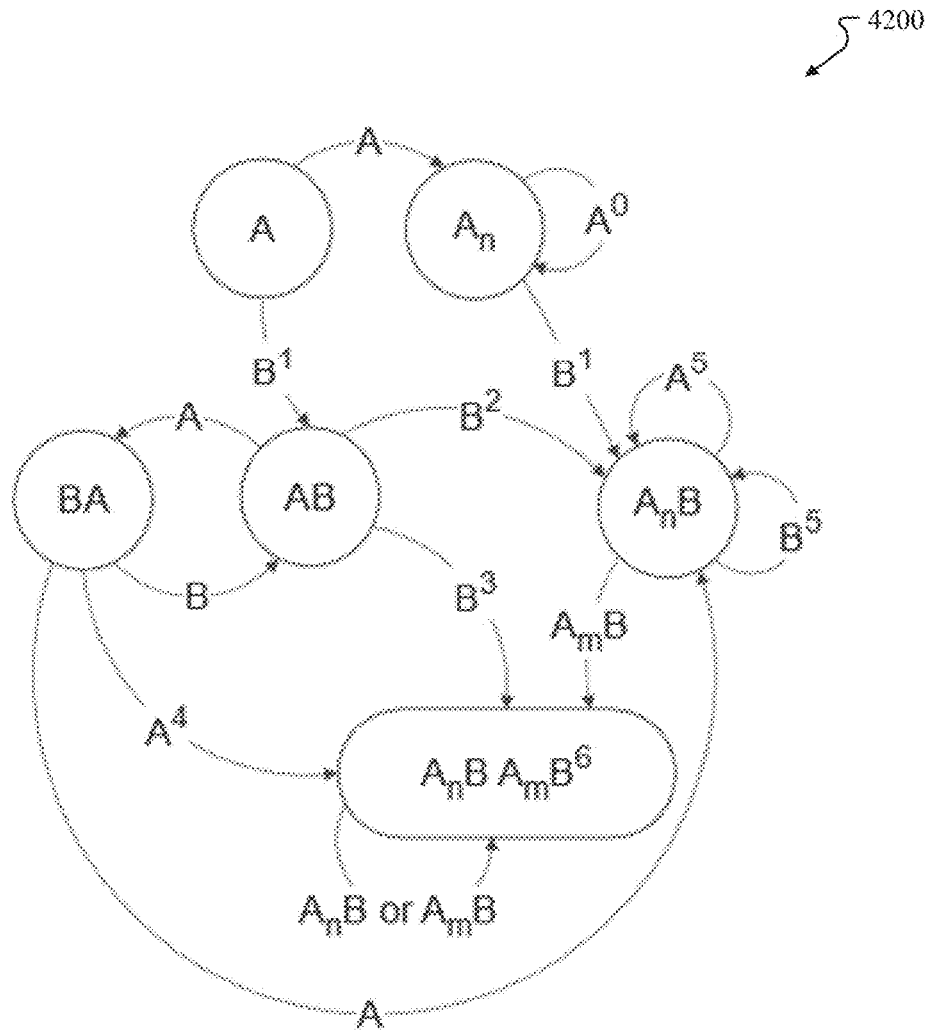

⁰ Each A increments n
¹ First B must equal either A+1 or A-1. Once B is set it cannot change for the context of the state
² Literal AB followed by B, swap A and B and transition to $A_nB$ (n=2)
³ ABAB... followed by B, swap A and B and transition to $A_nB$ $A_mB$ (n=1, m=2)
⁴ BABA... followed by A, transition to $A_nB$ $A_mB$ (n=1, m=2)
⁵ For $A_nB$, n is frequency of A between B's. Each A increments count to maximum n+1. If count to next B is n-1 or n+1 transition to $A_nB$ $A_mB$. The frequency of B can only be 1
⁶ In $A_nB$ $A_mB$ state, the frequency of A can only be n or m. The frequency of B can only be 1

*Fig. 42*

| Input: 1, 1, 1, 1, 1, 1, 1, 1, 1, 1, 1, 1, 1, 1, 1, 1, 1, 1, 1, 1, 1, 1, 1, 1, 1, 1, 1 |||||||
|---|---|---|---|---|---|---|
| Input | A | B | State | n m | Notes | Pattern |
| 1 | 1 | | A | | Start | 1 |
| 1 | 1 | | $A_n$ | 2 | Increment n | 1,1 |
| 1 | 1 | | $A_n$ | 3 | Increment n | 1,1,1 |
| 1 | 1 | | $A_n$ | 4 | Increment n | 1,1,1,1 |
| ... | | | | | | ... |

| Input: 2, 1, 2, 1, 2, 1, 2, 1, 2, 1, 2, 1, 2, 1, 2, 1, 2, 1, 2, 1, 2, 1, 2, 1, 2, 1, 2 |||||||
|---|---|---|---|---|---|---|
| Input | A | B | State | n m | Notes | Pattern |
| 2 | 2 | | A | | Start | 2 |
| 1 | 2 | 1 | AB | | B within 1 of A | (2 1) |
| 2 | 2 | 1 | BA | | | (2 1) |
| 1 | 2 | 1 | AB | | | (2 1) |
| ... | | | | | | ... |

| Input: 2, 1, 1, 1, 2, 1, 1, 1, 2, 1, 1, 1, 2, 1, 1, 1, 2, 1, 1, 1, 2, 1, 1, 1, 2, 1, 1 |||||||
|---|---|---|---|---|---|---|
| Input | A | B | State | n m | Notes | Pattern |
| 2 | 2 | | A | | Start | 2 |
| 1 | 2 | 1 | AB | | B within 1 of A | (2 1) |
| 1 | 1 | 2 | $A_nB$ | 2 | Swap B and A. A must always be the more frequent value. $B^2$ Case. | (1,1 2) |
| 1 | 1 | 2 | $A_nB$ | 3 | Increment n | (1,1,1 2) |
| 2 | 1 | 2 | $A_nB$ | 3 | | (1,1,1 2) |
| ... | | | | | | ... |

| Input: 2, 2, 2, 1, 2, 2, 2, 1, 2, 2, 2, 1, 2, 2, 2, 1, 2, 2, 2, 1, 2, 2, 2, 1, 2, 2, 2 |||||||
|---|---|---|---|---|---|---|
| Input | A | B | State | n m | Notes | Pattern |
| 2 | 2 | | A | | Start | 2 |
| 2 | 2 | | $A_n$ | 2 | Increment n | 2,2 |
| 2 | 2 | | $A_n$ | 3 | Increment n | 2,2,2 |
| 1 | 2 | 1 | $A_nB$ | 3 | B within 1 of A | (2,2,2 1) |
| 2 | 2 | 1 | $A_nB$ | 3 | Count up A again in series | (2,2,2 1) |
| ... | | | | | | ... |

| Input: 2, 1, 2, 1, 1, 2, 1, 1, 2, 1, 2, 1, 1, 2, 1, 1, 2, 1, 2, 1, 1, 2, 1, 1, 2, 1, 2, 1, 1, 2, 1 | | | | | | | |
|---|---|---|---|---|---|---|---|
| Input | A | B | State | n | m | Notes | Pattern |
| 2 | 2 |   | A |   |   | Start | 2 |
| 1 | 2 | 1 | AB |   |   |   | (2 1) |
| 2 | 2 | 1 | BA |   |   |   | (2 1) |
| 1 | 2 | 1 | AB |   |   | B within 1 of A | (2 1) |
| 1 | 1 | 2 | $A_nB$ $A_mB$ | 1 | 2 | Swap case $B^3$ | $A_nB\ A_mB$: (1 2)(1,1 2) |
| 2 | 1 | 2 | $A_nB$ $A_mB$ | 1 | 2 |   | $A_nB\ A_mB$: (1 2)(1,1 2) |
| ... |   |   |   |   |   |   | ... |

| Input: 2, 2, 1, 2, 2, 1, 2, 1, 2, 2, 1, 2, 2, 1, 2, 2, 1, 2, 2, 1, 2, 1, 2, 2, 1, 2, 2, 1, 2 | | | | | | | |
|---|---|---|---|---|---|---|---|
| Input | A | B | State | n | m | Notes | Pattern |
| 2 | 2 |   | A |   |   | Start | 2 |
| 2 | 2 |   | $A_n$ | 2 |   |   | 2,2 |
| 1 | 2 | 1 | $A_nB$ | 2 |   | B within 1 of A | (2,2 1) |
| 2 | 2 | 1 | $A_nB$ | 2 |   |   | (2,2 1) |
| 2 | 2 | 1 | $A_nB$ | 2 |   |   | (2,2 1) |
| 1 | 2 | 1 | $A_nB$ | 2 |   |   | (2,2 1) |
| 2 | 2 | 1 | $A_nB$ | 2 |   |   | (2,2 1) |
| 1 | 2 | 1 | $A_nB$ $A_mB$ | 2 | 1 | Frequency count of A is one less than n. Set m = n-1 and evolve state | (2,2 1)(2 1) |
| 2 | 2 | 1 | $A_nB$ $A_mB$ | 2 | 1 |   | (2,2 1)(2 1) |
| ... |   |   |   |   |   |   | ... |

| Input: 2, 1, 1, 2, 1, 1, 1, 2, 1, 1, 2, 1, 1, 1, 2, 1, 1, 1, 2, 1, 1, 2, 1, 1, 1, 2, 1, 1 | | | | | | | |
|---|---|---|---|---|---|---|---|
| Input | A | B | State | n | m | Notes | Pattern |
| 2 | 2 |   | A |   |   | Start | 2 |
| 1 |   | 1 | AB |   |   | B within 1 of A | (2 1) |
| 1 | 1 | 2 | $A_nB$ |   | 2 | Swap case $B^2$ | (1,1 2) |
| 2 | 1 | 2 | $A_nB$ |   | 2 |   | (1,1 2) |
| 1 | 1 | 2 | $A_nB$ |   | 2 |   | (1,1 2) |
| 1 | 1 | 2 | $A_nB$ |   | 2 |   | (1,1 2) |
| 1 | 1 | 2 | $A_nB$ |   | 2 |   | (1,1 2) |
| 2 | 1 | 2 | $A_nB$ $A_mB$ | 2 | 3 | Frequency count of A is one more than n. Set m = n+1 and evolve state | (1,1 2)(1,1,1 2) |
| 1 | 1 | 2 | $A_nB$ $A_mB$ | 2 | 3 | Remaining frequency counts for A are 2 or 3 and frequency count for B is always 1 | (1,1 2)(1,1,1 2) |

*Fig. 44B*

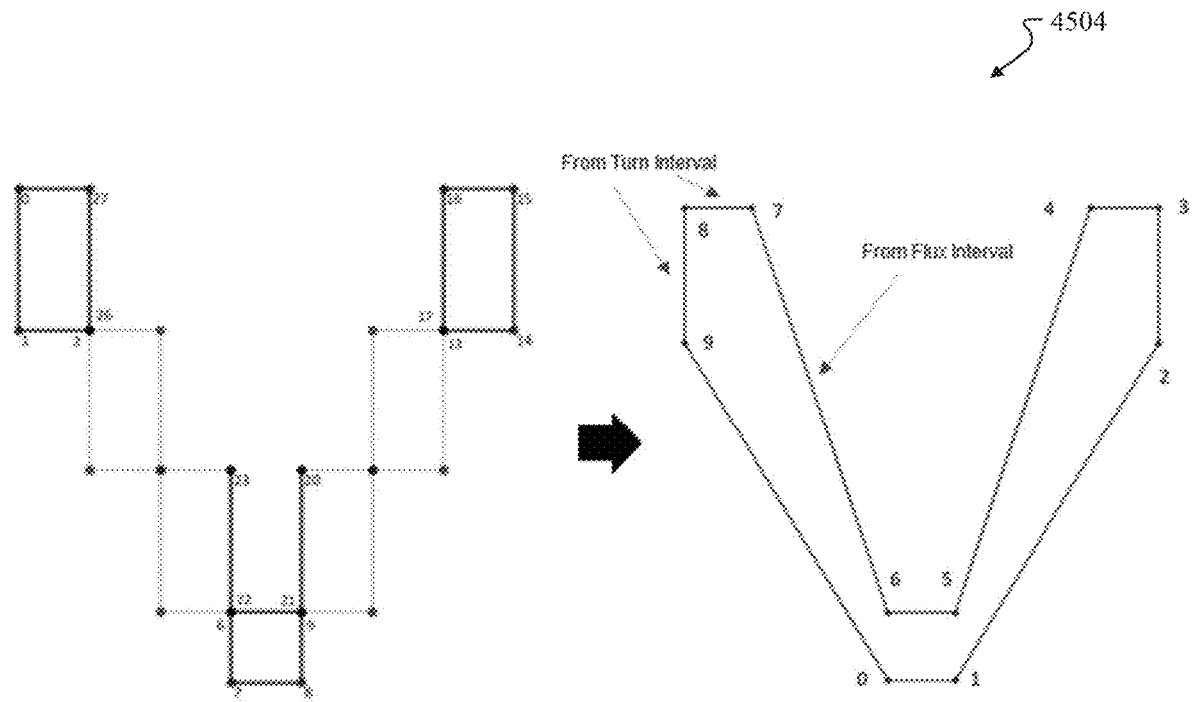
Fig. 45

5000
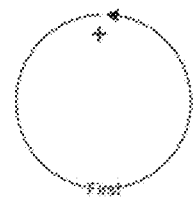 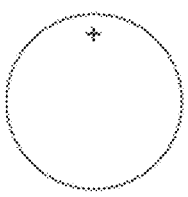 Single Interval
Last/First Convexities Match
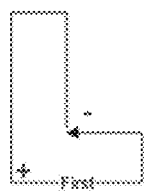 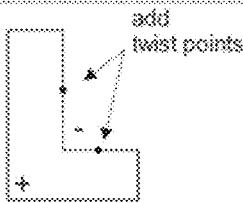 Single Interval
Last/First Convexities Differ
 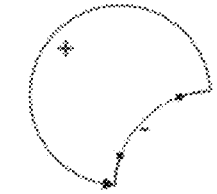 Multi Interval
Last/First Convexities Match
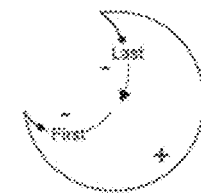 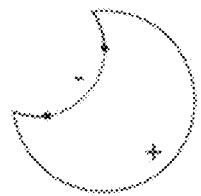
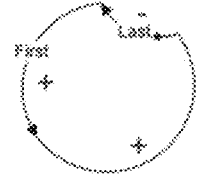 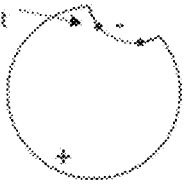 Multi Interval
Last/First Convexities Differ
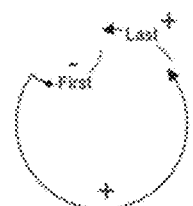 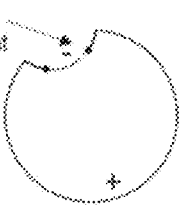
*Fig. 50*

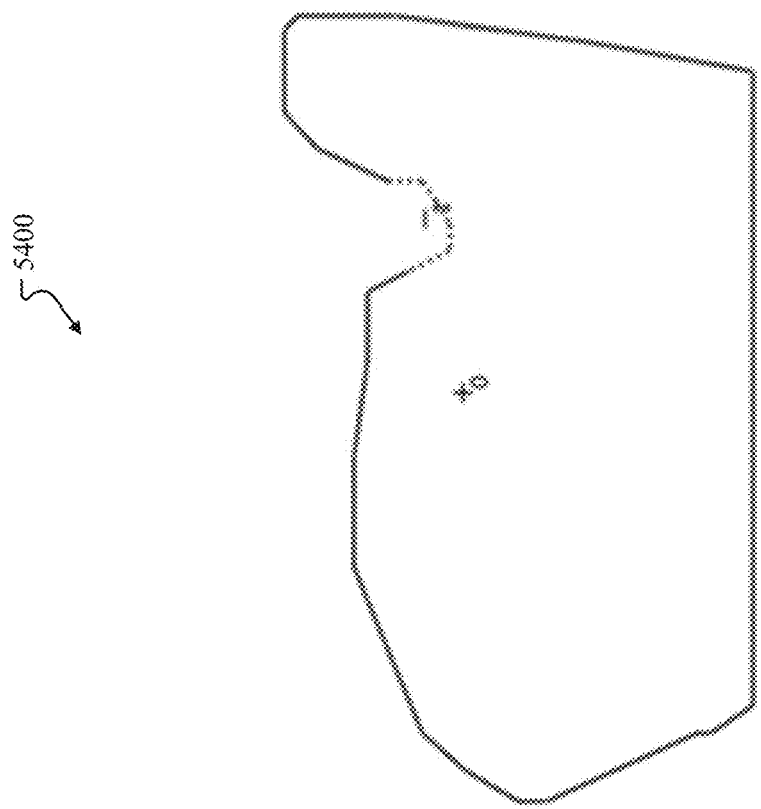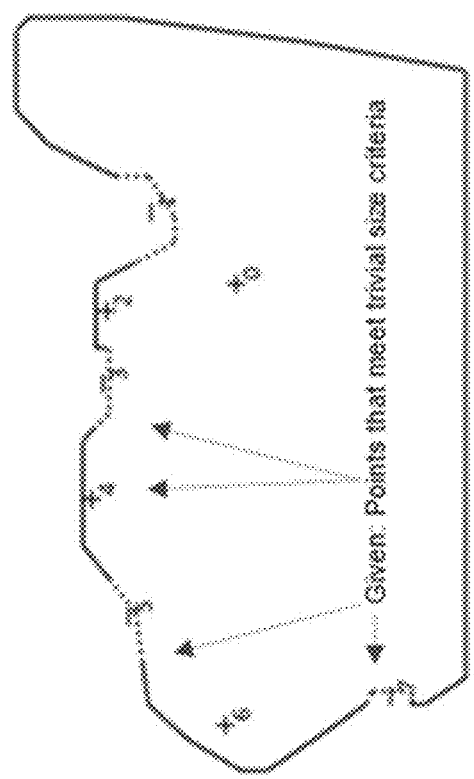
Fig. 54

SYSTEMS, METHODS, AND DEVICES FOR IMAGE PROCESSING

FIELD

The present disclosure is generally directed to systems, methods, and devices for image processing.

BACKGROUND

Image processing techniques include techniques for analyzing an input image to reveal characteristics of the input image and/or to produce an output image from the input image.

SUMMARY

At least one example embodiment is directed to a device comprising processing circuitry to receive an input polygon, the input polygon being comprised of a plurality of segments connected by a plurality of points, some of the plurality of segments extending in a first direction and remaining ones of the plurality of segments extending in a second direction perpendicular to the first direction; perform a first set of operations on the input polygon to generate an intermediate polygon having a plurality of vertices, a number of the plurality of vertices being fewer than a number of the plurality of points; and perform a second set of operations on the intermediate polygon based on traits of the plurality of vertices to generate a final polygon with a contour that represents the input polygon, the contour including at least one section that extends in a third direction different than the first direction and the second direction.

At least one example embodiment is directed to a system comprising a display and processing circuitry to: receive an input polygon, the input polygon being comprised of a plurality of segments connected by a plurality of points, some of the plurality of segments extending in a first direction and remaining ones of the plurality of segments extending in a second direction perpendicular to the first direction; perform a first set of operations on the input polygon to generate an intermediate polygon having a plurality of vertices, a number of the plurality of vertices being fewer than a number of the plurality of points; perform a second set of operations on the intermediate polygon based on traits of the plurality of vertices to generate a final polygon with a contour that represents the input polygon, the contour including at least one section that extends in a third direction different than the first direction and the second direction; identify the final polygon by matching the contour of the final polygon with a contour of a reference polygon in a library of reference polygons; and render an indication of the identity of the final polygon to the display.

At least one example embodiment is directed to a method comprising processing an image of an object to generate a final polygon having a contour that represents the object; and identifying the object based on a library of polygons having contours generated in the same manner as the contour of the final polygon that represents the object.

Additional features and advantages are described herein and will be apparent from the following description and the figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure is described in conjunction with the appended figures, which are not necessarily drawn to scale:

FIGS. 6A and 6B illustrate the image processing method of FIG. 5 in more detail according to at least one example embodiment.

FIGS. 7A and 7B illustrate an example of how image processing methods according to example embodiments construct a series of polygons based on an input image.

FIG. 10 illustrates another example of how image processing methods according to example embodiments construct a series of polygons based on an input image.

FIG. 12 illustrates building a three-dimensional polygon for a three-dimensional input image according to at least one example embodiment.

FIGS. 19-22 illustrate various graphics useful for describing the general obstacles encountered when creating a contoured version of a digital polygon according to at least one example embodiment.

FIG. 26 illustrates a method further detailing an operation from FIG. 25 according to at least one example embodiment.

FIGS. 27 and 28 illustrate various traits of a vertex as determined the method in FIG. 25 according to at least one example embodiment.

FIG. 32B illustrates a method that provides further details for an operation in FIG. 31 according to at least one example embodiment.

FIGS. 41-44B illustrate additional details for an operation in FIG. 37 according to at least one example embodiment.

FIG. 45 illustrates an example graphic useful for carrying out an operation in FIG. 36 according to at least one example embodiment.

FIG. 50 illustrates a graphic showing six possible merge scenarios for operation an operation in FIG. 49 according to at least one example embodiment.

FIGS. 51 to 54 illustrate graphics and methods that provide additional details for operation an operation in FIG. 46 according to at least one example embodiment.

FIG. 52 illustrates a method that provides further details for an operation in FIG. 46 according to at least one example embodiment.

FIG. 53 illustrates a method that provides further details for an operation in FIG. 52 according to at least one example embodiment.

FIG. 54 illustrates a graphic that shows how to merge curve intervals in accordance with the methods described above with reference to FIGS. 51 to 53 according to at least one example embodiment.

DETAILED DESCRIPTION

Figure 1:
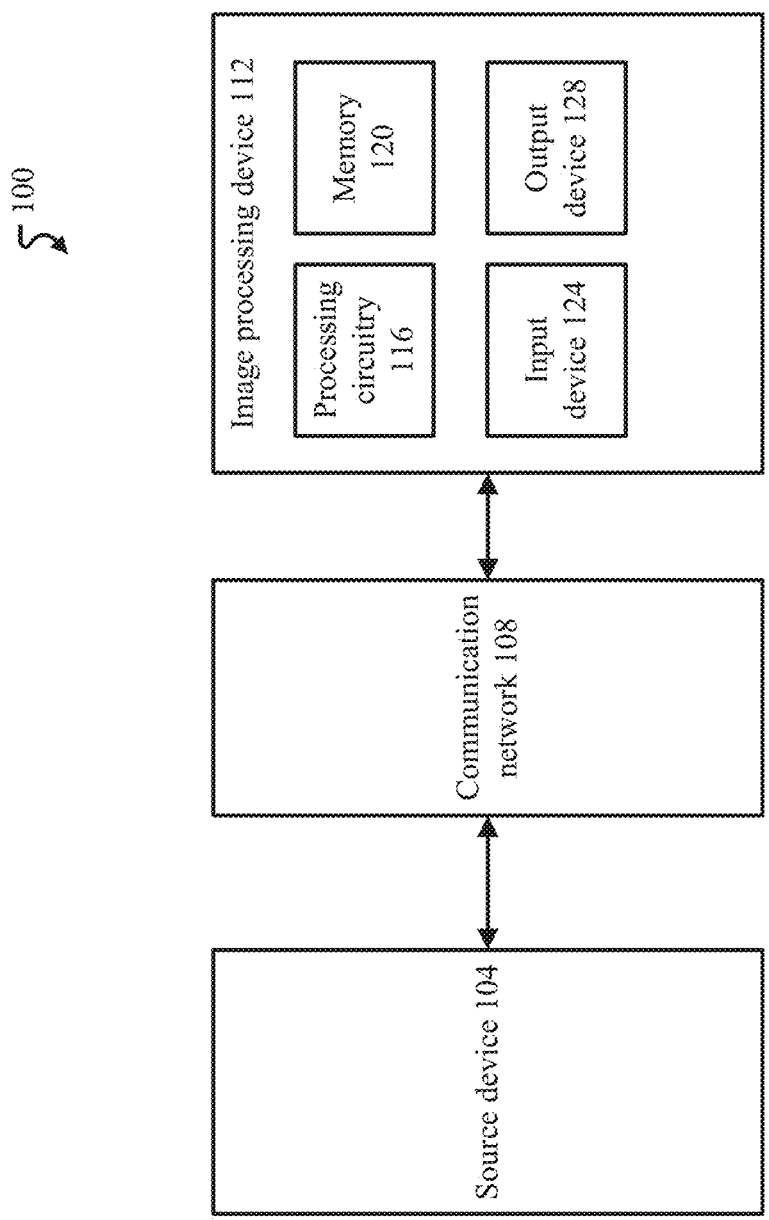
FIG. 1 illustrates a system according to at least one example embodiment.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a PCB, or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The terms "determine," "calculate," and "compute," and variations thereof, as used herein, are used interchangeably and include any appropriate type of methodology, process, operation, or technique.

Various aspects of the present disclosure will be described herein with reference to drawings that may be schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "include," "including," "includes," "comprise," "comprises," and/or "comprising," when used in this specification, specify the presence of stated features, integers, stages, operations, elements, and/or components, but do not preclude the presence or addition of one or more other features, integers, stages, operations, elements, components, and/or groups thereof. The term "and/or" includes any and all combinations of one or more of the associated listed items.

Where reference to general element or set of elements is appropriate instead of a specific element, the description may refer to the element or set of elements by its root term. For example, when reference to a specific element $X_1$, $X_2$, etc. is not necessary, the description may refer to the element(s) in general as "X."

FIG. 1 illustrates a system 100 according to at least one example embodiment. The system 100 includes a source device (or device) 104, a communication network 108, and an image processing device (or device) 112. In at least one example embodiment, source 104 and/or device 112 correspond to one or more of a Personal Computer (PC), a laptop, a tablet, a smartphone, a server, a collection of servers, or the like. In some embodiments, the devices 104 and 112 may correspond to any appropriate type of device that communicates with other devices also connected to a common type of communication network 108. As another specific but non-limiting example, the devices 104 and 112 may correspond to servers offering information resources, services and/or applications to user devices, client devices, or other hosts in the system 100. In at least one example embodiment, the source device 104 comprises any suitable device that generates, receives, and/or stores a source image to be processed by the device 112 as an input image to output an output image. Such source devices may include but are not limited to a camera (stand alone or incorporated as part of another device such as a mobile phone, a laptop, a tablet, etc.), a document scanner (e.g., a copy machine), a memory having the source image stored thereon and that is local to or remote from a device that generated the source image, and/or the like.

The communication network 108 may comprises a wired network and/or a wireless network that enables wired and/or wireless communication between devices 104 and 112. Examples of the communication network 108 that may be used to connect the devices 104 and 112 include an Internet Protocol (IP) network, an Ethernet network, an InfiniBand (TB) network, a Fibre Channel network, the Internet, a cellular communication network, a wireless communication network, combinations thereof (e.g., Fibre Channel over Ethernet), variants thereof, and/or the like. The communication network 108 may enable wireless communication between devices 104 and 112 using one or more protocols in the 802.11 suite of protocols, near-field communication (NFC) protocols, Bluetooth protocols, LTE protocols, 5G protocols, and/or the like. The devices 104 and 112 may include one or more communication interfaces to facilitate wired and/or wireless communication over the communication network 108.

Although the devices 104 and 112 are shown as separate devices communicating over the communication network 108, it should be appreciated that the devices 104 and 112 and the communication network 108 may be incorporated into a single device (e.g., a server, a personal computer, and/or the like) so that the source image, the input image that is derived from the source image, and the output image that is based on the input image are generated and/or processed by the same device.

The processing circuitry 116 may comprise suitable software, hardware, or a combination thereof for processing images from source device 104 and carrying out other types of computing tasks. The processing circuitry 116 may carry out the various image processing operations and algorithms described herein. The memory 120 may include executable instructions and the processing circuitry 116 may execute the instructions on the memory 120. Thus, the processing circuitry 116 may include a microprocessor, microcontroller, and/or the like to execute the instructions on the memory 120. The memory 120 may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory 120 and processing circuitry 116 may be integrated into a common device (e.g., a microprocessor may include integrated memory). Additionally or alternatively, the processing circuitry 116 may comprise hardware, such as an application specific integrated circuit (ASIC). Other non-limiting examples of the processing circuitry 116 include an Integrated Circuit (IC) chip, a Central Processing Unit (CPU), a General Processing Unit (GPU), a Field Programmable Gate Array (FPGA), a digital signal processor (DSP), a collection of logic gates or transistors, resistors, capacitors, inductors, diodes, or the like. Some or all of the processing circuitry 116 may be provided on a Printed Circuit Board (PCB) or collection of PCBs. It should be appreciated that any appropriate type of electrical component or collection of electrical components may be suitable for inclusion in the processing circuitry 116. The processing circuitry 116 may send and/or receive signals to and/or from other elements of the system 100 to control various operations for the system 100.

Although not explicitly shown, it should be appreciated that devices 104 and 112 may include other processing devices, storage devices, and/or communication interfaces generally associated with computing tasks, such as sending and receiving data over a wired and/or wireless connection.

The input device 124 includes suitable hardware and/or software that enables input to the system 100 (e.g., user input). The input device 124 may include a keyboard, a mouse, a touch-sensitive pad, touch-sensitive buttons, a touch-sensitive portion of a display, mechanical buttons, switches, and/or other control elements for providing user input to the system 100 to enable user control over certain functions of the system 100.

The output device 128 may include suitable hardware and/or software that produces visual, audio, and/or tactile feedback for a user or other interested party based on one or more inputs from the processing circuitry 116. In at least one example embodiment, the output device 128 includes one or more displays to display an output image and/or one or more characteristics of an input image after processing of the input image by the device 112. The input image may be based on a source image received from the source device 104 over the communication network 108. The display may include any suitable type of display, such as a liquid crystal display (LCD), a light emitting diode (LED) display, and/or the like. The output device 128 may be a stand-alone device or a device integrated as part of another device, such as a smart phone, a laptop, a tablet, and/or the like.

Although the input device 124 and the output device 128 are illustrated as being part of the image processing device 112, the input device 124 and/or the output device 128 may be embodied separate from the device 112 according to design preferences of the system 100.

Figures 2A, 2B:
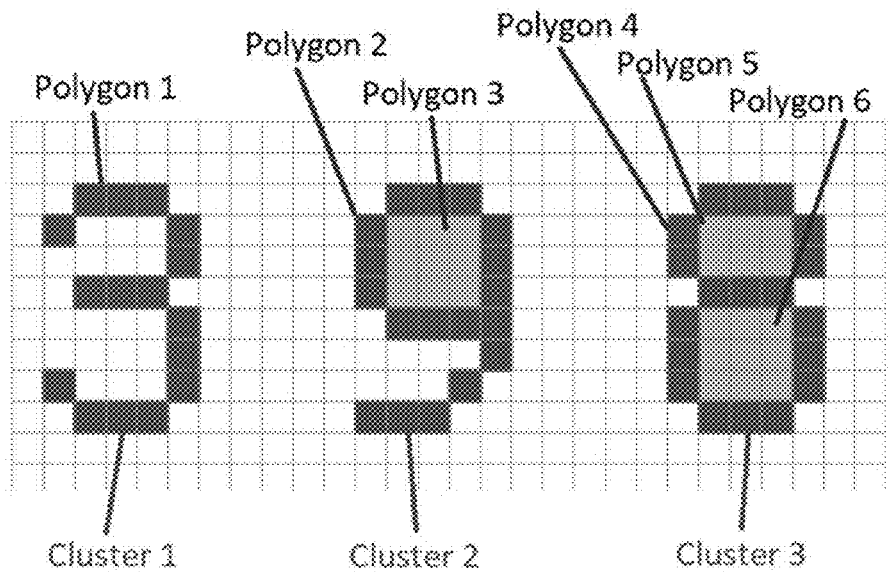
FIG. 2A illustrates various sample images comprised of polygons.
FIG. 2B illustrates a table outlining a complete polygon profile of the image in FIG. 2A.

FIG. 2A illustrates various sample images comprised of polygons according to at least one example embodiment. For each polygon, example embodiments determine the number of contiguous pixels, the points that compose a cluster (where each cluster may be defined as one or more interrelated polygons and/or as a set of vertically, horizontally, and/or diagonally adjacent (e.g., immediately adjacent) pixels), the points that form the outer and inner polygons for each cluster (where each polygon may be defined as a cyclic sequence of points with each point have a prior point and a next point and where no polygon intersects any other polygon and all polygons are simple polygons), precise point sequences of all polygons with no pixel corner cutting (i.e., no pixel rounding), complete information of how each polygon relates to another polygon (e.g., shared boundaries, outer or inner polygon, percent of parent polygon, etc.), precise information about each polygon (e.g., location, center, area, perimeter, and the like) as a result of having the point sequences, and/or total area of pixels included in a polygon. This set of processing goals may be referred to as determining an image's complete polygon profile. In general, a cluster has one polygon that defines an outer perimeter of the cluster, and the cluster may or may not include additional polygons. If a cluster does include additional polygons, these polygons correspond to holes (or inner polygons) in the cluster.

FIG. 2B further illustrates a table outlining the complete polygon profile of the image in FIG. 2A. The complete polygon profile an input image may be used to draw one or more conclusions about the input image. As shown, the table lists the total number of pixels used for each symbol 3, 9, 8, the cluster number, a number of polygons, whether each polygon is an outer or inner polygon, a number of edge points or pixel edges used for each polygon, a number of pixels for each symbol (16, 18, and 19), and bounds of each polygon. The notation for a bound of a polygon indicates the pixel coordinates of a polygon and a pixel area for the polygon. For example, polygon 1 in FIG. 2B has a bound 1, 2, 5×8, which means that polygon 1 begins at column 1, row 2 (i.e., 1,2) where column 0 is the leftmost column of pixels and row 0 is the uppermost column of pixels, and that polygon 1 spans 5 columns of pixels and 8 rows of pixels (i.e., 5×8).

Still with reference to FIGS. 2A and 2B, each polygon that is included in symbols 3, 8, and 9 has a precise and unique point sequence: p1, p2 . . . pN where pN connects back to p1. In addition, all polygons are associated with a cluster. For example, in cluster 3, polygons 4, 5, and 6 are related to each other vs. being mutually independent as in the marching squares algorithm. All polygon traces (i.e., the outer and inner edges of each polygon) lie on pixel boundaries. That is, no pixel is cut or interpolated. In addition, no two polygons intersect, and all polygons are simple in that no polygon intersects itself. Both of these characteristics are useful for downstream mathematical logic to accurately process the polygon. For example, it is easier to compute the area of a polygon that has no self-intersections than a polygon that self-intersects.

To understand one advantage of inventive concepts, consider treating the clusters in FIG. 2A as a collection of isolated pixels (for example, as in a flood fill algorithm). An algorithm such as flood fill has no information about how the pixels join each other. Under this limitation, the three symbols in FIG. 2A are very similar. For instance, if one adds two pixels to the '3' then it will look like a '9,' and if one adds three pixels to the '3', then it will look like an '8'. Therefore, if images are treated as isolated pixels, then deciding between different symbols boils down to a small margin of three pixels in this example. Furthermore, matching symbols algorithmically under this limitation would require a brute scan of every instance of every size of every symbol to get a practical match. This approach is memory intensive, time intensive, error-prone, and inefficient.

Inventive concepts, on the other hand, are more decisive. For example, symbol '3' is defined by only one polygon (the outer polygon), symbol '9' is defined by two polygons: outer and inner polygons, and symbol '8' is defined by three polygons: one outer polygon and two inner polygons. Within an algorithm according to inventive concepts, the three symbols are completely different. Furthermore, these polygon properties are generally true regardless of size and font of the symbols. Stated another way, the three symbols are topologically distinct: '3' has no holes, '9' has one hole, and '8' has two holes. Processing images with symbols according to inventive concepts enhances the downstream ability to correctly identify the symbols because it is possible to match general properties of each symbol (e.g., number of polygons) with known properties of other symbols, which uses less memory, saves time, reduces error, and/or increases efficiency.

FIG. 2A illustrates ambiguous pixel cases where two polygons share a point. Processing methods according to example embodiments correctly disambiguate each case of a shared point. In one example embodiment, an ambiguous pixel is defined as a pixel with two opposing sides where it is unknown whether the two sides are part of a single polygon or multiple polygons. This concept is described more detail below with reference to FIG. 3.

Figure 3:
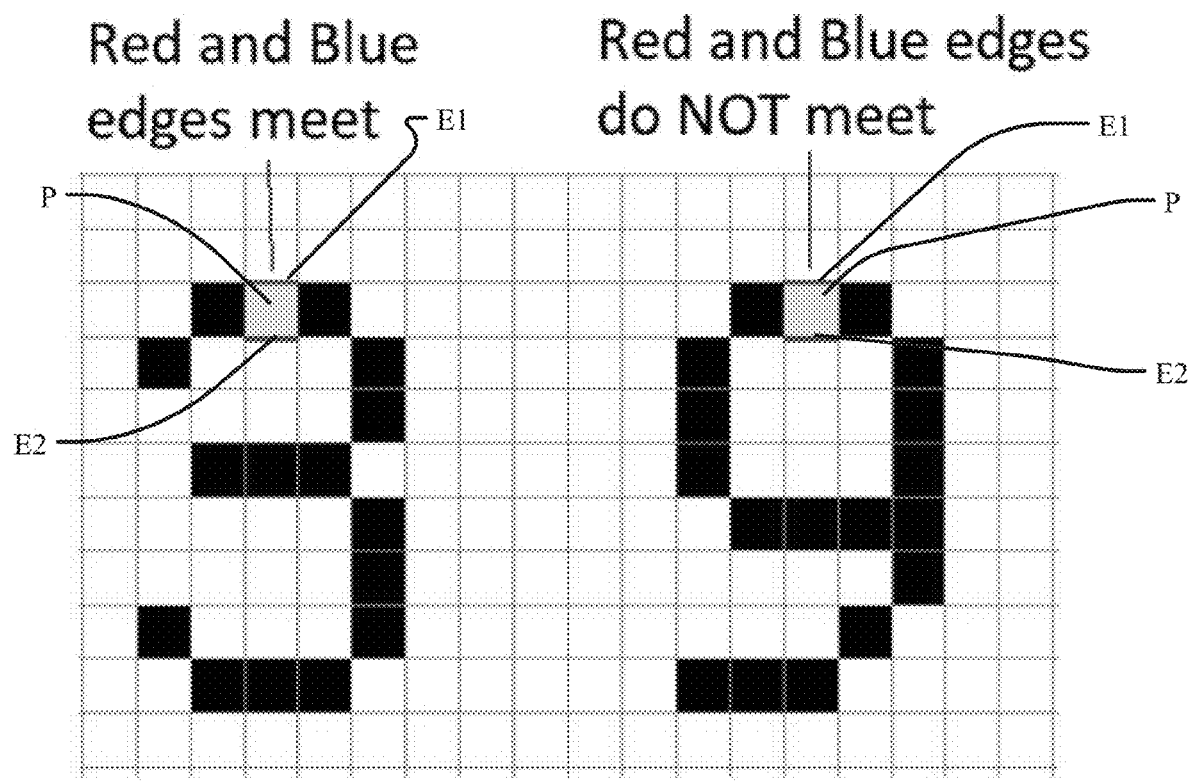
FIG. 3 illustrates edges for pixels in two of the symbols of FIG. 2A.

FIG. 3 illustrates edges for pixels in two of the symbols in FIG. 2A. As shown for a pixel P in '3', the edges E1 and E2 eventually meet to form the polygon perimeter for the symbol '3'. For the pixel P in '9', however, the edges E1 and E2 do not meet because each edge is part of a unique polygon. Image processing methods according to example embodiments connect all the edges of each polygon to disambiguate edges of each pixel to determine how pixel edges relate to polygons, which in turn informs on how a pixel is used in a symbol. As may be appreciated from the instant description, image processing methods according to example embodiments may have an optimal $O(n)$ to $O(n^2)$ execution time depending on the input image.

FIGS. 4A to 4D illustrate a plurality of keys according to at least one example embodiment. Image processing methods according to example embodiments generate and consult the keys in FIGS. 4A to 4D in order to process an input image. As discussed in more detail below with reference to the figures, image processing methods according to example embodiments convert a source image (e.g., a color image, grayscale image, etc.) into an input image by transforming the source image into a 1-bit per pixel image. In other words, the source image is converted to an input image so that each pixel in the input image has one of two states (or colors). For example, each pixel in the input image has a first state (one of black or white color) or a second state (the other one of black or white color). Image processing methods begin by scanning the input image (e.g., in a raster fashion) for a pixel "hit." In at least one example embodiment, a pixel hit occurs when a pixel has the first state (e.g., black) and a pixel miss occurs when a pixel has the second state (e.g., white).

With reference again to FIGS. 4A to 4D, each of the keys is unique and represents a number of possible states that surround a reference pixel RP. The reference pixel RP corresponds to a pixel that is determined to be a pixel hit during the above-described scanning process. Image processing methods according to example embodiments then determine pixel states of pixels in the Moore neighborhood of the reference pixel RP to see which pixels have states that match the state of the reference pixel RP (where the Moore neighborhood refers to the eight pixels immediately adjacent to the reference pixel RP). For example, with reference to the pixel grid in FIG. 4A, the pixels in the Moore neighborhood of the reference pixel RP are examined one-by-one beginning at pixel 0 and continuing in a counterclockwise (CCW) direction to pixel 7. Here, it should be appreciated that the pixel grid of FIG. 4A applies to each key in FIGS. 4A to 4D, and each pixel 0 to 7 in the Moore neighborhood of the reference pixel RP has one of two states (e.g., white or black). Because each of the eight pixels in the Moore neighborhood of the reference pixel RP has one of two states, there are 256 (or $2^8$) possible combinations of pixel states for the eight pixels in the Moore neighborhood of the reference pixel RP. Thus, there are 256 possible keys (i.e., key 000 to key 255). Key 000 illustrates a scenario where none of the pixels surrounding the reference pixel RP have the same state, key 255 illustrates a scenario where all of the pixels surrounding the reference pixel RP have the same state, and keys 001 to 254 illustrate all scenarios in between.

As discussed in more detail below, each key also includes one or more edges (indicated with arrows) that span one or more sides of one or more pixels in the respective key, and the one or more edges in each key are used to build polygons for the output image and/or polygon profile. The starting point, direction, and ending point of each edge depend on pixel states between adjacent pixels in the Moore neighborhood of the reference pixel RP.

For example, starting at pixel 0 of the pixel grid for each key 001 to 254 and moving in the CCW direction, an edge's tail is initiated at an edge of the pixel grid of a key when a pixel hit is followed by a pixel miss (where pixel hits are shown in FIGS. 4A to 4D as being shaded and pixel misses are not shaded), and travels around borders of pixels with states that match the state of the reference pixel RP so that the edge's head is also located at one of the edges of the pixel grid. Using key 005 as an example, this key corresponds to a portion of an input image where the reference pixel RP and pixels 0 and 2 have a same state (e.g., the color black) in the 1-bit per pixel input image. For key 005, a tail of a first edge begins at an upper left corner or point of pixel 0 and an upper right corner or point of pixel 1 because, in the Moore neighborhood of the reference pixel RP, pixel 0 is a pixel hit and pixel 1 is a pixel miss. The first edge follows the borders of pixels 0, RP, and 2, and ends at an upper righthand corner or point of pixel 2 with the edge's head. In addition, key 005 illustrates a second edge initiated between pixels 2 and 3 of the pixel grid that travels along the bottom borders of pixels 2, RP, and 0.

In FIGS. 4A to 4D, each edge for each key should flow in the same direction as the examination of the Moore neighborhood, in this case, the CCW direction. In addition, each edge of each key "walls off" or separates pixels having the same state as the reference pixel RP from pixels not having that state. FIGS. 4A to 4D further illustrate dots in the center of the reference pixel RP and/or one or more pixels surrounding the reference pixel RP. For keys 001 to 254, the number of dots included in the pixels surrounding the reference pixel RP corresponds to a number of edges for that key. Each dot in the surrounding pixels is placed in a pixel where a head of an edge is located.

As noted above, example embodiments form an input image of any bit depth using known technology to transform the n-bit per pixel image to a 1-bit per pixel input image. For example, a source image is converted to grayscale (if the conversion is needed) and the 1-bit per pixel space is formed by thresholding each pixel value in the grayscale image against a reference pixel value (e.g., by making pixels less than <50% brightness black and pixels >=50% brightness white). Here, it should be appreciated that to the decision process a hit pixel as black and a pixel miss as white is a design choice, and that a pixel hit may be a white pixel and a pixel miss may be a black pixel if desired. In addition, the reference pixel value is a design parameter set based on empirical evidence and/or preference. In at least one example embodiment, the above and below described image processing algorithms (e.g., the methods in FIGS. 5 and 6A) may be run multiple times for a single source image, with each iteration of the algorithm using a different reference pixel value to produce a different 1-bit per pixel input image. The result may produce a plurality of outputs (e.g., complete polygon profiles) that can be compiled into a single composite output (e.g., a single composite polygon profile) or remain separate as a plurality of outputs (e.g., multiple separate polygon profiles). In at least one example embodiment, one or more algorithms may be applied to the plurality of outputs to derive additional information. For example, a polygon profile of an input image may be input to a neural network to produce one or more outputs that are indicative of additional information in the input image. In at least one example embodiment, such additional information may relate to object recognition and/or labeling of one or more objects in the input image.

In view of the above, each reference pixel RP has a key that uniquely identifies the state of the pixels surrounding the reference pixel RP. Example embodiments include generating the keys shown in FIGS. 4A to 4D and storing the keys for later consultation to build polygons for an output image and/or a polygon profile. For example, each key is formed by starting from the upper right-hand corner of the pixel grid and going CCW to fill each key from right to left (where white is a pixel miss o and black is a pixel hit). Assuming a white pixel is binary 0 and a black pixel is binary 1, key 50 is 00110010 in binary, where pixel 0 of the pixel grid is the least significant bit (LSB) and pixel 7 is the most significant bit (MSB). Each of the remaining permutations has a unique key formed by setting a 0 or 1 for black or white for each bit position 0-7 resulting in 256 possible keys.

Each key in FIGS. 4A to 4D further includes edge information where an edge separates white and black pixels on one side of the 3×3 matrix. FIGS. 4A to 4D, there are two such edges, and the edges have two properties: the points that describe the edge, and the link points. For both properties, the ordering of the points may be useful. For key 50 in FIG. 4A, a first edge includes four edge points (0, −1), (0, 0), (0, 1), (−1, 1), and two link points in(0, −1), out(−1, 1). Key 50 includes a second edge with four edge points (1, 2), (1, 1), (1, 0), (1, −1), and two link points=in(0, 1), out(0, −1). As may be appreciated and with reference to the pixel grid, an in-link point of an edge corresponds to the point coordinates of a tail of the edge and an out-link point corresponds to the point coordinates of a head of the edge. In FIGS. 4A to 4D, order the edges by the edge's in link index (i.e., the location of the pixel in the Moore neighborhood of the reference pixel RP). In this case, the first edge is in position 1 of the pixel grid and the second edge is in position 5 of the pixel grid, so the first edge precedes the second edge.

As shown, edge information is computed for all of the keys. The keys are stored as a lookup table (LUT) or in another suitable format. The set of keys represent all adjacency possibilities surrounding a reference pixel RP. Equivalently, no adjacency configuration outside this set of keys is possible. Notably, all pixel information is preserved, meaning that the image processing methods does not round or truncate pixels of an input image. In addition, every edge (or vector from edge in to edge out) is net counterclockwise relative to the center oriented as illustrated by the arrows. All dots other than the dot of the reference pixel RP represent the outgoing link points for a particular edge or arrow. Key 255 represents a solid area of pixels with no edges, and key 000 represents a single pixel with no surrounding pixels. As may be appreciated, every key, except for keys 000 and 255, has at least one non-trivial edge. Each non-trivial edge has two points. When one projects any key sequence [1 . . . 254] to a directed graph (where each key is a node and each edge is a graph edge), then every node has equal out and in degrees. Therefore, by Euler's Theorem, a traversal along any edge will result in a closed polygon. This allows image processing methods to produce closed polygons.

As may be further appreciated, keys 85 and 170 represent maximal connectors (i.e., elements with the most edges, or the most arrows) of 4. That is, the number of edges per key ranges from 0 to 4. Each edge is ordered counterclockwise from the upper left corner, every edge, except in key 255, has at least three points, and every edge, except in keys 0 and 255, connects to every other edge. The description below makes reference to solid points, where a solid point is a point or pixel in a key that is not adjacent to an edge. For example, key 223 has five solid points (coordinate points or pixels 7, 0, 1, 2, 3) and key 216 has zero solid points.

In example embodiments, pixel link ambiguities are resolved by the edge point sequence. For example, referring to the coordinate points of the pixel grid in key 005, both edges share points (1, 0) and (0, 0) where the points are referred to in (column, row) format. Also, the two edges share link points: (1, −1), (1, −1). Despite the point equivalence, the sequence of the red and blue edges distinguishes the "sense" of the point and thereby disambiguates the shared reference. This is a unique feature of image processing methods according to example embodiments that affords improved deciding power over algorithms that treat pixels as isolated entities.

Edges can be constructed counterclockwise (as is the convention in FIGS. 4A to 4D) or clockwise by reversing the direction of the arrows on all the edges. Each complete orientation set is functionally equivalent and valid. The total number of edges in a complete set of keys 000 to 255 is 513. Each edge can be in one of two directions (CCW or CW). Of the 2513 possible ways to orient the arrows in FIGS. 4A to 4D, only two combinations (all CW or all CCW) will result in polygon creation. This means the ratio between an edge set that guarantees polygon (correct) and not (incorrect) is $1:2^{512}$ ($1:1.34\times10^{154}$). This is a unique fingerprint of image processing methods according to example embodiments.

Figure 4A:
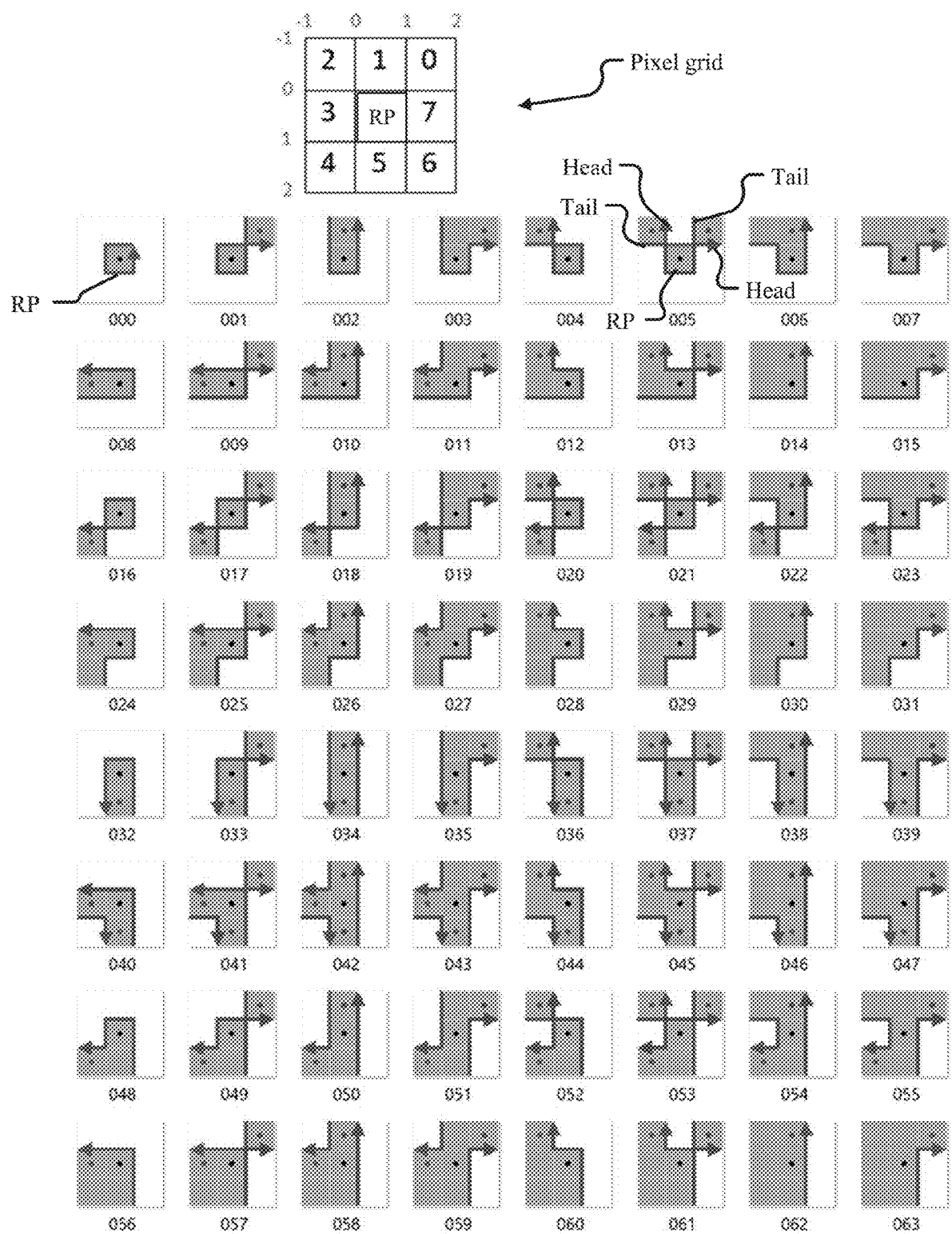
FIGS. 4A to 4D illustrate a plurality of keys according to at least one example embodiment.
Figure 4B:
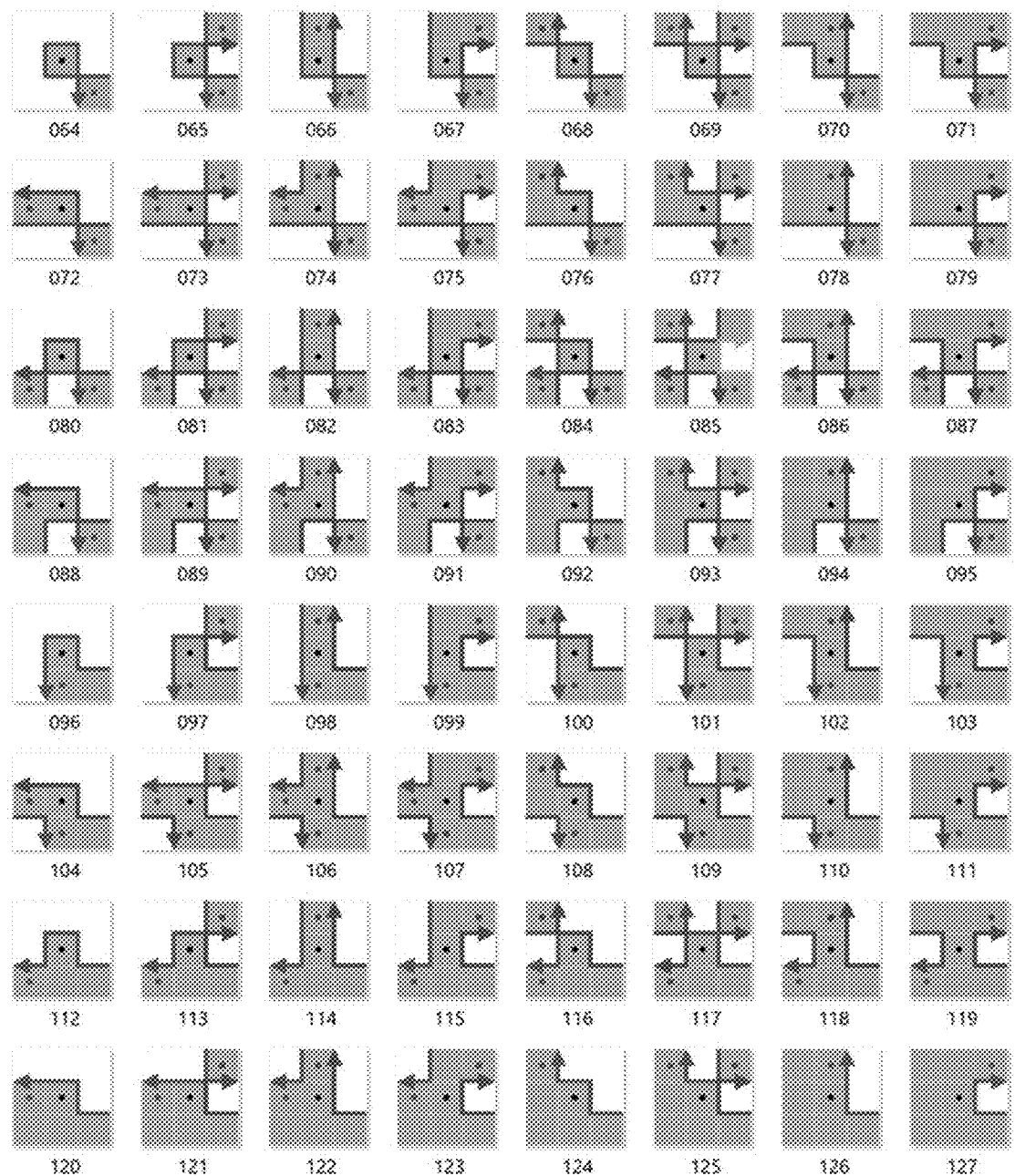
Figure 4C:
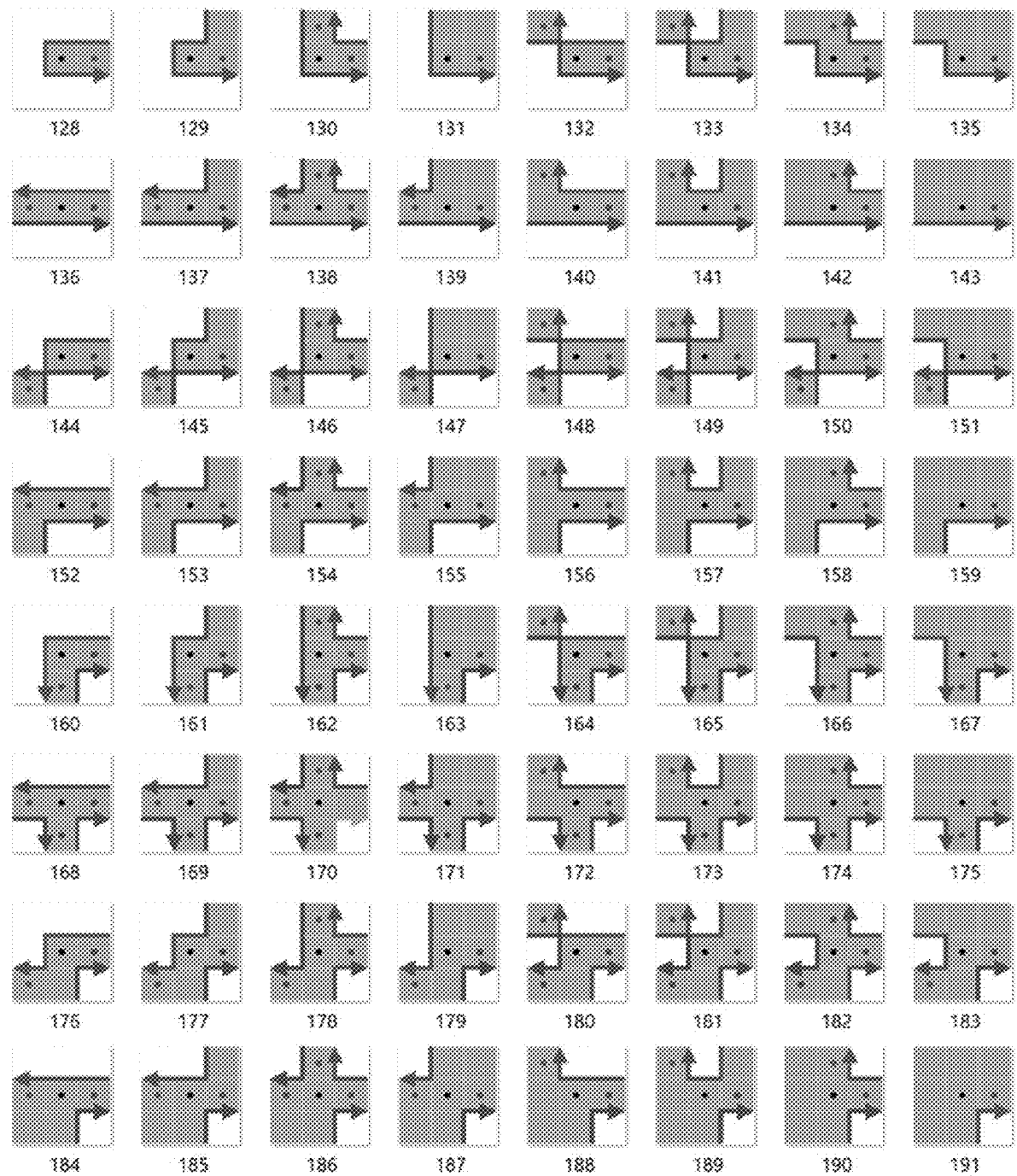
Figure 4D:
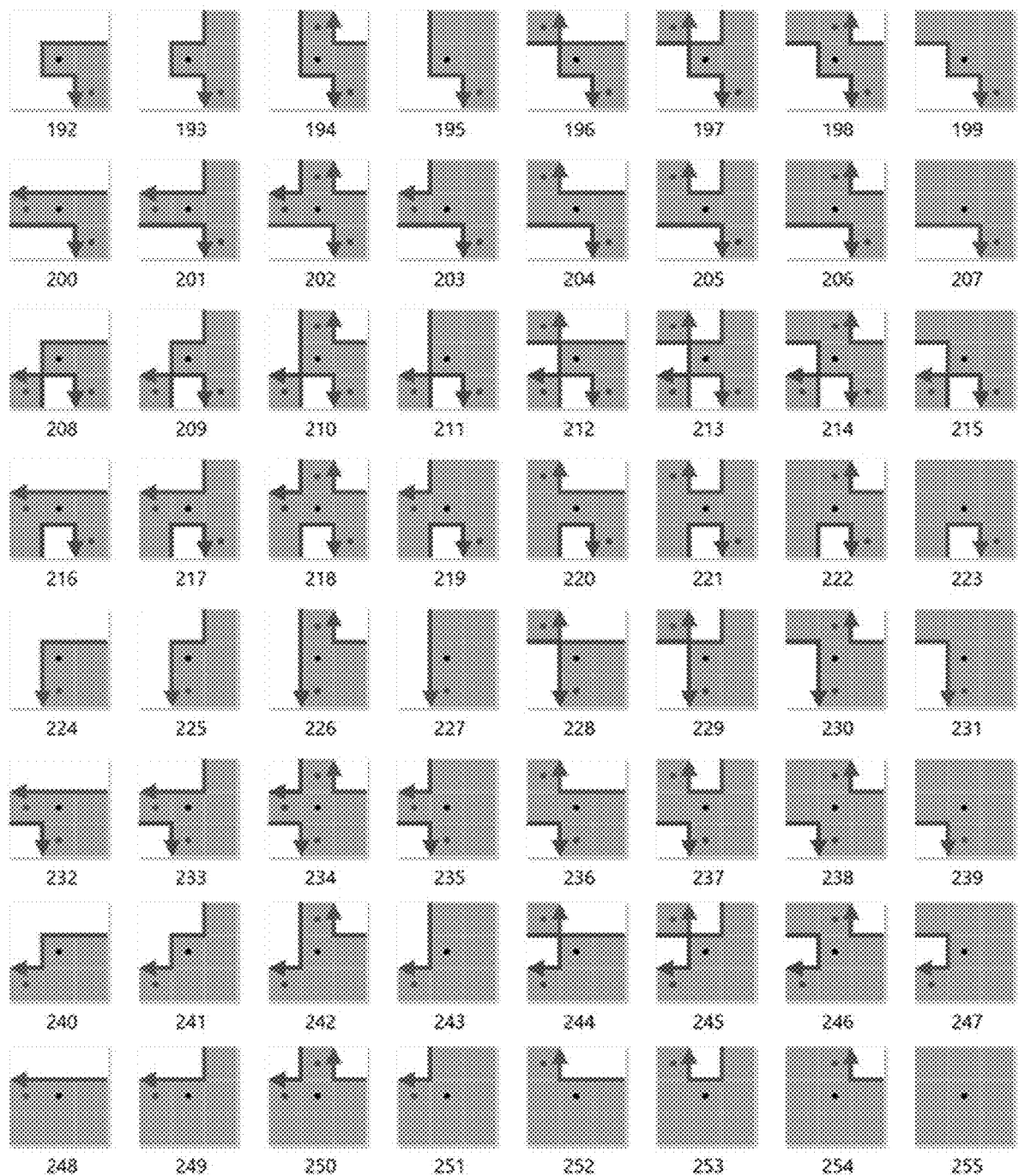

Each key in FIGS. 4A to 4D is formed from a natural key that assumes that the examination of the Moore neighborhood begins at the upper right pixel. A natural key is a key that maps one-to-one to a byte of information (or eight pixels worth of information) in the 1-bit per pixel input image. In other words, the pixel grid in FIG. 4A is considered a natural key because the states of each pixel in the Moore neighborhood of the reference pixel RP correspond to the binary value of the key's number. For example, beginning at pixel 0 of the pixel grid and moving CCW, the states of each pixel for key 050 are 0, 1, 0, 0, 1, 1, 0, 0. Assuming pixel 0 is the LSB and pixel 7 is the MSB in a binary sequence formed from these states, the binary value of 00110010 corresponds decimal 50 (i.e., key 050). This is true for each in that the pixel states of each key correspond to a binary number that in turn corresponds to a decimal number of the key.

Alternate natural key designations may be formed by permuting the pixel grid in FIG. 4A. In total, 18 combinations are fundamentally equivalent: begin numbering the Moore neighborhood of the reference pixel RP by placing '0' in one of the boxes that is not the reference pixel RP (nine possibilities), and number the remaining boxes in a clockwise (CW) or CCW direction (two possibilities) to arrive at a total of 18 equivalent natural keys. Other ad hoc mappings can also map each of the 256 possibilities to a unique number (but may be less efficient than using one of the above described natural keys because another lookup stage (and 256 key memory map) may be needed to connect the ad hoc code to its natural key).

As discussed in more detail below, a 1-bit per pixel input image is processed by referencing the keys in FIGS. 4A to 4D.

Figure 5:
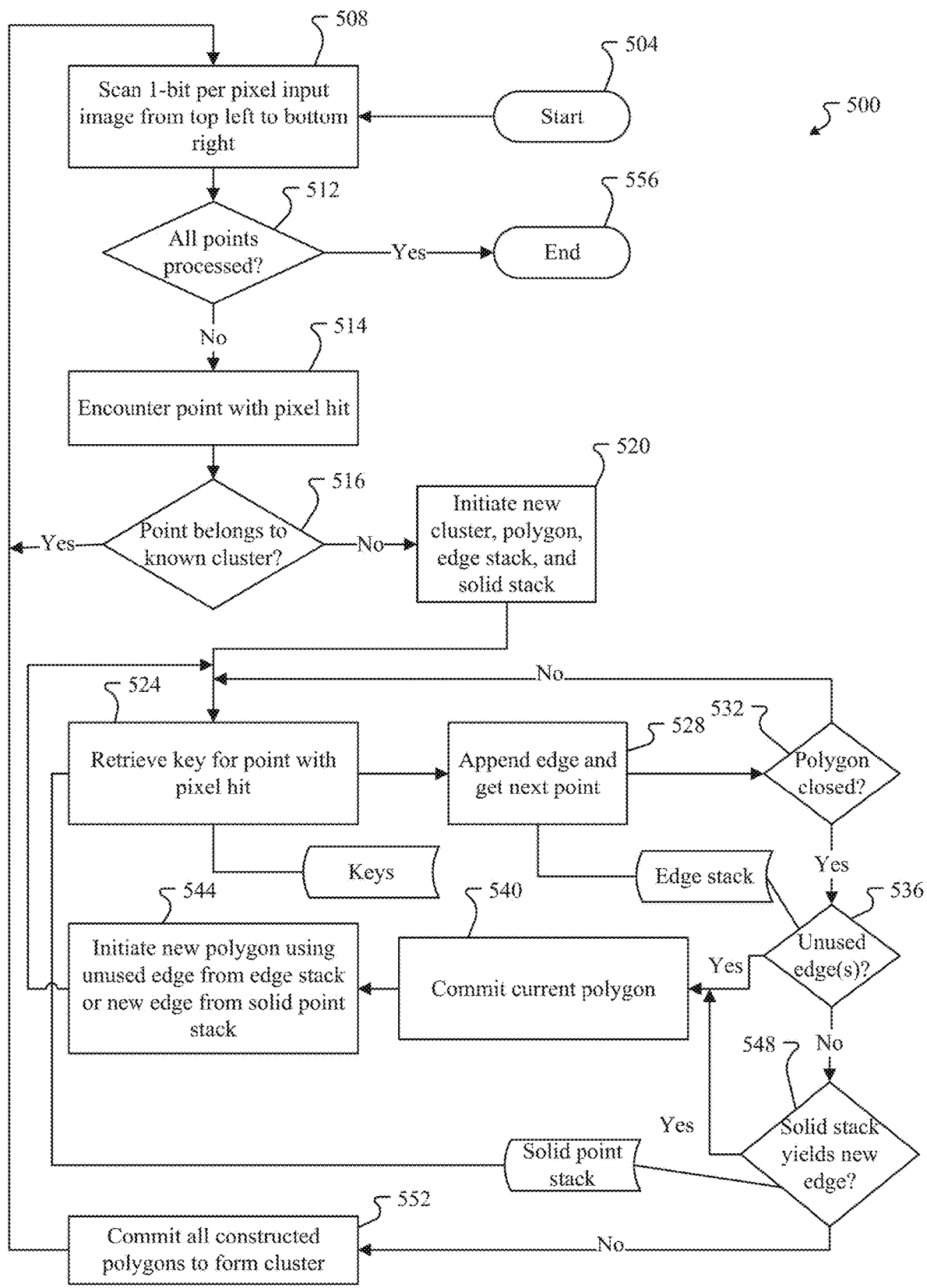
FIG. 5 illustrates an image processing method according to at least one example embodiment.

FIG. 5 illustrates an image processing method according to at least one example embodiment.

The method 500 begins at operation 504 and ends at operation 556. The method 500 (and/or one or more stages thereof) may be carried out or otherwise performed, for example, by at least one processor. The at least one processor may be the same as or similar to the processing circuitry 116 of the device 112 described above. A processor other than any processor described herein may also be used to execute the method 500. The at least one processor may perform the method 500 by executing instructions stored in a memory such as the memory 120. The instructions may correspond to one or more stages of the method 500 described below. The instructions may cause the processor to execute one or more algorithms, such as an image processing algorithm as described in more detail below.

In general, an image processing method according to inventive concepts begins by scanning for the start of an edge, creating a cluster (e.g., a cluster of one or more polygons) upon encountering a pixel hit, and adding edges to the polygon until a complete polygon is formed (i.e., until the polygon closes). A cluster may be comprised of one or more polygons that are interrelated, for example, as an outer polygon and one or more inner polygons. As discussed in more detail below each polygon may fully define a cluster or combine with one or more other polygons to fully define a cluster. During processing, the method may store information regarding the locations of unconsumed or unprocessed edges to an "edge-stack" in a memory (e.g., memory 120). If any edge in the edge-stack is not consumed by prior polygon, the method initiates a new polygon and adds edges until the polygon closes. This process may be repeated for all edges in the edge-stack. In addition, if the method encounters any solid points during the analysis, the method stores the solid points (e.g., in memory 120) and processes the solid points to see if any solid points are adjacent to a new or not yet identified edge. If so, the method creates a new polygon with the solid point adjacent to a new edge and adds edges until the polygon closes. If all edges in the edge stack are consumed, the method commits the polygon and scans for a new cluster. Upon encountering a new cluster, the above stages are repeated to form another polygon(s) that defines the new cluster. This process is iterated until the input image is fully processed. These operations are described in more detail below with reference to FIG. 5.

Operation 508 includes scanning a 1-bit per pixel input image. For example, operation 508 performs a raster scan of the input image that begins at a first row of pixels in a top left of the input image, proceeds across the first row of pixels of the input image to a top right of the input image, moves to a second row at the left of the input image to scan the second row moving left right, and so on before ending at the bottom right of the input image. However, example embodiments are not limited thereto, and other scanning directions are possible. For example, operation 508 may perform a raster style scan of the input image in any of eight scan directions: in a horizontal direction with any combination of left to right, right to left, top to bottom or bottom to top (four scan directions); or in a vertical direction with any combination of left to right, right to left, top to bottom or bottom to top (another four scan directions).

Operation 512 determines whether all points in the input image have been processed. The points may refer to corners of pixels in the input image (see the pixel grid in FIG. 4A with points having coordinates that range from (−1, −1) to (2, 2), for example). As the method 500 processes the input image, processed points are marked so that operation 512 can determine whether all points have been processed. Each process point may be marked in accordance with a coordinate system mapped to every point of the input image. An unprocessed point is a point that the method 500 has not been encountered and marked during any iteration of the operations described below. Processed points may be marked by flagging that the point is processed and storing the flag in memory 120. If all image points have been processed, the method 500 ends at operation 556. If not, the method 500 proceeds to operation 514.

Operation 514 includes encountering a point in the input image with a pixel hit. For example, the 1-bit per pixel input image is scanned until encountering a point of a pixel that has a state that was set to be the state that indicates a pixel hit.

In operation 516, the method 500 determines whether the point with the pixel hit belongs to a known cluster, for example, an existing cluster in the input image already constructed or being constructed by iterating through the below described operations of FIGS. 5 to 6B. If so, the method 500 returns to operation 508 to continue scanning the input image. If not, the method proceeds to operation 520. A point may be known to belong to a known polygon by determining whether the point has been marked in the manner described above.

Operation 520 includes initiating a new cluster, a new polygon that will belong to the new cluster, a new edge stack, and a new solid stack. As discussed above and in more detail below, the edge stack is a collection of edges stored for the method 500 and the solid point stack (or solid stack) is a collection of solid points stored for the method 500.

Operation 524 includes obtaining edge information for the point identified in operations 512 and 516. For example, operation 524 includes examining the Moore neighborhood of a reference pixel RP (e.g., a pixel hit) including the point to compute and retrieve a key from FIGS. 4A to 4D. Edge information (with the edges indicated with arrows) is obtained from the key and stored as an edge information set to begin building a new polygon. If the key contains any solid points, these solid points are stored to the solid stack for later examination. A solid point is a point or pixel in a key that is not adjacent to an edge.

Operation 528 includes appending a new edge in the direction indicated by the edge of the key (indicated by the head of the arrow) and determining a next point in the polygon (all keys have edges except for key 255). Any unused or unconsumed edges of a key are stored to the edge stack. Operation 528 is discussed in more detail below with reference to FIGS. 6A and 6B.

Operation 532 includes determining whether the polygon loop has closed for the polygon initiated in operation 520. If not, the method 500 proceeds back to operation 524. If so, the method proceeds to operation 536.

Operation 536 includes determining whether there are any unused edges in the edge stack. If so, the method 500 proceeds to operation 540. If not, the method 500 proceeds to operation 548.

Operation 540 includes committing the current polygon, which may include storing the current polygon for inclusion in the output image and/or the polygon profile once all polygons in the input image are constructed.

If operation 536 determines that there were unused edges in the edge stack, the unused edge or unused edges may indicate the existence of another polygon in proximity to the current polygon. Thus, operation 544 includes initiating a new polygon using an unused edge from the edge stack. Starting a new polygon with an unused edge from the edge stack may include retrieving a key for a pixel at the tail of the unused edge. The method 500 then returns to operation 524 to begin building the new polygon by iterating through operations 524, 528, 532, and 536. If there were no edges in the edge stack, the method 500 skips operation 536.

Operation 548 includes determining whether a solid point in the solid point stack formed in operation 524 yields a new edge. If so, the method 500 proceeds to operations 540 and 544 to commit the current polygon and begin a new polygon with the new edge by retrieving a key for a pixel at the tail of the new edge. If not, the method 500 proceeds to operation 552 to commit any polygons formed by iterating through operations 524 to 548 which forms a complete cluster defined by the polygon(s) formed by iterating through operations 524 to 548. The method 500 then returns to operation 508 to continue scanning the input image. If there are not solid points, the method 500 skips operation 548 and proceeds directly to operation 552.

Figure 6A:
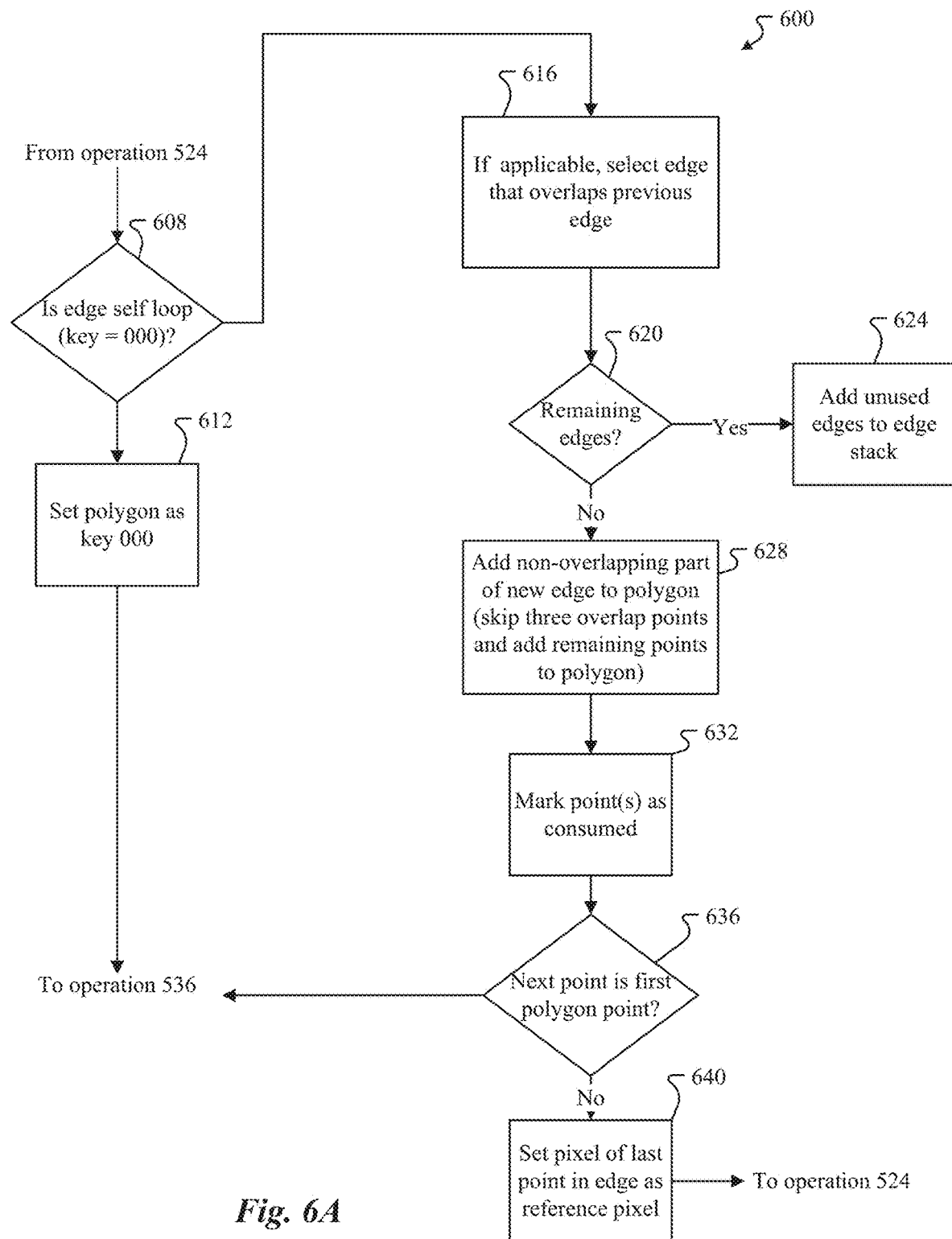

FIGS. 6A and 6B illustrate details for operations from FIG. 5 in more detail according to at least one example embodiment. In more detail, FIG. 6A illustrates a flow chart generic to at least operations 524, 528, and 532 in FIG. 5 while FIG. 6B illustrates a specific example for building a polygon in an input image to produce an output image and/or a polygon profile by following the methods 500 and 600.

The method 600 (and/or one or more stages thereof) may be carried out or otherwise performed, for example, by at least one processor. The at least one processor may be the same as or similar to the processing circuitry 116 of the device 112 described above. A processor other than any processor described herein may also be used to execute the method 600. The at least one processor may perform the method 600 by executing instructions stored in a memory such as the memory 120. The instructions may correspond to one or more stages of the method 600 described below. The instructions may cause the processor to execute one or more algorithms, such as an image processing algorithm as described in more detail below.

As noted above, operation 524 includes retrieving a key from FIGS. 4A to 4D upon encountering a pixel hit, where the pixel having the pixel hit is used as the reference pixel RP. At this stage, the method 500 may proceed to performing various operations of the method 600, starting at operation 608. The operations of the method 600 may correspond to one or more stages in the example of FIG. 6B, which illustrates the construction of a polygon of an input image having three pixels P1, P2, and P3, where pixel P1 is the pixel hit that initiates a cluster and a polygon that belongs to that cluster.

Here, it should be appreciated that the operations of FIG. 5 may be performed automatically (e.g., with little or no user intervention) once prompted to begin scanning in operation 508.

Operation 608 includes determining whether the retrieved key includes an edge that is a self-loop. If so, the method 600 proceeds to operation 612. If not, the method 600 proceeds to operation 616. The edge being a self-loop is only true for key 000 in FIG. 4A in that the arrow's head ends at the arrow's tail. In all other cases, the method proceeds to operation 616.

Operation 612 includes setting polygon points to edge information points for key 000, which closes the polygon loop (completes the polygon) in operation 648. In other words, operations 608 and 612 determine that there are no pixel hits in the Moore neighborhood of a reference pixel RP, which results in a polygon formed of a single pixel (i.e., the reference pixel RP). Stated another way, operation 612 determines the polygon to be closed with a shape corresponding to key 000. If, on the other hand, operation 608 detects one or more pixel hits in the Moore neighborhood of the reference pixel RP, the method 600 proceeds to operation 616.

Operation 616 includes selecting an edge (e.g., a portion of an edge) of the key retrieved in operation 524 that overlaps part of an edge of the partially constructed polygon. If the method arrives at operation 616 immediately after encountering a first pixel hit of a polygon and the key has more than one edge, then the method 600 may select the first edge of the key that is encountered upon examining the Moore neighborhood of the reference pixel staring at pixel 0 of the pixel grid and moving CCW to pixel 7.

Operation 620 includes determining whether there are remaining edges for the key that were not selected in operation 616. If so, the method 600 proceeds to operation 624 and adds any unused or unselected edges to the edge stack. If not, the method proceeds to operation 628.

In some cases, operations 616 and 620 are skipped, for example, when a key has only one edge. Then, it is not necessary to select an edge or determine whether there are additional edges to store to the edge stack.

Operation 628 includes adding a non-overlapping part of a new edge to the partially constructed polygon by skipping three overlap points and adding any remaining points to the polygon. Three overlap points are skipped at least in part because each edge of a key has at least three points.

Operation 632 includes marking the point(s) skipped and added as used or consumed.

Operation 636 includes determining whether the next point in the currently constructed polygon is the point that started the polygon initiated in operation 520. If not, the method 600 proceeds to operation 640. If so, the method 600 proceeds to operation 536 because the determination of whether polygon loop is closed in operation 532 of FIG. 5 is 'yes', meaning that the polygon is completed and ready for inclusion in the output image and/or the polygon profile.

Operation 640 includes setting a pixel that includes a last point in the edge of the current key as the reference pixel RP. Operation 640 results in moving the initial reference pixel RP to a next pixel in the Moore neighborhood of the initial reference pixel that has a pixel hit. Thereafter, the method 600 proceeds back to operation 524 in FIG. 5 to retrieve a key for the next pixel.

Here, it should be appreciated that the operations of FIG. 6 may be performed automatically (e.g., with little or no user intervention).

As noted above, FIG. 6B illustrates a polygon of an input image having three pixels P1, P2, and P3, where pixel P1 is the pixel hit that initiates a new cluster and a new polygon. FIG. 6B is discussed with reference operations in FIG. 6A for a specific polygon of an input image.

Here, it should be appreciated that stage 1 of FIG. 6B may correspond to operation 524 where a pixel hit for pixel P1 is encountered in the input image and set as the reference pixel RP. Subsequently, the Moore neighborhood of pixel P1 (now the reference pixel RP) is scanned to determine the that the only pixel hit in the Moore neighborhood is pixel P2, which corresponds to key 128. As may be appreciated, key 128 is retrieved because the Moore neighborhood of the reference pixel (i.e., P1) includes a single pixel hit as pixel P2. There is only one edge (arrow) in key 128, so the method begins operating on this edge as described in more detail below. In other words, the determination in operation 608 is 'no,' operation 616 is not applicable, and the determination in operation 620 is 'no,' so the method proceeds to operation 628. However, if key 128 had more than one edge (see key 136), then a different edge may be selected in operation 616 and any unselected edges are stored to the edge stack in operation 624.

As evidenced by stage 1 of FIG. 6B, pixels P1 and P2 correspond to key 128. As shown in stage 1, three points on the edge of key 128 are skipped (where points correspond to corners of pixels identified with "Skip 3" in stage 1) to yield one part of the polygon in stage 2 (operation 628). That is, the three points of key 128 that were not skipped in stage 1 are added as an edge (i.e., the edge of the polygon in stage 2) that forms part of the final polygon. At this stage, key 128 does not include any unexamined or unconsumed edges (because key 128 includes only one edge), and so no edges are stored to the edge stack (the determination in operation 620 is 'no'). Here, it should be appreciated that the first three points of an edge of a key may be skipped for processing every polygon in the input image because this number is useful for set of keys shown in FIGS. 4A to 4D. As may be appreciated by one having ordinary skill in the art, a different set of keys may result in skipping a different number of points in operation 628.

With the Moore neighborhood of pixel P1 now being processed and the edge of the polygon in stage 2 ending at pixel P2, the method proceeds by setting pixel P2 as the reference pixel in stage 2 and examining the Moore neighborhood around pixel P2 to yield key 136 because pixels P1 and P3 are pixel hits in the Moore neighborhood of the current reference pixel P2. As shown, key 136 includes two edges (arrows) as a top edge and a bottom edge.

Stage 2 includes selecting the bottom edge of key 136 because that edge overlaps the edge of the partial polygon in stage 2 and skipping three points of the bottom edge of key 136. The bottom edge of key 136 is selected because this edge overlaps the edge in the partially constructed polygon of stage 2 (operation 616). Skipping three points on the bottom edge of key 136 leaves a single point at pixel P3 that is added to the polygon in stage 3 to extend the edge in the polygon by one point (operation 628). The method then marks all of the points on the bottom edge of key 136 as being used or consumed by the polygon in stage 3 (operation 632). Because key 136 still includes a top edge that was not used or consumed in the transition between stage 2 and stage 3, the top edge of key 136 is saved to the edge stack (the determination in operation 620 is 'yes' and the edge is saved to the edge stack in operation 624). In addition, the transition between stages 2 and 3 sets pixel P3 as the reference pixel (operation 640). At this stage, the method determines that the next point in the polygon (the bottom point of pixel P3) is not the first point from the polygon in stage 2 (the bottom left point of pixel P1), and so the method continues to process the polygon (the determination in operation 636 is 'no' and the method sets pixel P3 as the reference pixel in operation 640 before returning to operation 524 to retrieve an appropriate key for pixel P3 being set as the reference pixel).

At stage 3, the method includes examining the Moore neighborhood of the reference pixel P3 for pixel hits. As shown in the input image, the only pixel hit in the Moore neighborhood of pixel P3 is pixel P2, which corresponds to key 008. Because key 008 only has one edge, operation 616 is not applicable (i.e., skipped) and the determination in operation 620 is 'no.' As in stage 2, the first three points of the edge in key 008 are skipped starting from the tail of the edge, leaving the top three points of key 008 to add to the polygon shown in stage 4 (operation 628). The three points that are skipped and the three points that are added to the polygon are marked as consumed (operation 632). In general, all skipped points in a key and all points added to the final polygon are marked as consumed.

Because the three points added to the polygon in stage 3 causes the polygon's edge to end at pixel P2 in stage 4, pixel P2 is set as the reference pixel in stage 4 (operation 640) and the method returns to operation 524 to retrieve a key of the reference pixel P2. Examining the Moore neighborhood of pixel P2 results in pixel hits at pixels P1 and P3, which corresponds to key 136. However, because the bottom edge of key 136 was marked as consumed in stage 2, only the top edge of key 136 is considered (operation 616 is skipped and the determination in operation 620 is 'no'). As shown, the first three points of the top edge of key 136 are skipped, which leaves a single point that is added to the polygon in stage 5 (operation 628). This single point is marked as consumed (operation 632). The point at which the edge ends in the polygon of stage 5 is not the first point from stage 2, so the determination in operation 636 is 'no.' Now that the edge of the polygon ends at pixel P1, pixel P1 is again set as the reference pixel (operation 640) and the method returns to operation 524 to retrieve the appropriate key.

As shown in stage 5, examining the Moore neighborhood of pixel P1 in operation 524 returns key 128 because pixel P2 is the only pixel hit. Key 128 includes only one edge and so operation 616 is skipped and the determination in operation 620 is 'no.' As shown in stage 5, the first three points of key 128 are skipped, leaving one point to add to the polygon in stage 5 (operation 628). This single point is marked as consumed (operation 632). In addition, this single point is the same point at which the polygon started in stage 2. Thus, the determination in operation 636 is 'yes' and the polygon is set to closed for inclusion in an output image and/or the polygon profile before proceeding back to operation 536.

Now with reference to FIGS. 5 to 6B, once a polygon is determined to be complete in operation 532, the next task in operation 536 is to pop edges off the edge stack (if any) to start creating a new polygon. For example, the method 500 selects a first edge saved to the edge stack in an iteration of the method of FIG. 6 that first resulted in an edge being saved to the edge stack in operation 624 (i.e., the edges saved to the edge stack are processed in a first-in, first-out (FIFO) manner). However, example embodiments are not limited thereto, and an order in which the saved edges are processed (popped off) from the edge stack may be a design parameter set based on empirical evidence and/or preference. An edge saved to the edge stack is considered as a new edge that does not belong to a previously constructed polygon. The method 500 starts proceeds to operations 540 and 544 for the new edge.

In addition, as discussed above, operation 548 determines whether there are any solid points stored to the solid stack. In this case, after all edges have been exhausted from the edge stack, the method 500 iterates through the solid points in the solid stack searching for an edge that does not belong to an already constructed polygon (a new edge). If such a solid point exists, the method 500 proceeds to operations 540 and 544 to initiate a new polygon.

Figure 7A:
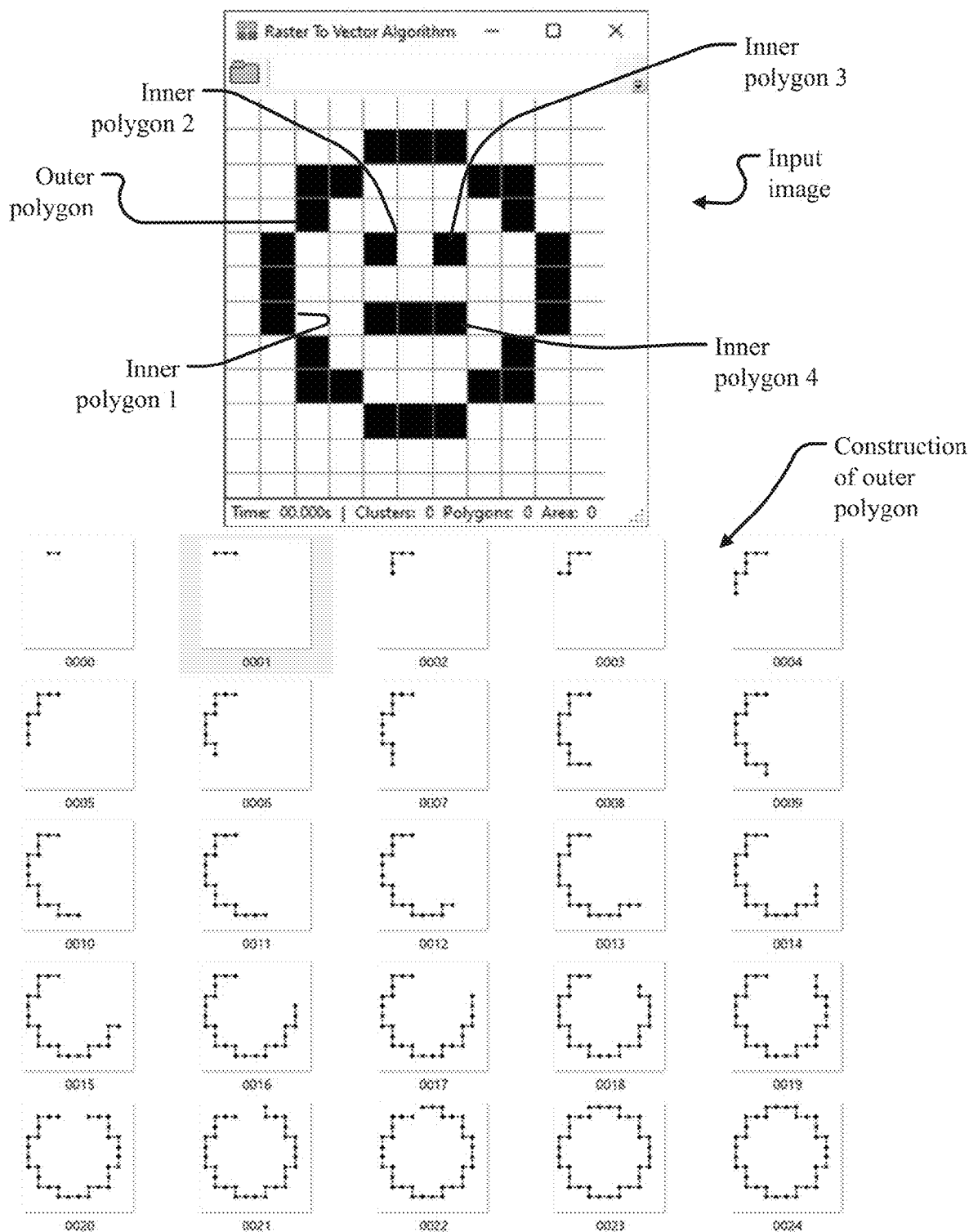

The above-described operations of FIGS. 5 to 6B may be summed up with the following pseudocode:

1. Main(image 1-bit image (each cell is a "hit" or a "miss"))
   1. For each (point in 1-bit image from Top Left to bottom Right)
      1. If (point is miss or point has been processed) continue
      2. ProcessPoint(point)
2. ProcessPoint(point)
   1. Initialize cluster, Polygon, edgeStack, solidStack
   2. Do
      1. edgeInfo=GetEdgeInfoForPoint(point)
         1. point=AppendAndGetNextPoint(edgeInfo)
         2. if (edgeInfo HasAvailableEdge)
            1. push edgeInfo onto edgeStack
         2. if (point is Invalid)
            1. point=GetNextStackPoint( )
   3. While point is valid
   4. Remove all empty Polygons
3. GetEdgeInfoForPoint(point)
   1. If point visited return cached EdgeInfo
   2. Scan hits and misses directly surrounding point
   3. Key=Encode per FIGS. 4A to 4D
   4. Get EdgeInfo block corresponding to Key
   5. Add point to cluster
   6. Cache and return EdgeInfo
4. AppendAndGetNextPoint(edgeInfo)
   1. If Key is 0, add points and done (See key 000 represents)
   2. Materialize edgeInfo and translate to point center
   3. Skip first three points on edge and add remaining points to active Polygon
   4. Mark edgeInfo link Point as consumed
   5. Set last link point to this edgeInfo center
5. GetNextStackPoint( )
   1. while (edgeStack has Any)
      1. edgeInfo=pop edgeStack
      2. if (edgeInfo.HasAvailableEdge( )
         1. point=edgeInfo.Center;
         2. Close current Polygon and create new one;
         3. return point;
      2. current Polygon=invalid;
   3. if (solidStack has Any)
      1. point=pop solidStack
   4. return point;

FIGS. 7A and 7B illustrate how image processing methods according to example embodiments construct a series of polygons (e.g., for an output image) based on an input image. FIGS. 7A and 7B may be formed according to the methods described above with reference to FIGS. 1 to 6B.

As shown in FIG. 7A, the input image is a face that includes five total polygons: an outer polygon of the face, an inner polygon 1 of the face, two inner polygons 2 and 3 for the eyes, and an inner polygon 4 for the mouth. As may be appreciated, image processing methods according to example embodiments cause the outer polygon to be formed in a CCW direction and the inner polygons 1 to 4 to be formed in a CW direction. Each dot in FIGS. 7A and 7B represents a point of a pixel on the input image. Construction of polygons 2 and 3 is not shown because the eyes of the face are singular pixels with no pixels in their respective Moore neighborhoods, meaning that each polygon 2 and 3 corresponds to key 000. The example in FIGS. 7A and 7B illustrates a cluster with four distinct groups of pixels defined by polygons, key sequences for each polygon, the polygon orientation (CCW for external polygons and CW for internal polygons), points that get added for each iteration of the loop, and stage sequence and loop terminations.

Figure 8:
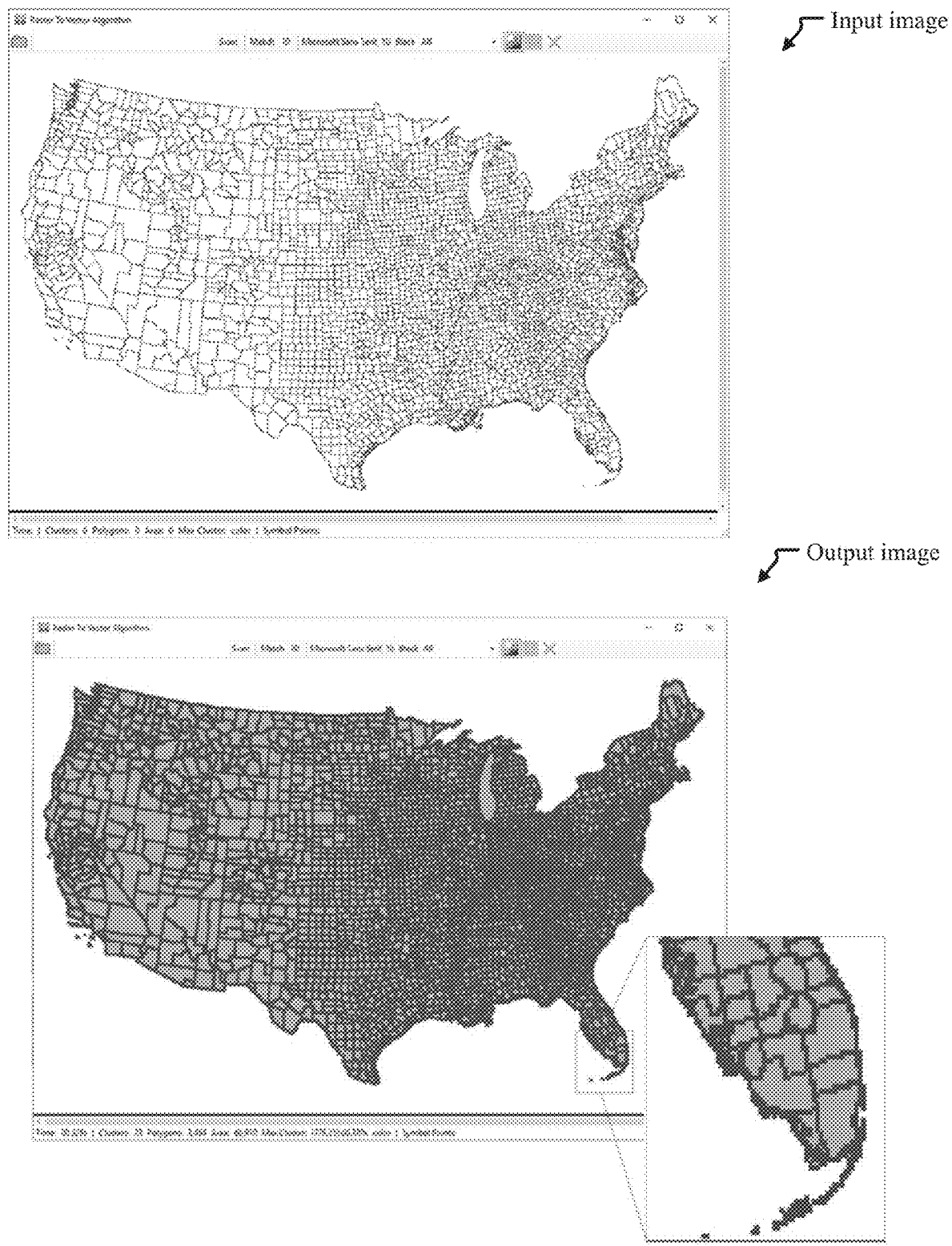
FIG. 8 illustrates another example of how image processing methods according to example embodiments construct a series of polygons based on an input image.

FIG. 8 illustrates example of how image processing methods according to example embodiments construct a series of polygons for (e.g., for an output image) based on a complicated input image. Related art image processing techniques would struggle to correctly identify all the clusters and polygons in the input image of FIG. 8 due to the large number of branches and intersections and possible ambiguous pixel cases that should be deterministically resolved. However, executing image processing methods according to FIGS. 1 to 6B produces an accurate output image and one or more characteristics of the output image in 0.328 s using a standard personal computer. In the output image, the inner and outer shaded areas are the inner and outer polygons bounded by lines. The image processing algorithm described herein correctly identifies 3,454 polygons, 23 clusters, a total pixel area of 60,910 in 0.328 s. Despite the complexity of FIG. 8, no polygon or edge is missed. Zooming in on any region of the output image shows that each polygon was faithfully traced with no rounding error. Furthermore, every run of the algorithm is deterministic over the same image (i.e., over the same image, the algorithm always or almost always produces the same results).

In the example of FIG. 8, the polygons may define county boundaries for the 48 contiguous states in a map of the United States. Although not explicitly illustrated, it should be appreciated that at least some of the usefulness associated with producing the output image in FIG. 8 is through post-processing the output image. For example, given that each county is correctly identified in the output image, the output image may be used in a dashboard or other web-based application that associates data with each county (e.g., demographic data, weather data, and/or any other useful data). A user of such a dashboard may be presented with the option to select or hover a mouse over a particular county to show the relevant data associated with that county. Thus, it may be said that example embodiments relate to accurately processing an input image to produce an output image, where the output image may undergo additional operations to improve the usefulness of the output image.

Figure 9:
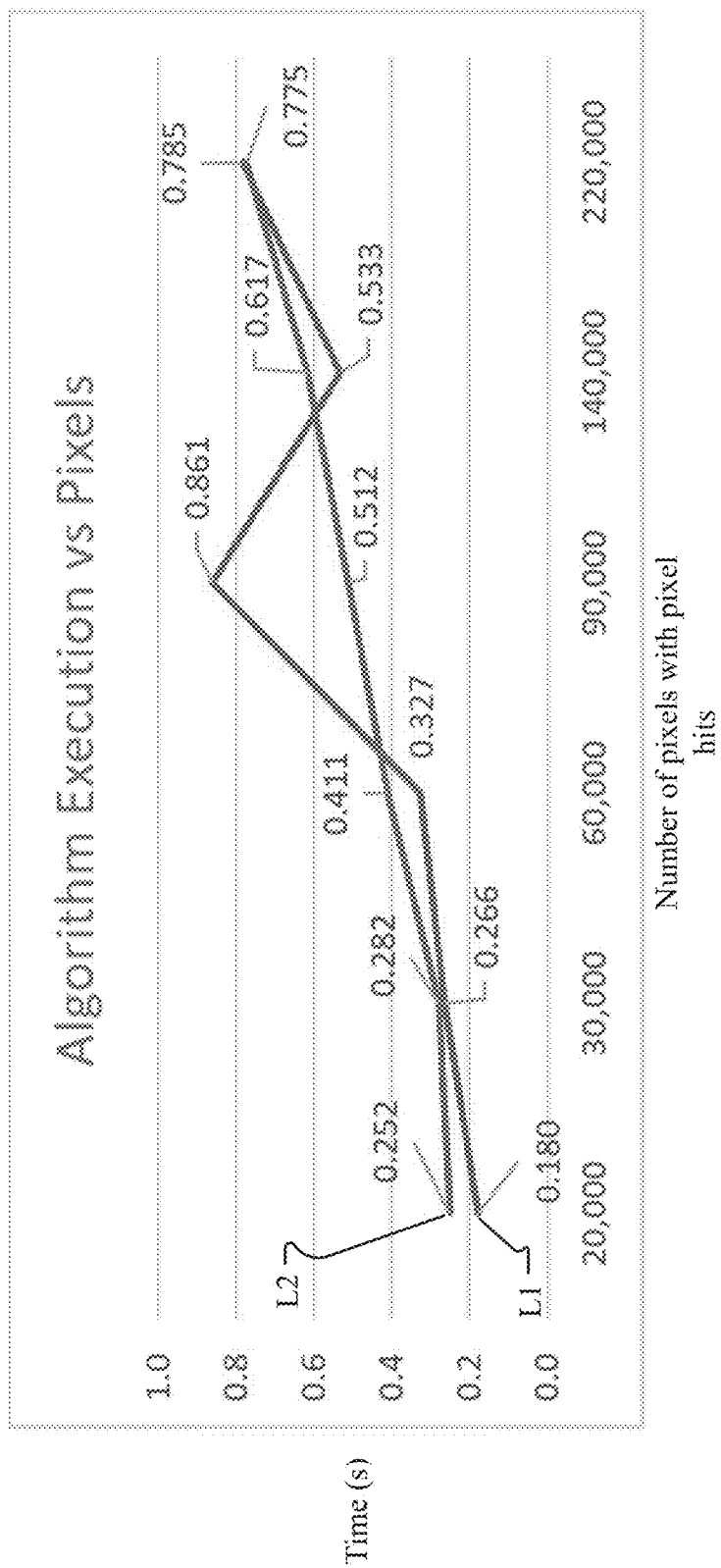
FIG. 9 illustrates a graph showing an amount of time taken for image processing algorithms according to example embodiments versus a number of pixels to be processed.

FIG. 9 illustrates a graph showing an amount of time taken for image processing algorithms according to example embodiments versus a number of pixels to be processed.

The graph in FIG. 9 shows samples of the algorithm performed on various images where the pixel count is the number of pixels with pixel hits (e.g., a number of black pixels in the image on a white background). Line L1 illustrates algorithm runs by pixel count. Line L2 is proportional to the square root of the number of pixels. Logically an algorithm is Edges*O(n)+(SolidPoints+EmptySpace)O ($n^2$). Therefore, for a sparse image with thin lines, the algorithm tracks to O(n). As the image's empty space and or solid pixels between the edges increases (i.e., "thick lines"), the algorithm's performance is: $O(n^2)$.

FIG. 10 illustrates example of how image processing methods according to example embodiments construct a series of polygons for an output image based on a complicated input image. In this example, the algorithm correctly identifies 437 polygons (which are composed of provincial bounds and text). All provincial boundaries are correctly traced. Also the position of the text within each boundary is also known because the text characters are also polygons with a known position.

FIGS. 1-10 have been discussed with respect to image processing algorithms that process input images having a white background with black pixels. However, example embodiments work equivalently for the opposite case (i.e., an input image with a black background and white pixels). If the 1-bit bitmap has any contrast, the contrast is used to process the input image. Any suitable bitmap can be used as an input that transforms the space (even adaptively) to a "hit" and "miss" 1-bit bitmap.

For grayscale or color images, the image processing algorithm may use any suitable continuum of hit/miss criteria (e.g., 40%, 50%, 60%, 70% 80% or any other distribution.) Also, for all the hit/miss criteria, the algorithm can be run in parallel as each run would be independent. The resulting polygons for each bit depth may be superimposed to create a consensus polygon contour.

In addition, clockwise conventions and counterclockwise conventions are equivalent. Furthermore, any encoding permutation for the keys of FIGS. 4A to 4D may also result in an equivalent implementation of the algorithm.

In view of the above, it should be appreciated that an image processing algorithm according to example embodiments runs over any 2D image surface and identifies all clusters and polygons. In scanning all pixels in a 2D image, the algorithm is bound to run in a maximum of $O(n^2)$. If, however, the user selects a boundary of a cluster, the algorithm may be adapted to trace only that polygon outline. In this mode, the algorithm may run in O(n) time.

Image processing algorithms according to example embodiments may further provide the ability process images other than 2D images. For example, in a hypercube variation, the algorithm for a 2-Cube case (Cartesian plane), scales to n-Cubes. For an n-Cube, the adjacent n-Cubes are $3^n-1$:

1) Each dimension allows choices (−1, 0, 1) unit travel, by multiplication rule=>$3^n$ 2) (0, 0, 0) is the center from which no travel occurs=>−1

In the case of a 3-Cube, there are $3^3-1=26$ neighbors. Each neighbor can be a pixel hit or pixel miss. Therefore, the total number of edgeInfo blocks is $2^{3^3-1}=2^{26}=67,108,864$. The general formula for the number of edgeInfo blocks required for an n-Cube is: $2^{3^n-1}$.

The same overview algorithm applies to n-Cubes with the following definitions:
Edge=(n−1)flat
Polygon=n-Flat
Solid=n-Flat In general, the algorithm may scan for the start of an edge, initiating a new cluster and a new polygon for the new cluster, and add edges until polygon closes. This may include adding unconsumed edges on an edge stack. If any edge on an edge stack was not consumed by prior polygon, create a new polygon with the unconsumed edge and add edges until the polygon closes. This may be repeated for all edges on the edge stack. If there were any solid points, process all of those to see if any are adjacent to a new edge. If so, create a new polygon with the new edge and add edges until the new polygon closes. If all edges consumed, commit all polygons as a cluster, scan for a new cluster, and repeat.

For example:

2D: Edge=line (1-Flat), Polygon=plane (2-Flat), Solid=plane (2-Flat)

3D: Edge=plane(2-Flat), Polygon=3D solid (3-Flat), Solid=3D solid (3-Flat)

4D: Edge=3D solid (3-Flat), Polygon=4-Flat, Solid=4-Flat

And so on.

Figure 11:
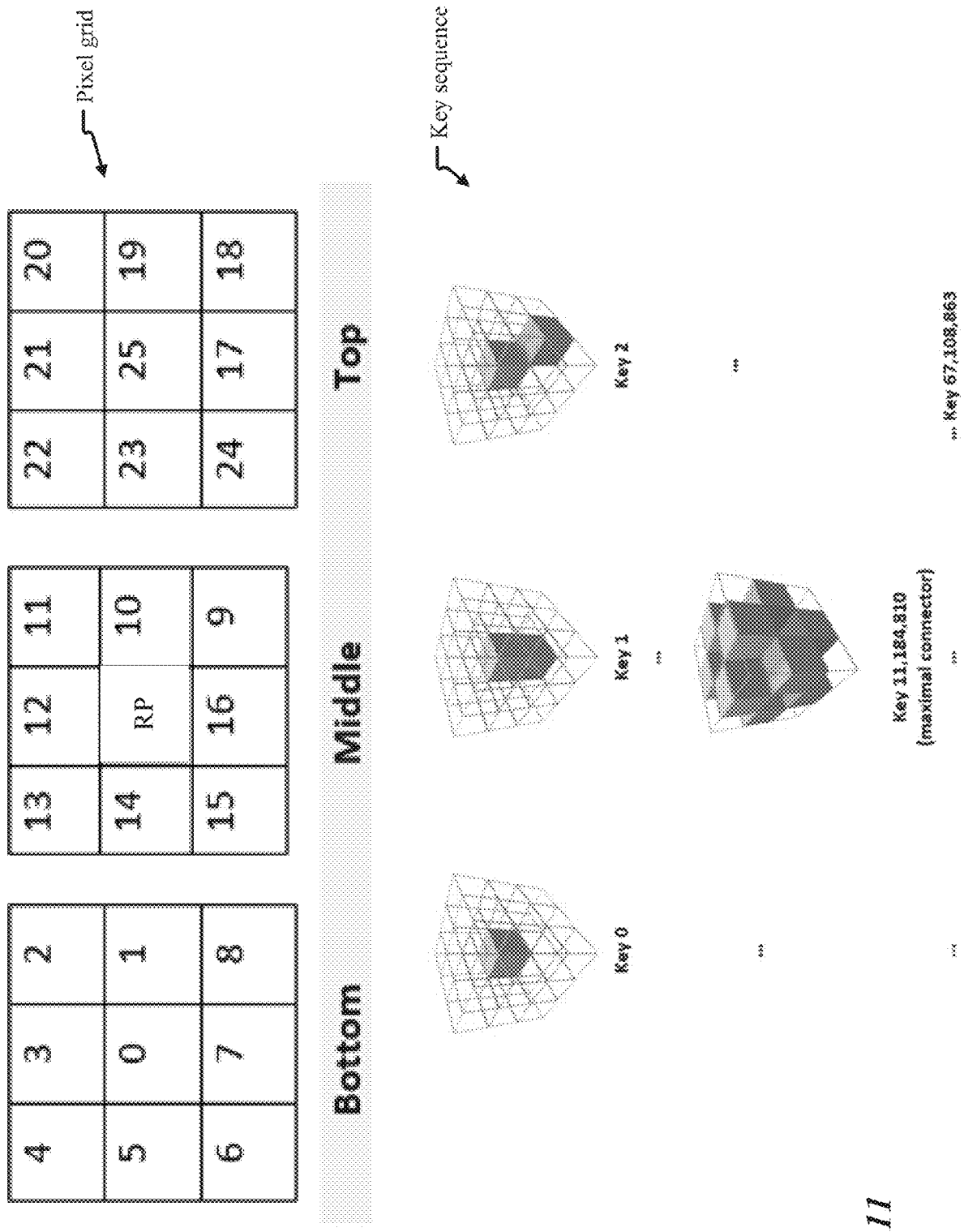
FIG. 11 illustrates a pixel grid and a plurality of keys for a three-dimensional image according to at least one example embodiment.

In a 3D image, for the 26 cubes surrounding the center of a 3-cube, choose a cell address encoding that spirals CCW upward (right-handed system) such as shown in the pixel grid of FIG. 11, which results in the illustrated key sequence (abbreviated for the sake of brevity but constructed in the same manner as the keys in FIGS. 4A to 4D).

FIG. 12 illustrates combining 3D pieces into growing volumes. In the 2D case described with reference to FIGS. 1 to 10, edge linking forms polygon boundaries. In the 3D case, surface linking forms volume boundaries. Recall that any combination of keys [1 . . . 67,108,862] will result in a complete definition. To illustrate how two arbitrary keys join (analogous to the 2D join procedure) take key 3981 to key 3981 in FIG. 12.

Combining the top "notch" of both keys forms a new volume boundary shown as the rectangular notch on the top of the "Linked result". Every 3D Key (other than the first and last keys) has equal in and out degree as defined by the edge surface. Using the same linking mechanism for processing 2D images (see FIGS. 5 to 6B), the volume boundaries grow and eventually self-close to form completely defined boundaries. By analogy, 3D groups of pixels are volumes of contiguous pixels, and 3D polygons are the surfaces that fully separate all volumes in the 3D space.

Figure 13:
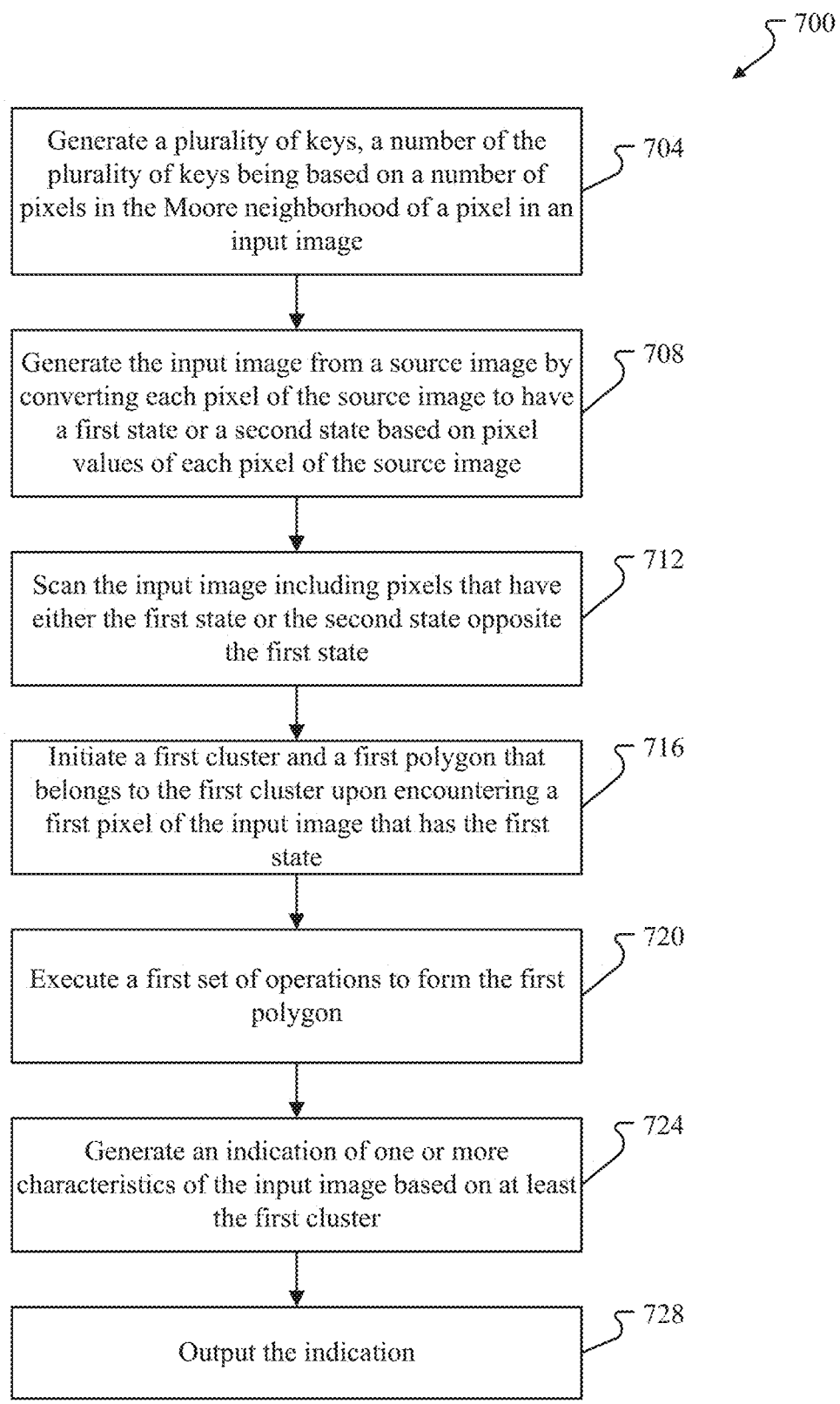
FIG. 13 illustrates a method according to at least one example embodiment.

FIG. 13 illustrates a method 700 according to at least one example embodiment.

The method 700 (and/or one or more stages thereof) may be carried out or otherwise performed, for example, by at least one processor. The at least one processor may be the same as or similar to the processing circuitry 116 of the device 112 described above. A processor other than any processor described herein may also be used to execute the method 700. The at least one processor may perform the method 700 by executing instructions stored in a memory such as the memory 120. The instructions may correspond to one or more stages of the method 700 described below. The instructions may cause the processor to execute one or more algorithms, such as an image processing algorithm as described in more detail below.

Operation 704 includes generating a plurality of keys shown, where a number of the plurality of keys is based on a number of pixels in the Moore neighborhood of a pixel in an input image to be processed. For example, operation 704 generates the plurality of keys shown in FIGS. 4A to 4D such that each key corresponds to one possible permutation of states of pixels within the Moore neighborhood of a reference pixel RP.

Operation 708 includes generating the input image from a source image by converting each pixel of the source image to have the first state or the second state based on pixel values of each pixel of the source image. As discussed above with reference to FIGS. 1 to 12, if the source image is a color image, the color image may be converted to grayscale according to known techniques. The grayscale image may be subjected to a thresholding process to generate the input image as a 1-bit per pixel image (e.g., each pixel is black or white). In at least one example embodiment, the first state corresponds to black pixel while the second state corresponds to a white pixel. However, in another embodiment, the first state may correspond to a white pixel and the second state may correspond to a black pixel.

Here, it should be appreciated that operations 704 and 708 may be optional operations. In at least one example embodiment, the image processing device 112 receives the input image that has already undergone operations 704 and 708 (e.g., these operations are performed by the source device 104 or by some other device not illustrated in the system 100).

Operation 712 includes scanning the input image including pixels that have either the first state or the second state opposite the first state. For example, operation 712 scans the input image in any one of the eight ways mentioned with reference to operation 508.

Operation 716 includes initiating a first cluster and a first polygon upon encountering a first pixel of the input image that has the first state. As discussed in more detail below, the first polygon may partially define or completely define the first cluster.

Operation 720 includes executing a first set of operations to form the first polygon. For example, operation 720 includes iterating through the operations described with reference to FIGS. 5 and 6A to form the first polygon in the same or similar manner as that shown for the example in FIG. 6B. As may be appreciated in view of the descriptions of FIGS. 5, 6A, 6B, and 13-15, one or more operations in the methods 800 and/or 900 may define additional details of the first set of operations executed in operation 720.

Operation 724 includes generating an indication of one or more characteristics of the input image. The one or more characteristics of the input image may include information about the input image, such as some or all of the information that helps define a complete polygon profile of the input image (see, FIG. 2B, for example). For example, operation 724 generates the indication of the one or more characteristics of the input image in response to determining that the input image has been fully processed (i.e., the determination in operation 512 is 'yes'). In the event that the one or more characteristics of the input image includes a polygon profile of the input image, then the polygon profile of the input image may include polygon profile information for the first polygon and other polygons (if any) formed during the execution of the methods in FIGS. 5 and 6A. Generating the indication in operation 724 may further include generating an output image that is a representation of the input image formed by iterating through the operations in FIGS. 5 and 6A. Still further, the indication may include information in addition to information for the polygon profile of the input image. For example, operation 724 may include examining the information in the polygon profile for a processed input image to generate the additional information, where the additional information may include objects identified and labeled by an object recognition algorithm using the polygon profile as an input and/or any other useful information that may be gleaned from the polygon profile. Additionally or alternatively, operation 724 may include associating data with polygons of the output image for inclusion in an interactive dashboard or other interactive application.

Operation 728 includes outputting the indication generated in operation 724, which may include outputting the indication (e.g., the polygon profile of the input image and/or the output image) to a display or user interface of the output device 128, to a memory (e.g., memory 120 or other local or remote memory) that stores the indication in a format that is capable of display, and/or to another suitable destination. The indication may be audio and/or visual in nature.

Figure 14:
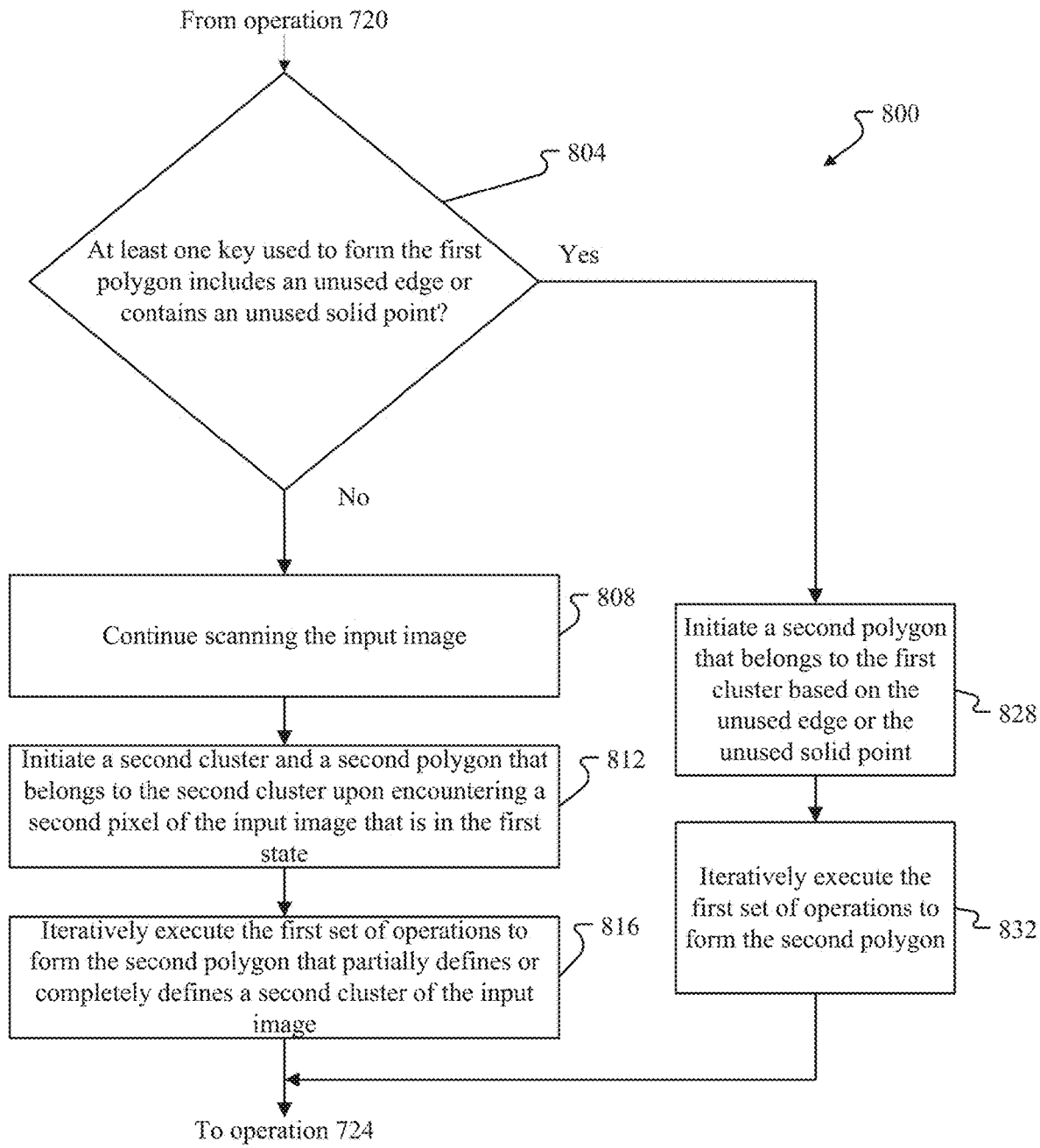
FIG. 14 illustrates a method according to at least one example embodiment.

FIG. 14 illustrates a method 800 according to at least one example embodiment. The method 800 may be performed in addition to all operations or selected operations of the method 700. For example, in at least one example embodiment, the method 800 may take place between operation 720 and operation 724.

The method 800 (and/or one or more stages thereof) may be carried out or otherwise performed, for example, by at least one processor. The at least one processor may be the same as or similar to the processing circuitry 116 of the device 112 described above. A processor other than any processor described herein may also be used to execute the method 800. The at least one processor may perform the method 800 by executing instructions stored in a memory such as the memory 120. The instructions may correspond to one or more stages of the method 800 described below. The instructions may cause the processor to execute one or more algorithms, such as an image processing algorithm as described in more detail below.

Operation 804 includes determining whether at least one key used to form the first polygon includes an unused edge or contains an unused solid point (see, e.g., operations 536 and 548 in FIG. 5). If so, the method 800 proceeds to operation 808. If not, the method 800 proceeds to operation 828.

If the determination in operation 804 is 'no,' this may be an indication that the first polygon completely defines the first cluster of the input image. For example, as discussed above with reference to FIGS. 5A to 6B, the first polygon is fully formed and completely defines the first cluster when an edge of the first polygon closes on itself (i.e., a head of the edge meets a tail of the edge at a point of a pixel). In other words, the first polygon completely defining the first cluster may automatically follow as a result of operation 804 being a 'no' determination.

Operation 808 includes continuing to scan, for example, in response to a 'no' determination in operation 804, the input image. For example, the scan continues in the same fashion as that selected in operation 712.

Operation 812 includes initiating a second cluster and a second polygon that belongs to the second cluster upon encountering a second pixel of the input image that is in the first state. That is, the determination in operation 512 of FIG. 5 is 'no' so the method continues searching for a pixel hit, where the pixel hit in this case is determined by the second pixel having the first state, which initiates the second cluster and the second polygon.

Operation 816 includes iteratively executing the first set of operations to form the second polygon that partially defines or completely defines the second cluster of the input image. For example, operation 816 includes iterating through the operations of FIGS. 5 and 6A until an edge of the second polygon (which is under construction) closes on itself to partially define the second cluster (as in operation 540) or completely define the second cluster (as in operation 552). Thereafter, the method 800 returns to operation 724 to generate the indication based on output of the method 800.

As noted above, operations 808 to 816 relate to forming two separate polygons, where the first polygon defines a complete cluster and the second polygon partially defines or completely defines a second cluster. However, in some cases, the first polygon and the second polygon may combine to completely define the first cluster (see e.g., the outer polygon and inner polygon 1 of the face in FIGS. 7A and 7B). In this case, the determination is operation 804 is 'yes' in that the key(s) used to form the first polygon contains an edge in the edge stack or a solid point in the solid point stack generated during one or more iterations of operations in FIGS. 5 and 6A, thereby indicating that the first cluster may not yet be fully defined.

If the determination in operation 804 is 'yes,' this may be an indication that the first polygon partially defines the first cluster of the input image. In other words, the first polygon formed by the method 700 may define an outer boundary of a cluster but not the inner boundary of the cluster (see, e.g., the outer polygon in FIG. 7A that defines an outer boundary of a cluster but not the inner boundary). The first polygon completely defining the first cluster may automatically follow as a result of operation 804 being a 'yes' determination.

Operation 828 includes initiating a second polygon that belongs to the first cluster based on the unused edge or the unused solid point. Operation 828 may correspond to operation 544 in FIG. 5.

Operation 832 includes iteratively executing the first set of operations to form the second polygon. For example, operation 816 includes iterating through the operations of FIGS. 5 and 6A until an edge of the second polygon (which is under construction) closes on itself to fully form the second polygon. The fully formed second polygon may be inside the first polygon in the input image and combine with the first polygon to completely define the first cluster (see, e.g., the outer polygon and inner polygon 1 in FIGS. 7A and 7B). Then, the indication is then generated in operation 724 to reflect the result of operations 828 and 832.

Figure 15:
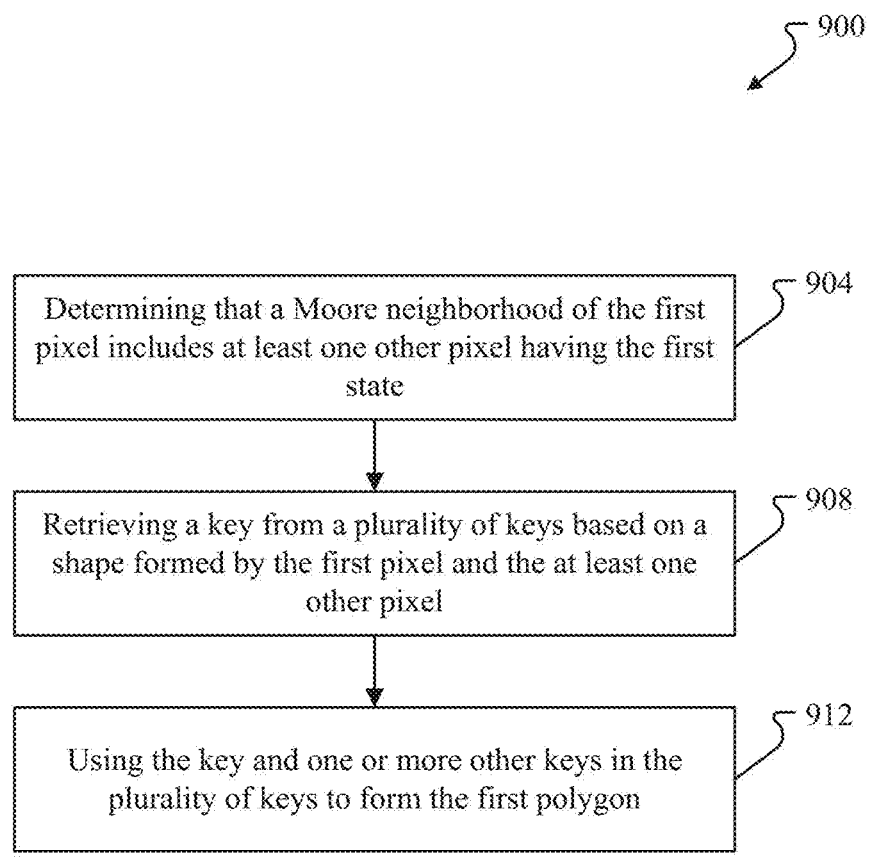
FIG. 15 illustrates a method according to at least one example embodiment.

FIG. 15 illustrates a method 900 according to at least one example embodiment. The method 900 may correspond to one or more operations in the first set of operations mentioned in the description of FIGS. 13 and 14. In at least one example embodiment, the first set of operations includes all or selected ones of the operations in FIGS. 5A to 6B. Operations in the method 900 may correspond to operations in FIGS. 5A and 6B but are described in alternative language.

The method 900 (and/or one or more stages thereof) may be carried out or otherwise performed, for example, by at least one processor. The at least one processor may be the same as or similar to the processing circuitry 116 of the device 112 described above. A processor other than any processor described herein may also be used to execute the method 900. The at least one processor may perform the method 900 by executing instructions stored in a memory such as the memory 120. The instructions may correspond to one or more stages of the method 900 described below. The instructions may cause the processor to execute one or more algorithms, such as an image processing algorithm as described in more detail below.

Operation 904 includes determining that a Moore neighborhood of the first pixel includes at least one other pixel having the first state. For example, operation 904 scans a Moore neighborhood of the first pixel in accordance with operations described above with reference to FIGS. 5A to 6B and determines that the at least one other pixel has the same, first state as the first pixel (i.e., the at least one other pixel is also a pixel hit).

Operation 908 includes retrieving a key from a plurality of keys that corresponds to a shape formed by the first pixel and the at least one other pixel (see also, operation 524 in FIG. 5). For example, as discussed above, operation 908 includes accessing a look-up table (LUT) that includes the keys in FIGS. 4A to 4D and retrieves the key based on a shape formed by the first pixel and the at least one other pixel. Here, it should be appreciated that the shaded regions of the key will include the first pixel and any other pixels in the at least one other pixel determined to be pixel hits in the Moore neighborhood of the first pixel. Operation 908 retrieves the key by matching a shape formed by the first pixel and the at least one other pixel with a shape of the key.

Operation 912 includes using the key and one or more other keys in the plurality of keys to form the first polygon. For example, operation 912 may include iterating through operations in FIGS. 5 and 6A (e.g., operations 528 (which may include the operations in FIG. 6A), 532, 536, and 548) until reaching a determination that the first polygon is fully formed (e.g., in operations 532, 540, and/or 552).

Although not explicitly shown, it should be appreciated that example embodiments may iterate through the methods 800 and 900 for the entire input image to produce the indication discussed with reference to operations 724 and 728. In addition, some or all of the operations in method 700, 800, and 900 may be performed automatically (i.e., with little or no user intervention).

Figure 16:
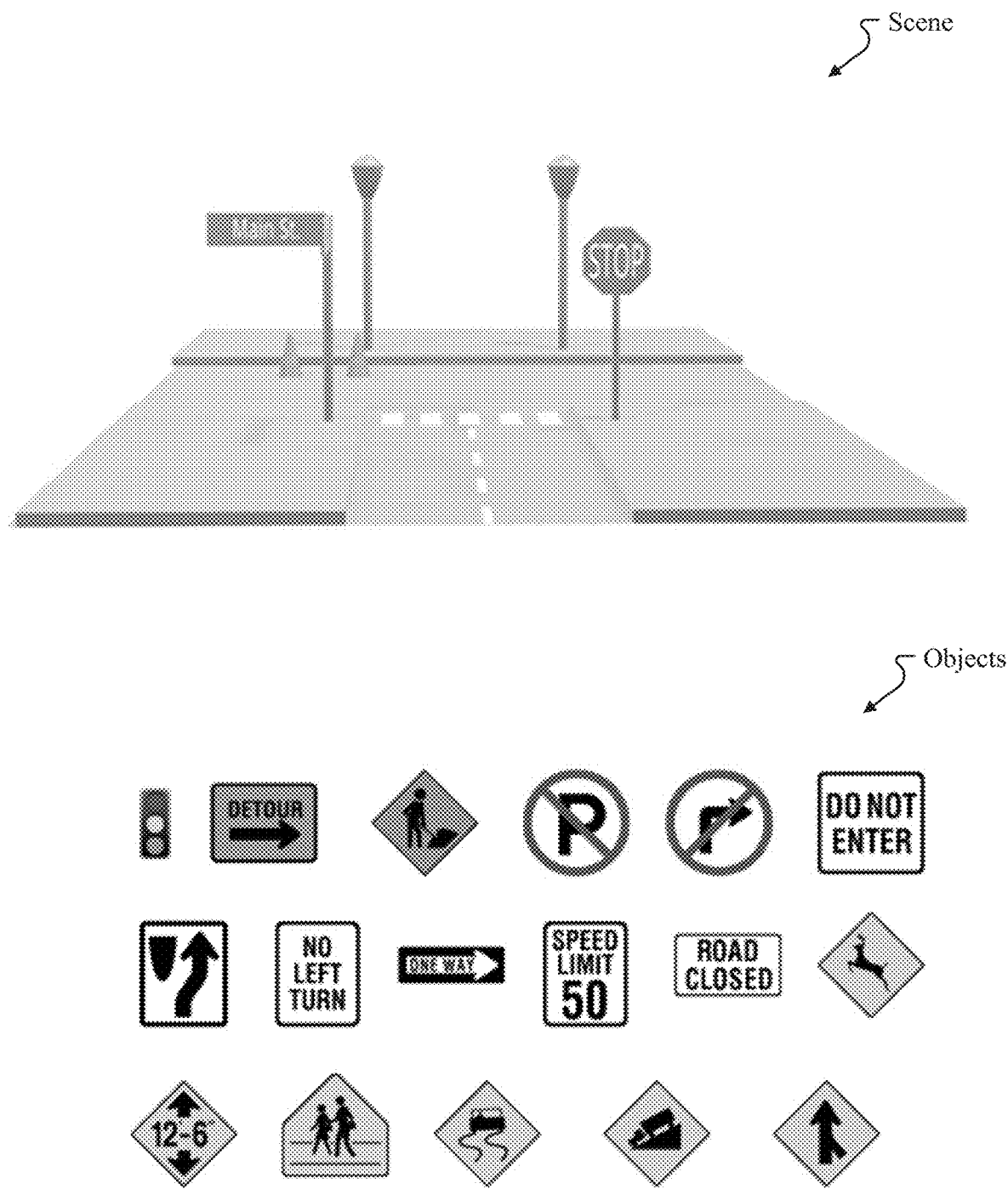
FIG. 16 illustrates an example scene and example objects capable of being processed by imaging processing methods according to at least one example embodiment.

FIG. 16 illustrates an example scene and example objects capable of being processed by imaging processing methods according to example embodiments. As shown, the scene includes a stop sign, street sign, lane divider, crosswalk, lamp posts, traffic cones, curbs, and intersection. In the real world, even more objects such as pedestrians, other cars, bicycles etc. would further complicate the analysis of the scene. Add that the scene could have road construction and is moving in real time with our vehicle and other moving objects and one has a massive computational problem. The efficiency of the algorithm according to example embodiments, however, allows real time analysis of such scenes. Because the algorithm can identify every distinguishable shape in the scene, the algorithm simplifies the work that a downstream processor needs to do. For instance, the algorithm can provide polygon information to identify the street sign, STOP sign, lamp post, and cone shapes, differentiate the lane separator from the crosswalk, differentiate the road from the curb, and recognize text "Main St." and "STOP" on the signs because these too are shapes. Algorithms according to example embodiments accurately find all polygon information and the relationship between those polygons quickly and with reduced processing power so that self-driving vehicles can operate with the same visual information a human driver would have. Furthermore, the more powerful the self-driving processor, the better because processor can operate more efficiently with the algorithm.

Figure 17:
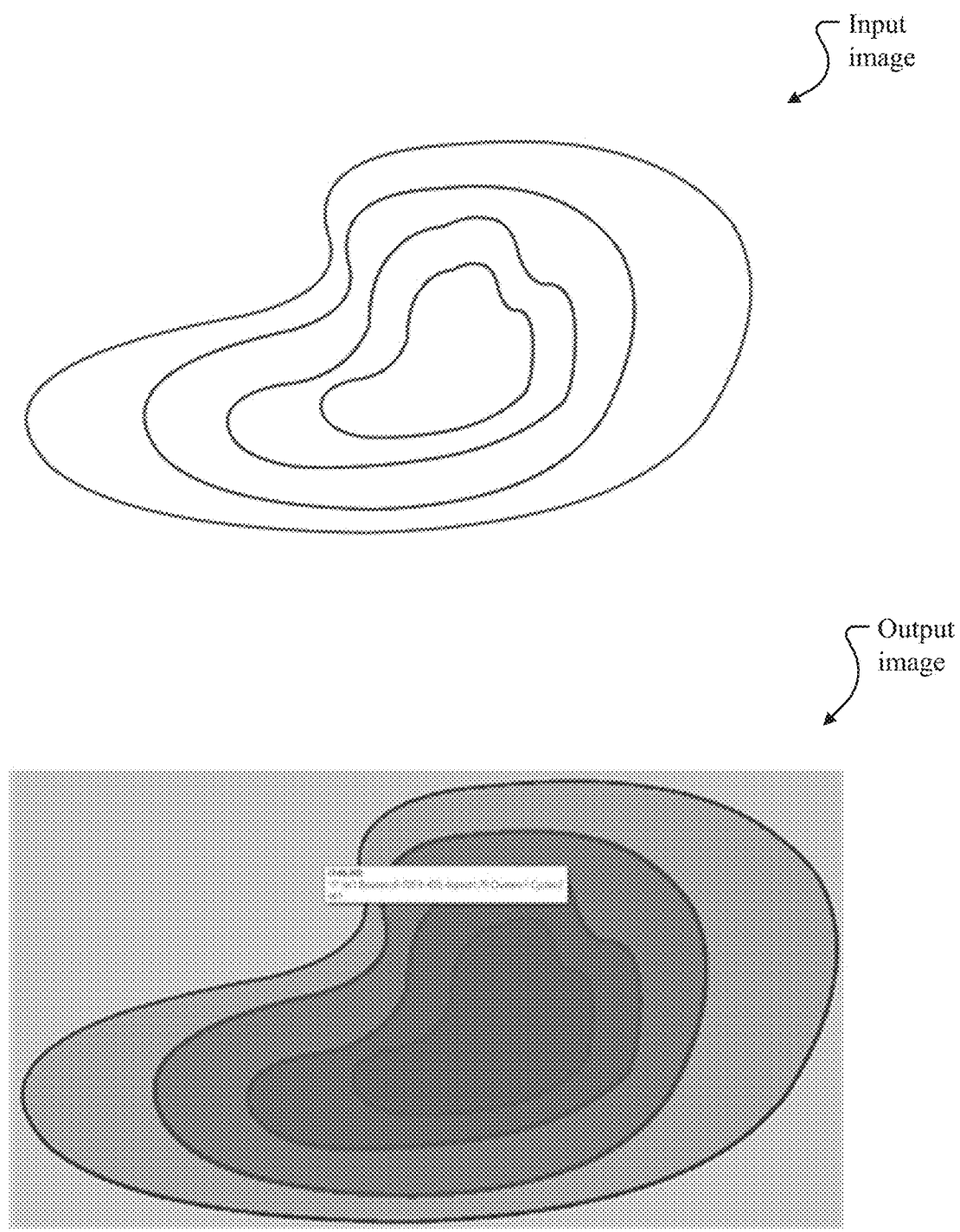
FIG. 17 illustrates an example input image and output image formed by processing the input image according to at least one example embodiment.

FIG. 17 illustrates an example input image and output image formed by processing the input image according to at least one example embodiment. As may be appreciated, FIG. 17 illustrates a 2D line topographical map representing a 3D structure. In this case, it is desirable for a program to "understand" that the contours in the image stack to form a representation of 3D space. One application of the algorithm is precisely this: when the algorithm processes the input image, the polygon profile information has the containment information to show how the polygons stack. In the output image, the z-order stacking is shown by shading each layer or polygon determined by the algorithm.

In view of the above, it should be appreciated that inventive concepts relate to image processing techniques that provide fast and accurate output images and may produce an accurate complete polygon profile (see FIG. 2B) for any 1-bit per pixel input image. An output image and/or the polygon profiles may be further processed for use in a desired application, which include but are not limited to: computer vision, optical character recognition (OCR), autonomous vehicle environment sensing (e.g., correctly identifying objects surrounding the vehicle), topography and cartography (e.g., generic shape matching, automated testing, document production, user test generations, quizzes, videos, geographic information system (GIS) mapping, machine learning an AI for identifying objections in an image, cryptography, robotics, mathematics, cellular automata, topology, discrete mathematics, digital signal processing, and/or the like.

As discussed in more detail below, inventive concepts further relate to methods for determining a contour of a digital polygon.

Figure 18:
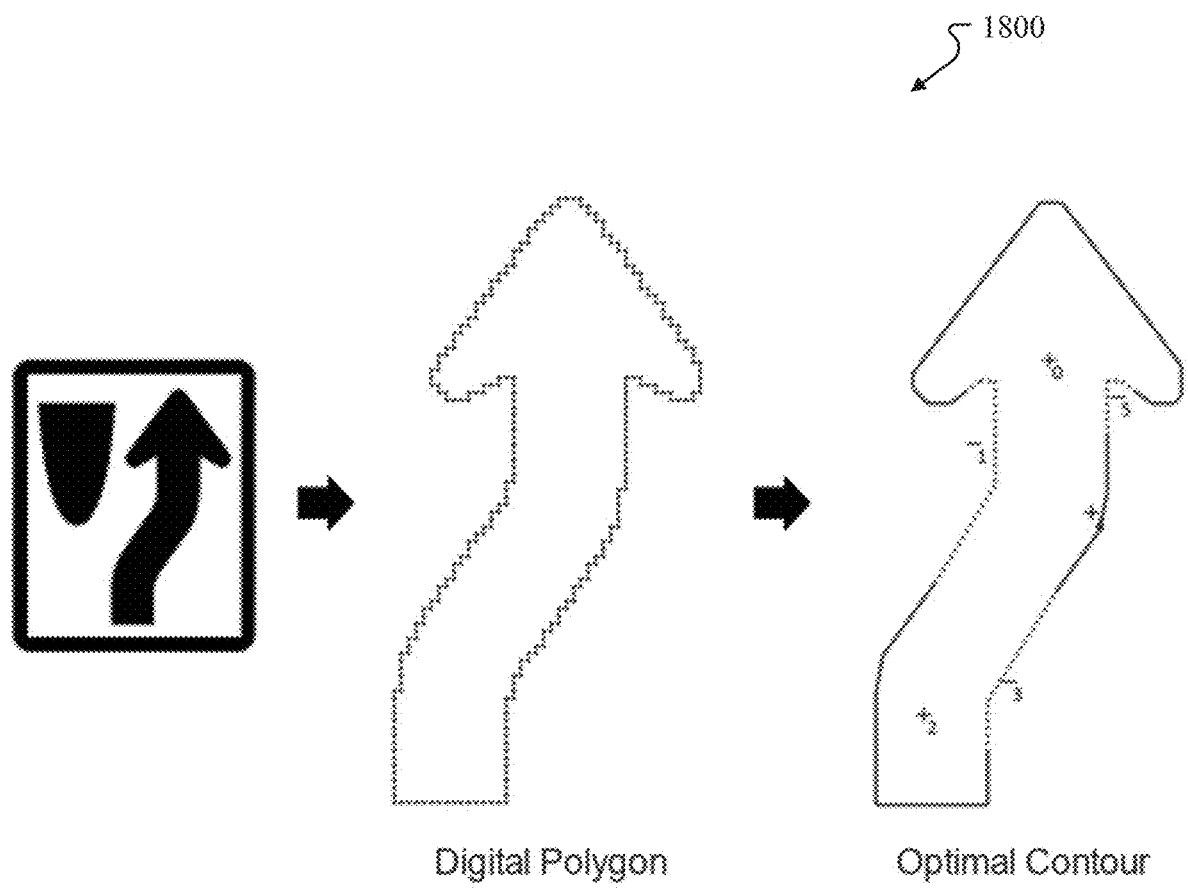
FIG. 18 illustrates a graphic that includes a road sign, a digital polygon of the arrow in the road sign, and a contoured version of the arrow after performing a series of operations according to at least one example embodiment.

FIG. 18 illustrates a graphic 1800 that includes a road sign, a digital polygon of the arrow in the road sign, and a contoured version of the arrow after performing a series of operations aimed at determining a contour (e.g., an optimal contour) of the arrow. Contouring operations may be performed for a digital polygon (or digital input polygon or digitized polygon) so long as the digital polygon is defined as a set of edges, where an edge is a sequence of points where: 1) Each point has an integral x and y coordinate; 2) each point has a nearest successor point and a nearest predecessor point that varies by at most 1 (e.g., a length or width of a pixel) in either x or y direction (but not both); 3) each edge ends on the point where the edge started; 4) the edge does not contain duplicates (no self-intersections); 5) single duplicate points are allowed (single point intersections); and 6) one of the points must be the top-most, left-most point (point 0). In addition, the digital polygon has one edge that defines the outer hull (i.e., outer boundary) of the polygon. The digital polygon may have one many edges defining the holes of the polygon if the polygon has holes. In this case, the first section of each hole of a digital polygon has the inverse orientation (CW/CCW) of the first section of the hull. In one embodiment, the hull of the digital polygon is the outermost edge of the digital polygon and holes are inner edges of the polygon. For example, the number '0' has an outer edge (hull) and an inner one (hole) that are both ovals.

Here, it should be appreciated that polygons generated in accordance with FIGS. 1-17 described above (e.g., the face shown in FIG. 7A) meet the above specifications, and therefore, the below described methods for finding a contour (e.g., an optimal contour) of a digital polygon may be applied to any suitable digital polygon formed according to the description of FIGS. 1-17. That is, the digital polygon of the arrow in FIG. 18 (or other any other shape) may be formed according to the methods described in FIGS. 1-17.

In general, the optimal contour of a digital polygon is the minimum information that equivalently represents the digital polygon. In the example of FIG. 18, the optimal contour reduces the detail of the digital polygon of the arrow from 156 points to six determinant points (shown in FIG. 18 with "+" and "−") for a 96% reduction in information. Other versions of the same arrow would likewise be reduced to the same optimal contour with six points (or six curve intervals). This reduction of information is important for downstream image analysis (e.g., object identification) at least because the contoured version of the digital polygon requires only six comparisons to reject other shapes except the arrow shown. In addition, the optimal contour is resilient to 3-D scale and aspect skew.

FIGS. 19-22 illustrate various graphics useful for describing the general obstacles encountered when creating a contoured version of a digital polygon.

Figure 19:
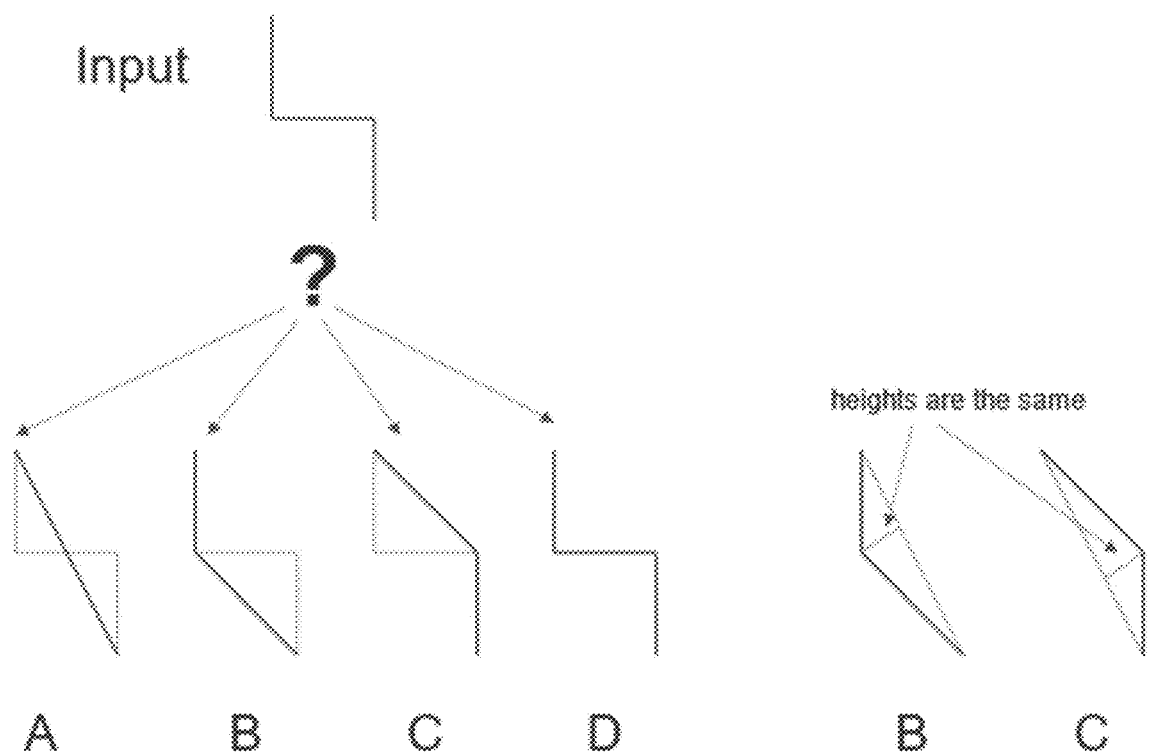

With reference to FIG. 19, given a digital input shape, how can one deterministically pick the correct linear representation (A, B, C, or D)? Selecting the wrong representation or selecting un-deterministically may result in an incorrect contour. Take, for instance, the intuitive concept of distance. Options B and C have the same triangular height distance with respect to their endpoints. Yet, B and C represent different interpretations of the contour in that B and C represent contours with inverse convexities (more on the additional obstacle of convexity below). Therefore, the intuitive concept of distance is insufficient to solve even half of the scenarios. For A and D, one must decide if the sequence is a line or a perpendicular corner. Multiply this conundrum by the 156 points in the digital polygon of FIG. 18, and one can appreciate the magnitude of the problem.

Figure 20:
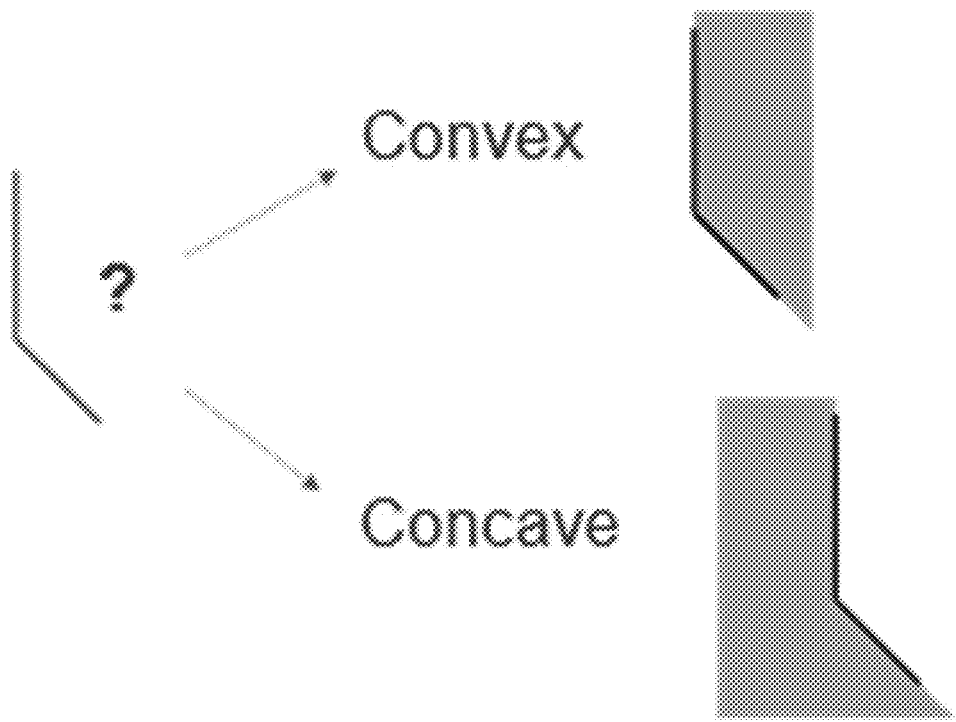

With reference to FIG. 20, assume that the case in FIG. 19 is resolved to be option B. The convexity problem is as follows: is option B a concave or a convex portion of the overall input polygon? The same line can be concave or convex depending on what side is "solid." Solid implies the notion of an "inside" and an "outside." Inside and outside imply the notion of a closed polygon (Jordan Curve Theorem). Therefore, if a bent line has no closed polygon context, the notion of the bend's concavity is meaningless. Methods according to inventive concepts resolve these and other issues by tying convexity to the closed loop knowledge of the input digital polygon.

With reference to FIG. 21, given a digital polygon, how does one deterministically decide if a corner is sharp as in a 'V', curved as in an 'O' or perpendicular as in a T? If an algorithm makes the wrong choice of corners, then the contour will not accurately represent the digital polygon.

With reference to FIG. 22, digitized images may have noise artifacts, which add further complications to the already complicated set of decisions presented above.

Inventive concepts propose to resolve at least the above stated problems while doing accurately, quickly, and/or with reduced processing power, thereby providing improvements to the field of image processing.

Figure 23:
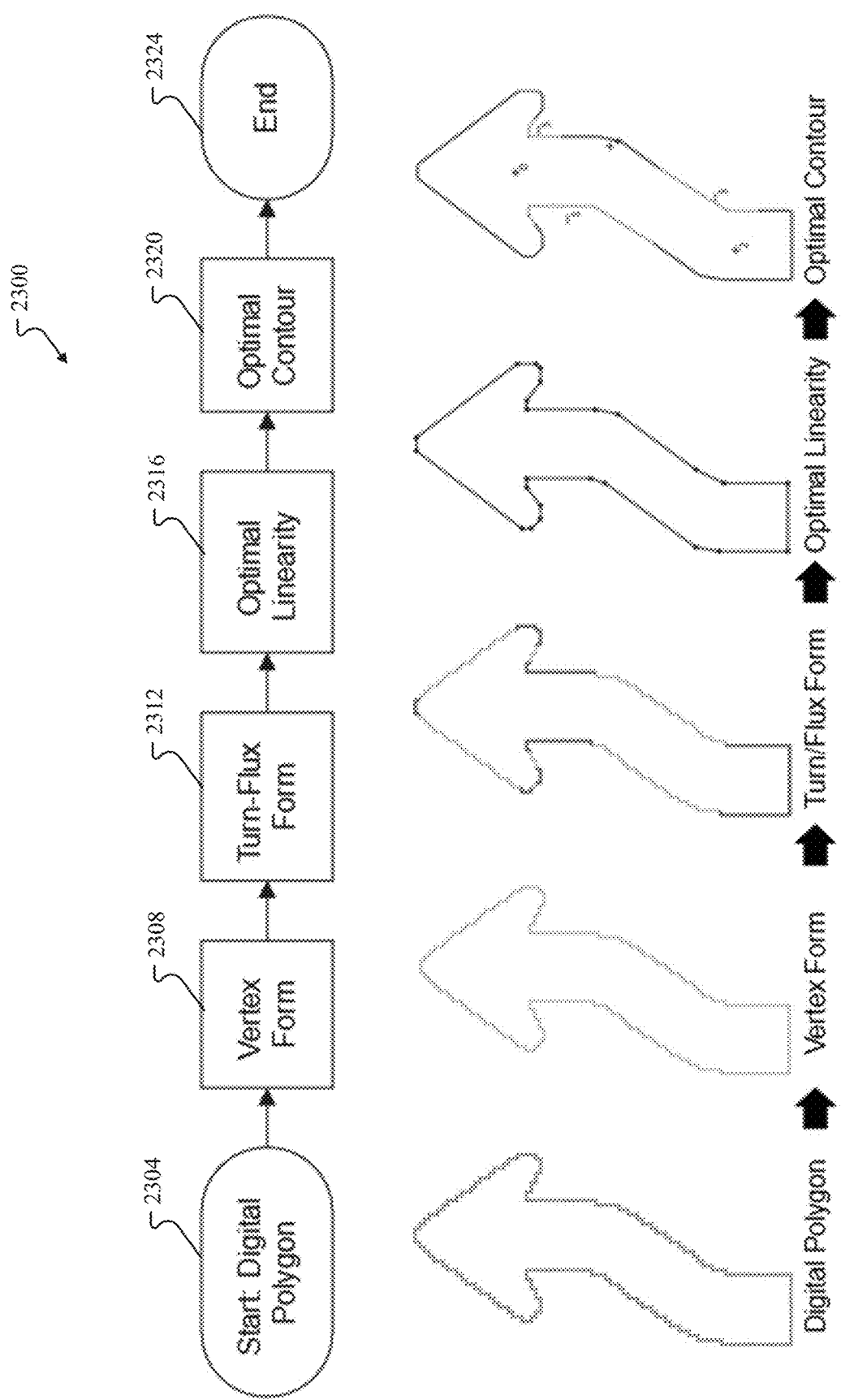
FIG. 23 illustrates a method for finding a contour of a digital input polygon according to at least one example embodiment.

FIG. 23 illustrates a method 2300 for finding an optimal contour of a digital input polygon according to at least one example embodiment. FIG. 23 further illustrates the various states of the arrow from FIG. 18 as the method 2300 transforms the initial digital polygon of the arrow at operation 2304 into the contoured polygon at operation 2320.

The method 2300 begins at operation 2304 and ends at operation 2324. In general, the method 2300 (and/or one or more stages thereof) and all other methods (and/or one or more stages thereof) described herein may be carried out or otherwise performed, for example, by processing circuitry 116. A suitable processor other than processors described herein may also be used to execute the method 2300. The processing circuitry 116 may perform the method 2300 by executing instructions stored in a memory such as the memory 120. The instructions may correspond to one or more stages of the method 2300 described below. The instructions may cause the processor to execute one or more algorithms, such as the image processing algorithms described in more detail below. In at least one embodiment, processing circuitry 116 comprises an ASIC to implement one or more of the methods described herein, which may improve the speed at which the methods are performed compared to a processor executing instructions.

The method 2300 initializes in operation 2304 by selecting and/or receiving an input digital polygon (or input polygon or digitized polygon), for example, a digital polygon generated according to the description of FIGS. 1-17 above.

Operation 2308 includes converting the digital polygon into a series of points or vertices (see, e.g., FIGS. 24-28) to create a representation of the digital polygon in vertex form. Operation 2312 includes converting the vertex form of the digital polygon into a turn/flux form of the digital polygon (see, e.g., FIGS. 28-33). Operation 2316 includes determining a linear contour or optimal linearity based on the turn/flux form of the digital polygon (see, e.g., FIGS. 34-45). Operation 2320 includes determining, based on the linear contour of the polygon from operation 2316, the final contour (e.g., the optimal contour) for the digital polygon input at operation 2304 (see, e.g., FIGS. 46-55). As noted above and below, the final contour may be an optimal contour in that the final contour includes the minimum amount of information needed to represent and/or correctly identify the input digital polygon. Alternatively, the final contour may include a reduced amount of information (not necessarily the minimum amount of information) that represents the digital polygon compared to the initial digital polygon.

Figure 24:
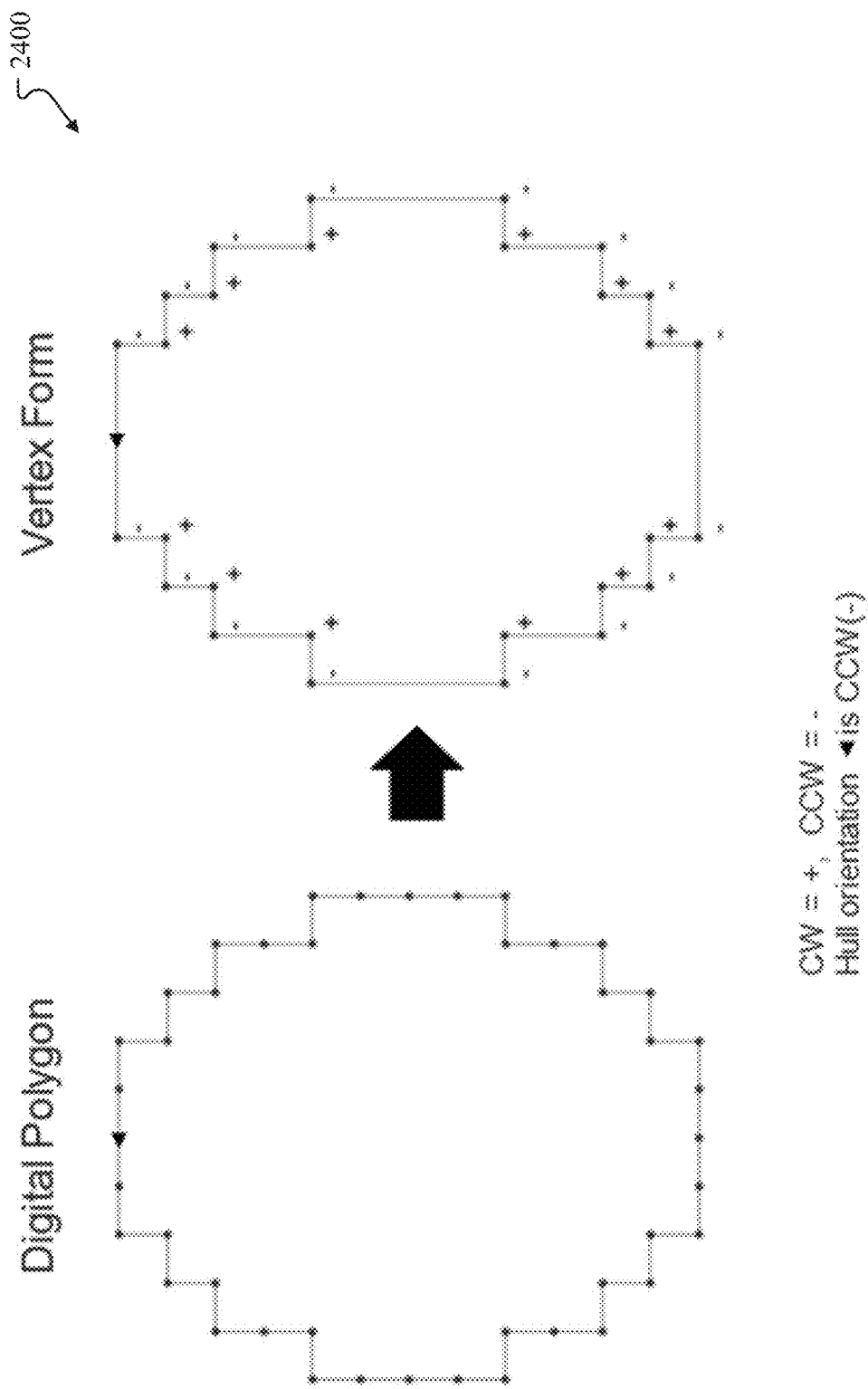
FIG. 24 illustrates a graphic for converting a digital polygon of an "O" into a vertex form of the "O" according to at least one example embodiment.

FIG. 24 illustrates a graphic 2400 for converting a digital polygon of an "O" into a vertex form of the "O" as in operation 2308 from FIG. 23. As noted in FIG. 24, the hull (outer edge) of the digital polygon was processed in a CCW fashion in accordance with the conventions used in FIGS. 1-17. FIGS. 24-55 are generally presented and discussed assuming the same CCW convention throughout (however, processing a polygon in a CW fashion is also possible). Meanwhile, operation 2308 converts the digital polygon into a polygon defined by vertices, where each vertex is associated with a "+" sign or a "−" sign in accordance with the convention described below with reference to FIG. 27. As may be appreciated from FIG. 24, generating the vertex form of the digital polygon reduces the number of points to be processed compared to the original digital polygon by joining consecutively aligned edges of the digital polygon (see, for example, the flat top part of the O) and by assigning (shown in FIG. 24 with dots).

Figure 25:
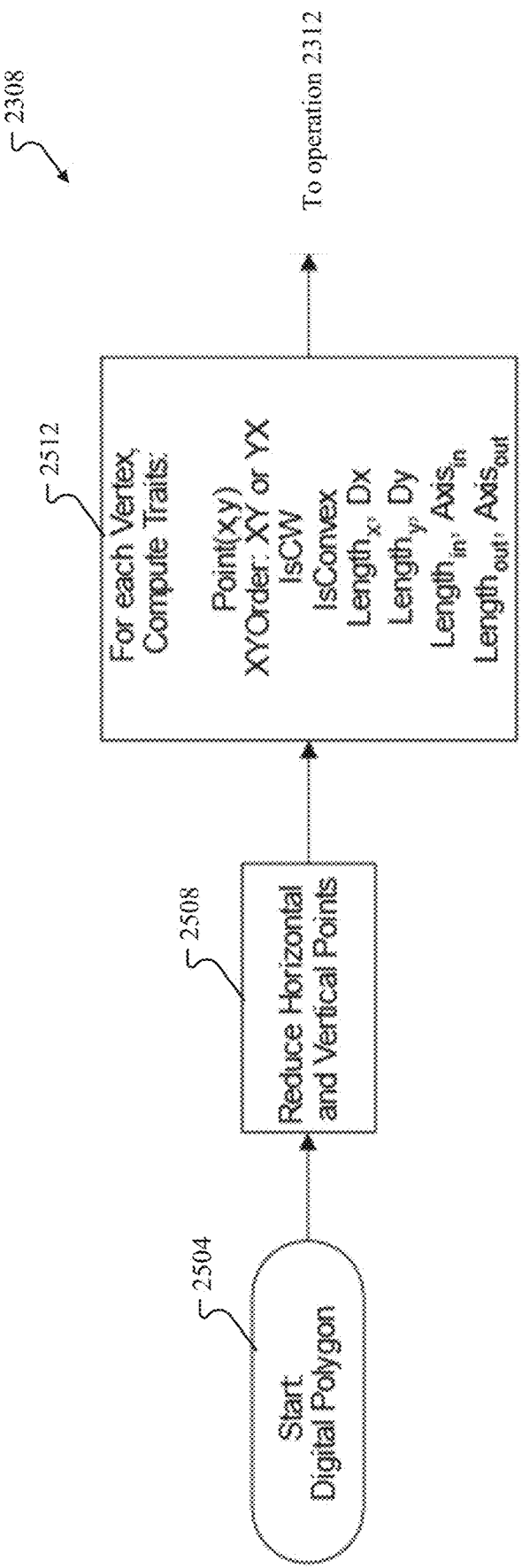
FIG. 25 illustrates a method further detailing an operation from FIG. 23 according to at least one example embodiment.

FIG. 25 illustrates a method further detailing operation 2308 from FIG. 23 according to at least one example embodiment. The method begins at operation 2504 and ends by proceeding to operation 2312 in FIG. 23.

Operation 2508 includes reducing the horizontal and vertical points on the input digital polygon which results in a polygon with a plurality of vertices. A vertex may be defined as a point of intersection between an edge of the digital polygon and another edge of the digital polygon oriented in a different direction. Operation 2508 is described in more detail below with reference to FIG. 26.

Operation 2512 includes computing or determining traits for each vertex formed in operation 2508. In general, the traits of a vertex include information about an edge of the polygon that enters the vertex and an edge of the polygon that exits the vertex as the digital polygon is processed in a CCW or CW fashion. As discussed in more detail below with reference to FIGS. 27 and 28, such information may include information on length of the entering and exiting edges, information about an orientation of the vertex (e.g., CW or CCW), information about an axis associated with the vertex, and/or information about whether the vertex is associated with a concave or convex shape. As discussed in more detail below, the traits of each vertex may be useful for carrying out operations 2312, 2316, and/or 2320 from FIG. 23.

FIG. 26 illustrates a method further detailing an operation from FIG. 25 according to at least one example embodiment. The method begins at operation 2604 and ends by proceeding to operation 2512 in FIG. 25. The method illustrated in FIG. 26 provides further details for operation 2508 from FIG. 25 which reduces the number of points on the digital polygon to arrive at a vertex form of the digital polygon. FIG. 26 further illustrates a graphic 2630 that shows how a digital polygon (the part of graphic 2630 on the left side of the arrows) with many points is converted to vertex form with fewer points in the form of vertices (the part of graphic 2630 on the right side of the arrows).

As noted in operation 2604, operation 2508 reduces the points of digital polygons having a minimum of four points or four edges. Digital polygons with fewer than four points or edges cannot be reduced, and in this case, operation 2508 may be skipped for these types of polygons.

Operation 2608 includes determining whether all points of the digital polygon have been processed. If not, then the method proceeds to operation 2612 to obtain the next three points of the digital polygon, for example, when the method has already processed one or more points (recall that a point p may be at a corner of a pixel in the digital polygon as in FIG. 6B, for example). If the method has not yet processed any points of the digital polygon, then operation 2608 includes selecting a point to process and obtaining two additional sequential points. As in FIGS. 1-17, the points may be processed in a CW or CCW fashion depending on the convention selected (CW shown in FIG. 26). In any event, operation 2608 obtains three sequential points p1, p2, and p3.

Operation 2616 includes determining whether point p3 is on a same horizontal or vertical line as point p1. If so, the method proceeds to operation 2620 and removes point p2 from the digital polygon and sets two vertices: one vertex at point p1 (assuming p1 has not been removed by a previous iteration of operation 2508); and one vertex at point p3. Thereafter, the method returns to operation 2608. If point p3 is not on a same horizontal or vertical line as point p1, then the method returns to operation 2608. The method depicted in FIG. 26 is performed until all points of the digital polygon have been processed. As shown by left side of graphic 2630, each segment in the digital polygon is length 1 (throughout at least the description of the vertex form of the polygon and other parts of the instant description, a segment is defined as a unit of length between two sequential vertices of a polygon in vertex form). In the vertex form, however, only points that change angle remain. That is, five points of the same horizontal line are simplified to two endpoint vertices. Similarly, the five points on the vertical line are replaced by two endpoint vertices. In other words, operation 2508 reduces the number of points for part of a digital polygon from five to two while operating in a CW manner. In both cases, the vertex form of the part of the digital polygon now has two vertices V and $V_{i+1}$. The length of the interval between Vi and $V_{i+1}$ is equal to four because four segments of length '1' were combined and three points were removed.

Figure 28:
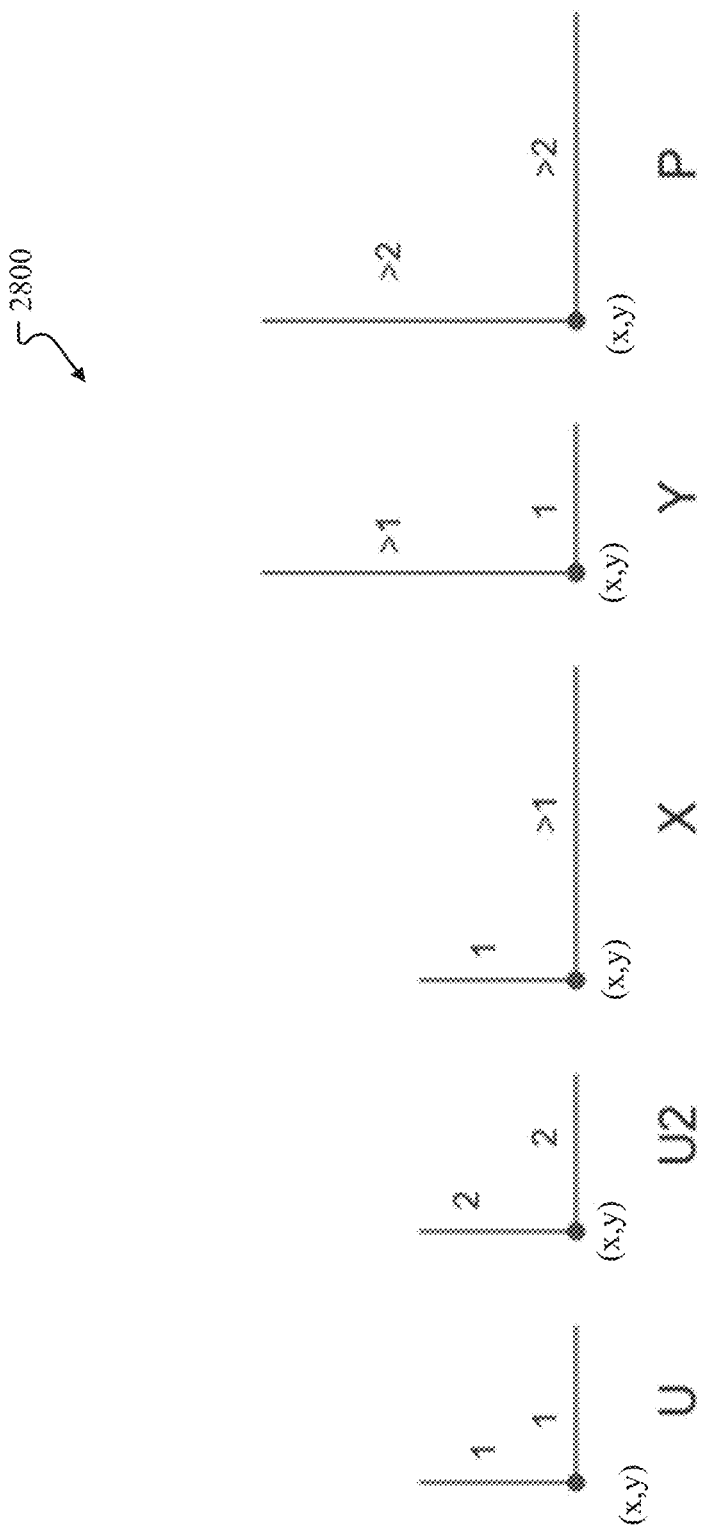

FIGS. 27 and 28 illustrate various traits of a vertex as determined by operation 2512 in FIG. 25 according to at least one example embodiment.

Graphics 2700 and 2704 illustrate the various traits that are computed for operation 2512 where the digital polygon is processed in an x-y coordinate system. For example, graphic 2700 shows a vertex (x,y) that is processed in a CCW direction where an edge enters the vertex (x,y) in a y direction from vertex (xp,yp) and where another edge exits the vertex (x,y) in an x direction to vertex (xn,yn). The XYOrder of graphic 2700 is yx because the edge entering vertex (x,y) extends in the y direction (vertical direction) while the edge exiting vertex (x,y) extends in the x direction (horizontal direction). Graphic 2700 further shows traits IsCW and IsConvex which may define whether the vertex (x,y) is associated with a convex or concave shape of the digital polygon. As further shown, a length of the edge Dy (in segments) is equal to |y−yp| while a length of the edge Dx (in segments) is equal to |xn−x|. The axis ($Axis_{in}$ and $Axis_{out}$) of vertex (x,y) is defined as in graphic 2800 of FIG. 28. The vertex (x,y) in graphic 2704 has the same type of traits or properties as the vertex in graphic 2700 except that the vertex in graphic 2704 has an XYOrder of xy since the edge entering vertex (x,y) is on the x-axis and the edge exiting vertex (x,y) is on the y-axis.

Graphics 2708 and 2712 illustrate how to determine the trait IsCW by assigning a "+" sign or a "−" sign to a vertex depending on whether a shortest distance or smallest angle from the edge entering the vertex to the edge exiting the vertex is in a CW direction or a CCW direction. As shown, if the shortest distance or smallest angle from the entering edge to the exiting edge is in the CW direction, then the vertex is assigned a "+". Meanwhile, if the shortest distance or smallest angle from the entering edge to the exiting edge is in the CCW direction, then the vertex is assigned a "−".

Graphics 2716 and 2720 illustrate how methods according to example embodiments unambiguously define convexity and concavity, which is possible because a digital polygon is guaranteed to be closed and is generally oriented one of CCW or CW for the hull (outer perimeter) of the digital polygon and the other of CCW or CW for any hole within the digital polygon depending on the convention selected for creating the digital polygon, as in FIGS. 1-17, for example. Graphic 2716 illustrates an example where the hull of a digital polygon is processed in the CCW direction which means that holes of the polygon are processed in a CW direction. Graphic 2720 illustrates an example where the hull is processed in the CW direction which means that holes of the polygon are processed in a CCW direction. As shown for both polygons, any vertex on the polygon can be unambiguously associated with concavity or convexity of the polygon. Thus, for any vertex in the polygon of graphic 2716, convex and concave traits are as follows: IsConcave=IsCW and IsConvex=IsCCW. The opposite is true for concave and convex traits of vertices of the polygon of graphic 2716 where IsConcave=IsCCW and IsConvex=CW.

With reference to FIG. 28, another trait of a vertex (x,y) that is computed in operation 2512 may be the axis of the vertex, which is defined by the x and y lengths of the edges that enter and exit the vertex, where the x and y lengths correspond to a number of consecutive segments that enter and exit the vertex before encountering another vertex. As shown in FIG. 28, an axis of a vertex may be defined as U (unity; entry and exit edges of segment length 1), U2 (double unity; entry and exit edges of segment length 2), X (x edge longer than y edge), Y (y edge longer than x edge), or P (perpendicular edges with equal or unequal segment lengths greater than two) depending on the x and y lengths of edges entering and exiting the vertex. By way of example and with reference to FIG. 26, the axis trait of the vertex V in the upper polygon reduced to vertices is X because vertex V has an edge of length 1 that enters the vertex (assume another vertex (not shown) exists at the other end of that same edge) and an edge of length 4 that exits the vertex.

Figure 29:
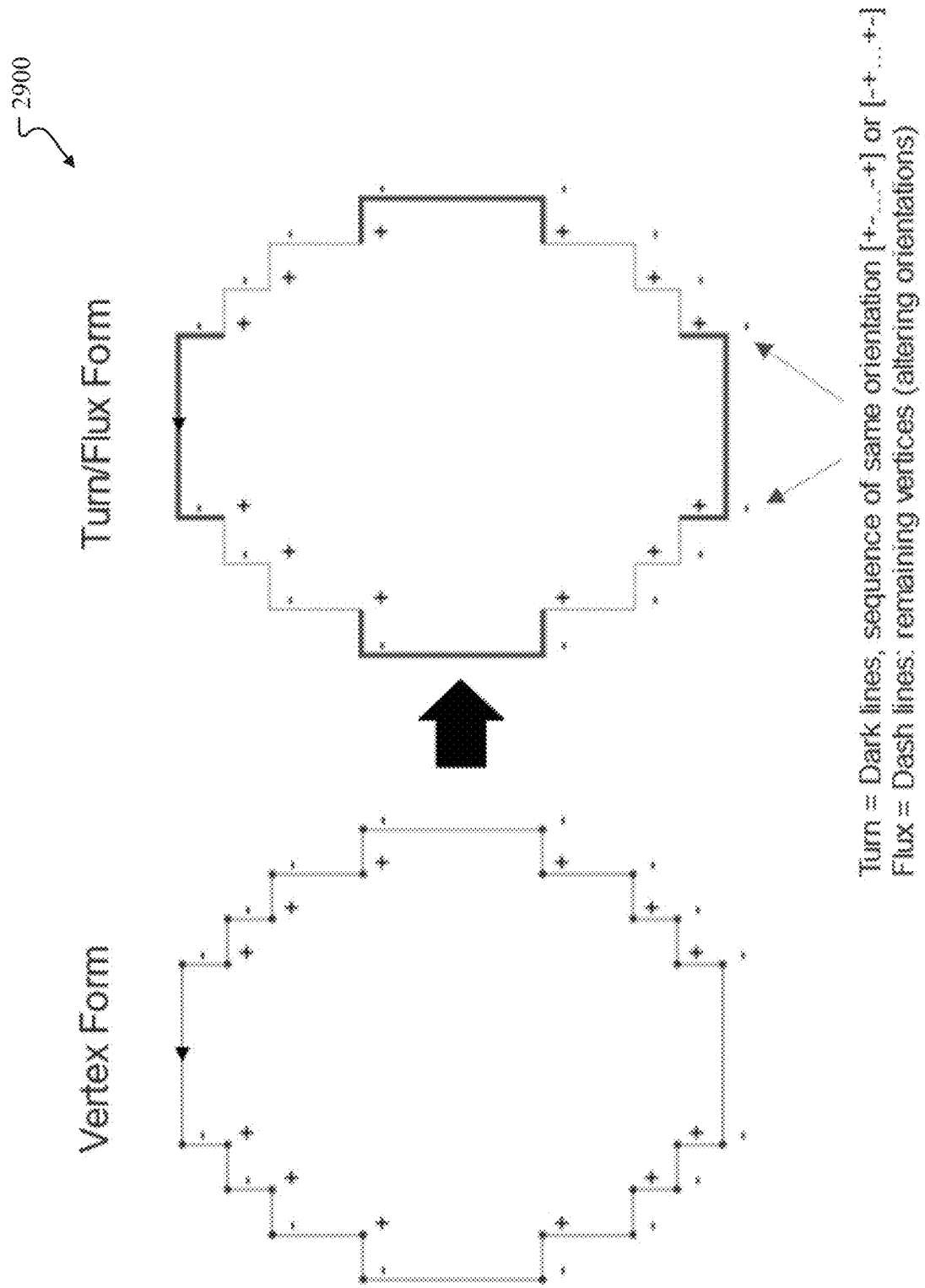
FIG. 29 illustrates a graphic that shows conversion of a digital polygon in vertex form to turn/flux form according to at least one example embodiment.

FIG. 29 illustrates a graphic 2900 that shows conversion of a digital polygon in vertex form to turn/flux form in accordance with operation 2312 in FIG. 23. As noted in FIG. 29, a turn (also referred to a turn interval) is illustrated with bold lines compared to a flux (also referred to as a flux interval). A turn may be defined as a sequence of consecutive vertices that have a same orientation (– . . . – or + . . . +) while a flux is defined by vertices that are not part of a turn. In other words, flux vertices are sequential vertices with altering orientations (+, –, +, –, + . . . ). A flux may have a length of one or more segments (see, for example, FIG. 36) while a turn will have a length of at least three segments. In other words, if a segment is defined as a unit of length between two sequential vertices of a polygon in vertex form, then a flux or flux interval corresponds to a collection of segments that span two or more sequential vertices while a turn or turn interval corresponds to a collection of segments that spans four or more vertices.

The turn/flux conversion of the vertex-form polygon breaks down the linear interpretation problem into simpler intervals. As noted above, turns are defined as a sequential series of vertices with the same orientation (in the example of FIG. 29, –). Turns begin and terminate on the opposite orientation (in this case +). All remaining vertices are flux vertices (i.e., flux vertices alternate –/+ orientation).

Figure 30:
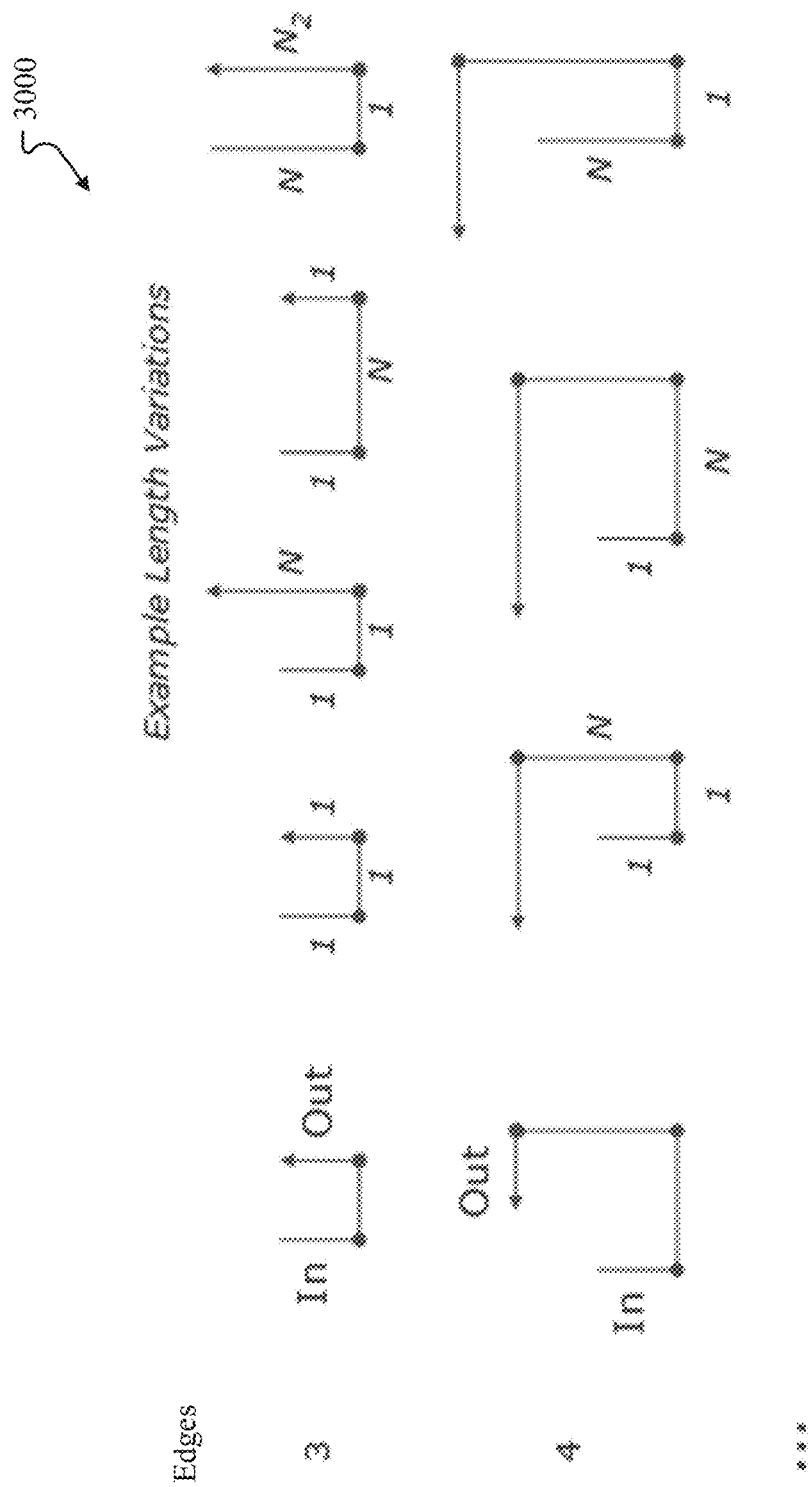
FIG. 30 illustrates a graphic that shows various examples of turns, in this case, turns with three edges and turns with four edges according to at least one example embodiment.

FIG. 30 illustrates a graphic 3000 that shows various examples of turns, in this case, turns with three edges and turns with four edges. As shown with the variable N, the length edges (in terms of segments) within a turn may vary.

Figure 31:
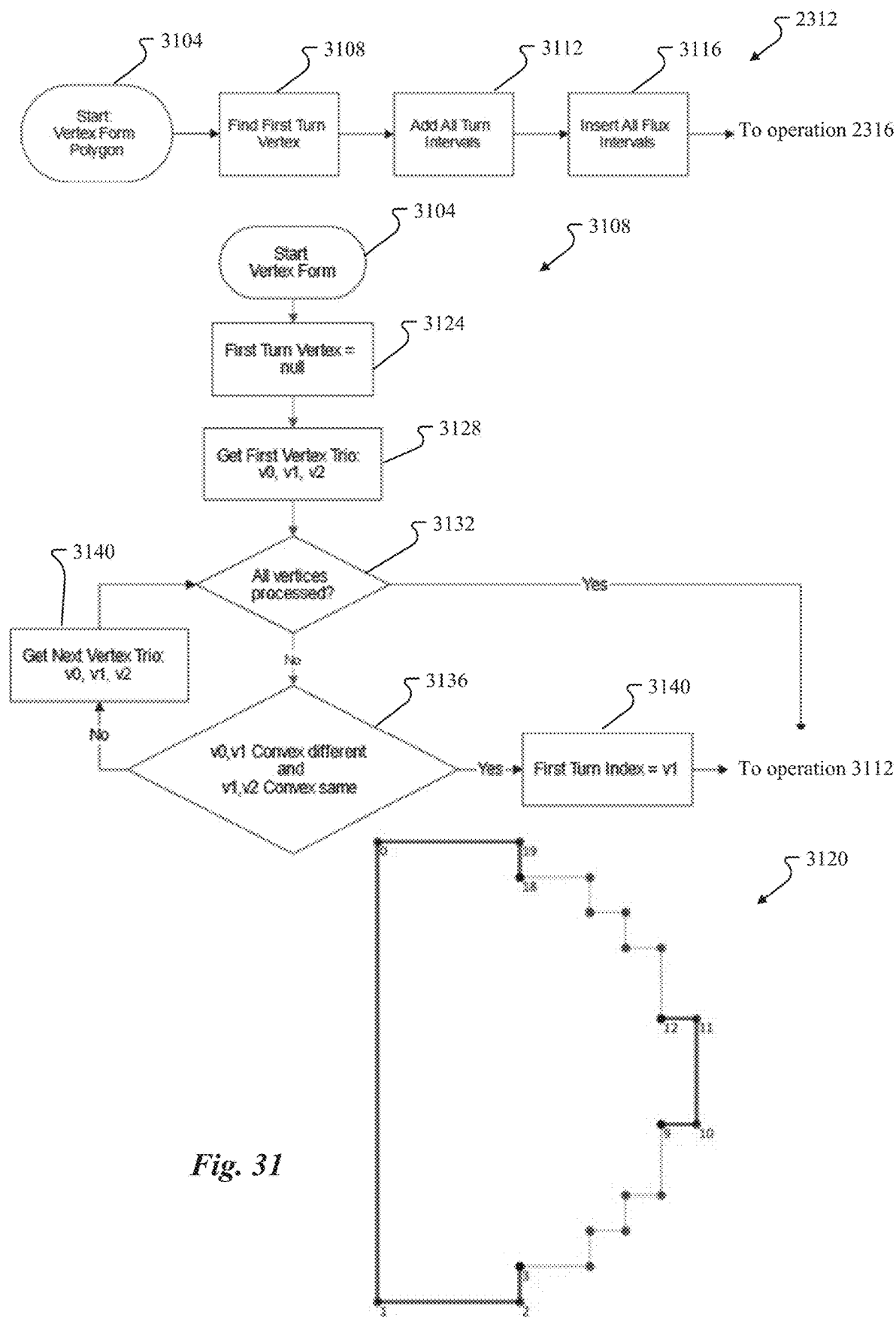
FIG. 31 further illustrates a method that provides additional details for an operation from FIG. 23 and a graphic that illustrates an example according to at least one example embodiment.
Figure 32A:
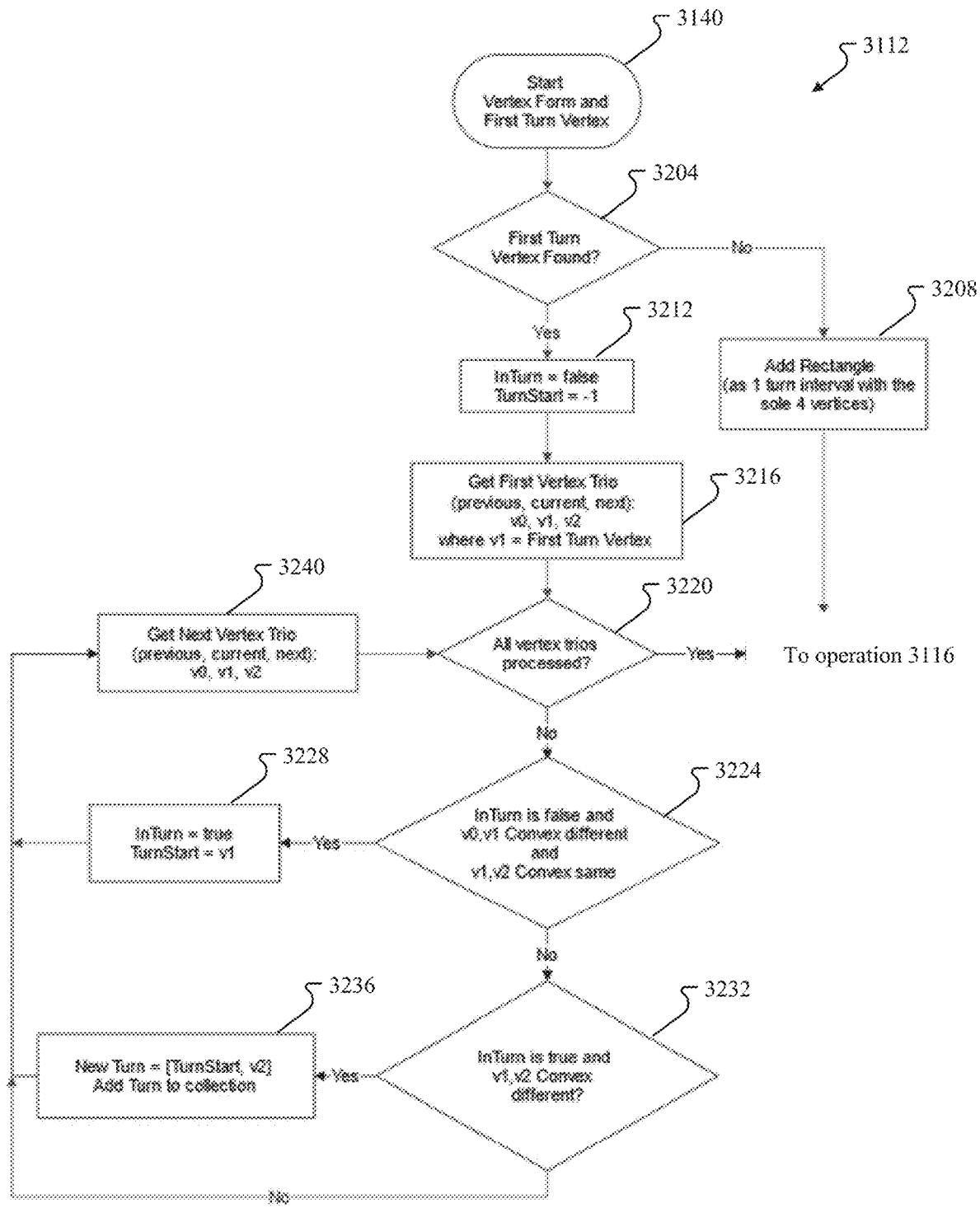
FIG. 32A illustrates a method that provides further details for an operation in FIG. 31 according to at least one example embodiment.

FIG. 31 illustrates methods that provide additional details for converting a vertex form of the polygon to the turn/flux form of the polygon as in operation 2312 of FIG. 23. In general, converting the vertex form of the polygon into the turn/flux form of the polygon further reduces the number of points (vertices) that are eventually analyzed to generate the contour of the polygon in operation 2320. The method 2312 begins at operation 3104 with the vertex form of the digital polygon as formed by operation 2308 and ends by proceeding to operation 2316 in FIG. 23.

Operation 3108 includes finding a vertex of a first turn by, for example, starting at the upper leftmost part of the polygon in vertex form and proceeding CCW to encounter a turn. Additional details of operation 3108 are shown in FIG. 31 and discussed in more detail below, but generally includes determining orientations (i.e., sign of + or –) of sequential vertices of the vertex form polygon to identify a turn as at least two sequential vertices that have a same sign.

Operation 3112 includes adding all turn intervals identified in operation 3108 to the turn/flux form of the polygon. Operation 3112 is described in more detail below with reference to FIG. 32A.

Operation 3116 includes inserting all flux intervals into the turn/flux form of the polygon. Operation 3116 is described in more detail below with reference to FIG. 32B.

FIG. 31 further illustrates a method that provides additional details for operation 3108 and a graphic 3120 that illustrates an example related to operation 3108.

Beginning with the vertex form of the polygon in operation 3104, operation 3108 includes initiating a null set for a first turn vertex. In other words, operation 3108 has not yet encountered a vertex that is part of a possible turn interval in the polygon, and thus, there are no vertices of a turn in the set at this point.

Operation 3128 includes obtaining a trio of first vertices v0, v1, v2 from the vertex form of the polygon. For example, with reference to graphic 3120, operation 3128 obtains vertices 0, 1, and 2.

Operation 3132 includes determining whether all vertices of the vertex from of the polygon have been processed. If not, the method proceeds to operation 3136. If so, the method proceeds to operation 3112 in method 2312.

Operation 3136 includes determining whether vertices v0 and v1 have different convexities and whether vertices v1 and v2 same convexities, where convexities of each vertex are defined by the sign convention noted above (+ or –). If so, then operation 3140 identifies vertex v1 as possibly being part of a turn interval and adds the vertex v1 to the null set initiated in operation 3124. If not, the method proceeds to obtain the next three vertices of the polygon (e.g., vertices 3, 4, and 5 in graphic 3120) and returns to operation 3128 to iterate through the same operations to determine whether a vertex exists that might be part of a turn. If a first turn is found in operation 3136, then the method proceeds to operation 3112 to identify additional turns within the polygon.

In the example illustrated by graphic 3120, operation 3136 determines that vertex 1 is part of a turn adds that vertex to the set of vertices associated with turns (null set is now a set of one as indicated in operation 3140) before proceeding to process the remainder of the polygon for additional turns in operation 3112.

As noted above, FIG. 32A illustrates a method that provides further details for operation 3112 in FIG. 31.

As noted in FIG. 31, the input or starting point for operation 3112 includes the vertex form of the polygon and the first vertex determined to possibly be part of a turn in operation 3140. Now, the remainder of the polygon is processed to see if the first vertex of a possible turn is part of an actual turn and whether there are other turns in the vertex form of the polygon.

Operation 3204 includes determining whether the first turn vertex is found. The first turn vertex is not found when the vertex from operation 3140 is a vertex that forms part of a rectangle. In this case, the method proceeds to operation 3208 and adds the rectangle as a turn interval with four vertices to the turn/flux form of the polygon. Otherwise, operation 3204 determines that the first turn vertex is found, and the method proceeds to operation 3212, which sets the state of InTurn to false and begins a turn at the vertex that immediately precedes the first turn vertex. In this case, InTurn=false means that vertex v1 has not yet been associated with a complete turn interval, and thus, the method must continue to process the remainder of the polygon to find the turn interval to which vertex v1 belongs.

Operation 3216 includes obtaining a vertex trio of previous, current (the first turn vertex from operation 3140), and next vertices. Operation 3220 includes determining whether all vertex trios have been processed. If not, the method proceeds to operation 3224. If so, the method proceeds to operation 3116.

Operation 3224 includes determining whether the condition from operation 3212 is still true (i.e., InTurn=false) and whether vertices v0 an v1 have different convexities and whether vertices v1 and v2 have same convexities (as indicated by their signs + or –). If so, the method proceeds to operation 3228 and determines that InTurn=true and initiates the start of a turn interval at vertex v1 before proceeding to operation 3240. If not, the method proceeds to operation 3232 and determines that InTurn=true (i.e., initiates a turn interval with vertex v1) and whether vertices v1 and v2 have different convexities.

If operation 3232 determines that vertices v1 and v2 have different convexities, then operation 3236 initiates a new turn interval that starts at vertex v2, and adds the turn interval created at operation 3232 to the collection of turn intervals to be included in the turn/flux form of the polygon. If vertices v1 and v2 do not have different convexities, then the method proceeds to operation 3240.

Operation 3240 includes obtaining the next three vertices of the vertex polygon before returning to operation 3220 (by dropping the "previous vertex" from the group of in operation 3216 and adding a vertex to the still remaining "current" and "next" vertices from operation 3216).

FIG. 32B illustrates a method that provides further details for operation 3116 in FIG. 31, which relates to inserting flux intervals after turn intervals are obtained. As shown, the method begins with the vertex form of the polygon and with the turn intervals of the turn/flux polygon defined as in operation 3112.

Operation 3244 includes obtaining a first turn pair T1 and T2. A flux or flux interval is between two turn intervals. Accordingly, operation 3244 may obtain the turn pair as two sequential turns in the polygon (e.g., two sequential turns that occur as the polygon is processed in the CCW direction) where the sequential turns are separated by a flux interval.

Operation 3248 includes determining whether all turns have been processed. If so, the method proceeds to operation 2316 in FIG. 23. If not, the method proceeds to operation 3252 and determines whether turns T1 and T2 have any overlapping vertices.

If, in operation 3252, turns T1 and T2 have overlapping vertices, then the method proceeds to operation 3260. If not, the method proceeds to operation 3256 where a new flux interval is initiated to begin at the Lower$_{out}$ vertex of turn T1 and end at the Lower vertex of turn T2 and the flux interval is inserted between turns T1 and T2 in the turn/flux polygon. Thereafter, the method proceeds to operation 3260. As noted in graphic 3230, traits of a turn include IsCW, IsConvex, IsLower$_{in}$, L$_{in}$, Axis$_{in}$, Upper$_{in}$, Lower$_{out}$, Axis$_{out}$, L$_{out}$, and Upper$_{out}$. As shown, Lower is the first vertex of a turn, Upper$_{in}$ is the second vertex of the turn, Upper$_{out}$ is the second to last vertex of the turn, and Lower$_{out}$ is the last vertex of the turn.

Operation 3260 includes obtaining a next turn pair in the polygon before returning to operation 3248. The next turn pair may include part of turn T2 and a next turn T3.

Figure 33:
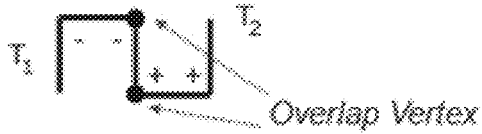
FIG. 33 illustrates a graphic that shows patterns for turns and fluxes according to at least one example embodiment.

FIG. 33 illustrates a graphic 3300 that shows patterns for turns and fluxes. In the pattern progression, two turns T1 and T2 are shown and have from two overlap vertices to no overlap vertices. An overlap occurs when two sequential turns share a vertex. At zero overlap vertices, the flux segments may evolve (e.g., change from a flux to a turn). Orientation signs −/+ are shown for relative comparisons of turns T1 and T2.

Example embodiments will now be discussed with respect to determining a linear contour (e.g., an optimal linear contour), as in operation 2316 of FIG. 23, for the turn/flux form of the polygon formed in operation 2312.

Figure 34:
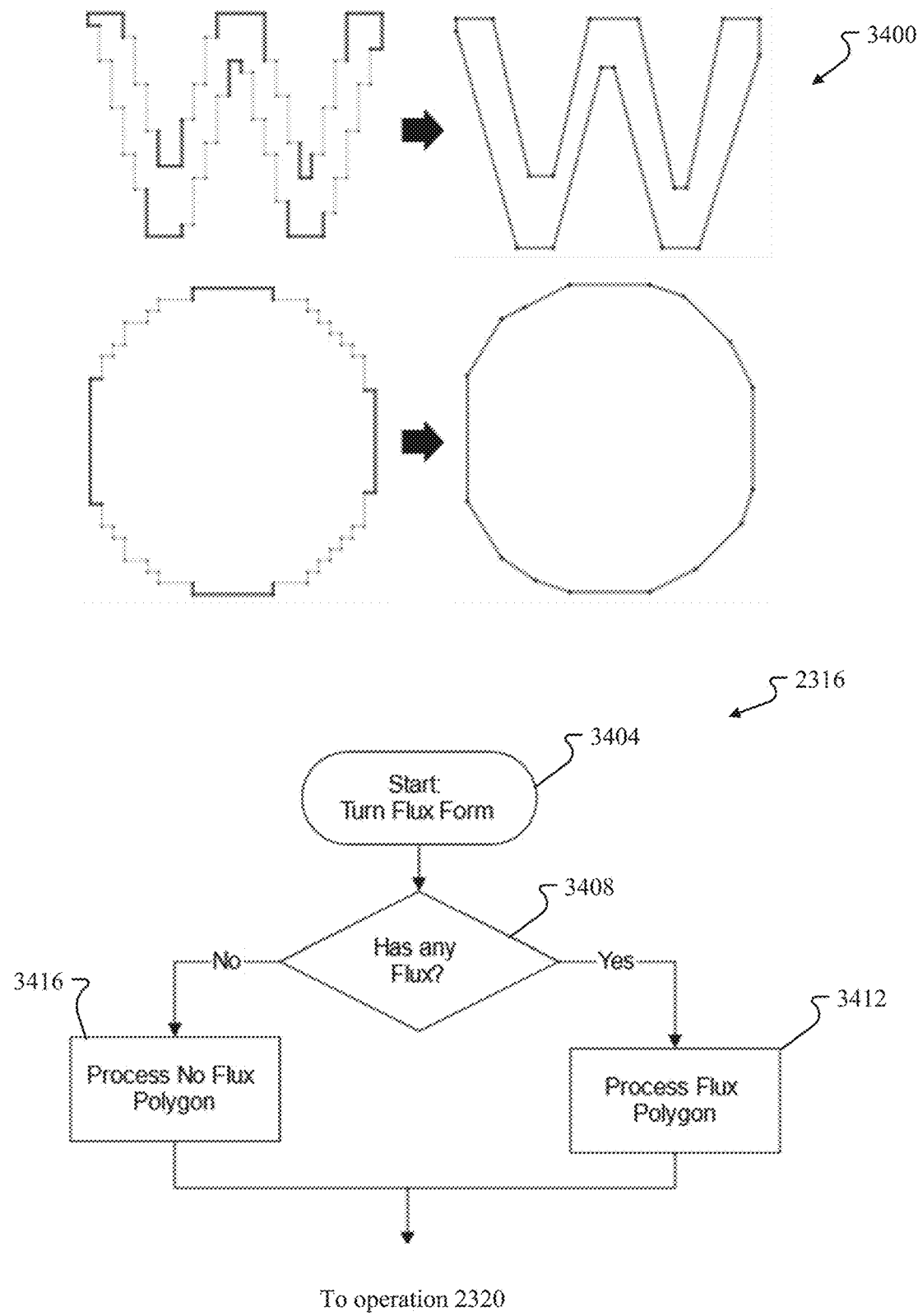
FIG. 34 illustrates a graphic that shows how the turn/flux form of a polygon is transformed into a sequence of linear intervals according to at least one example embodiment.

FIG. 34 illustrates a graphic 3400 that shows how operation 2316 transforms the turn/flux form of a polygon into a sequence of linear intervals (also referred to as line intervals) that represents the linear trends of the initial digital polygon. A linear interval may be defined as a line between vertices that forms part of the linear contour of the polygon. As discussed in more detail below, a linear interval may be formed from a flux interval according to further processing by collapsing flux vertices into a line. Meanwhile, a turn interval from the turn/flux form of the polygon may self-define as a linear interval and be added to the linear contour without further processing. The graphic 3400 shows turn-flux polygons for a W and O on the left side of the arrows and shows the linear contour of the two polygons on the right side of the arrows.

FIG. 34 further illustrates a generalized method for operation 2316 in FIG. 23 that obtains the linear contour of a turn-flux polygon. The method starts at operation 3404 with the turn-flux polygon generated in operation 2312 and ends by proceeding to operation 2320 in FIG. 23.

Operation 3408 includes determining whether the turn/flux form polygon has any flux intervals. If so, the method proceeds to operation 3412 to process flux intervals of the turn-flux polygon. If not, the method proceeds to operation 3416 to process the no-flux polygon. The method depicted in FIG. 34 is described in more detail below.

Figure 35:
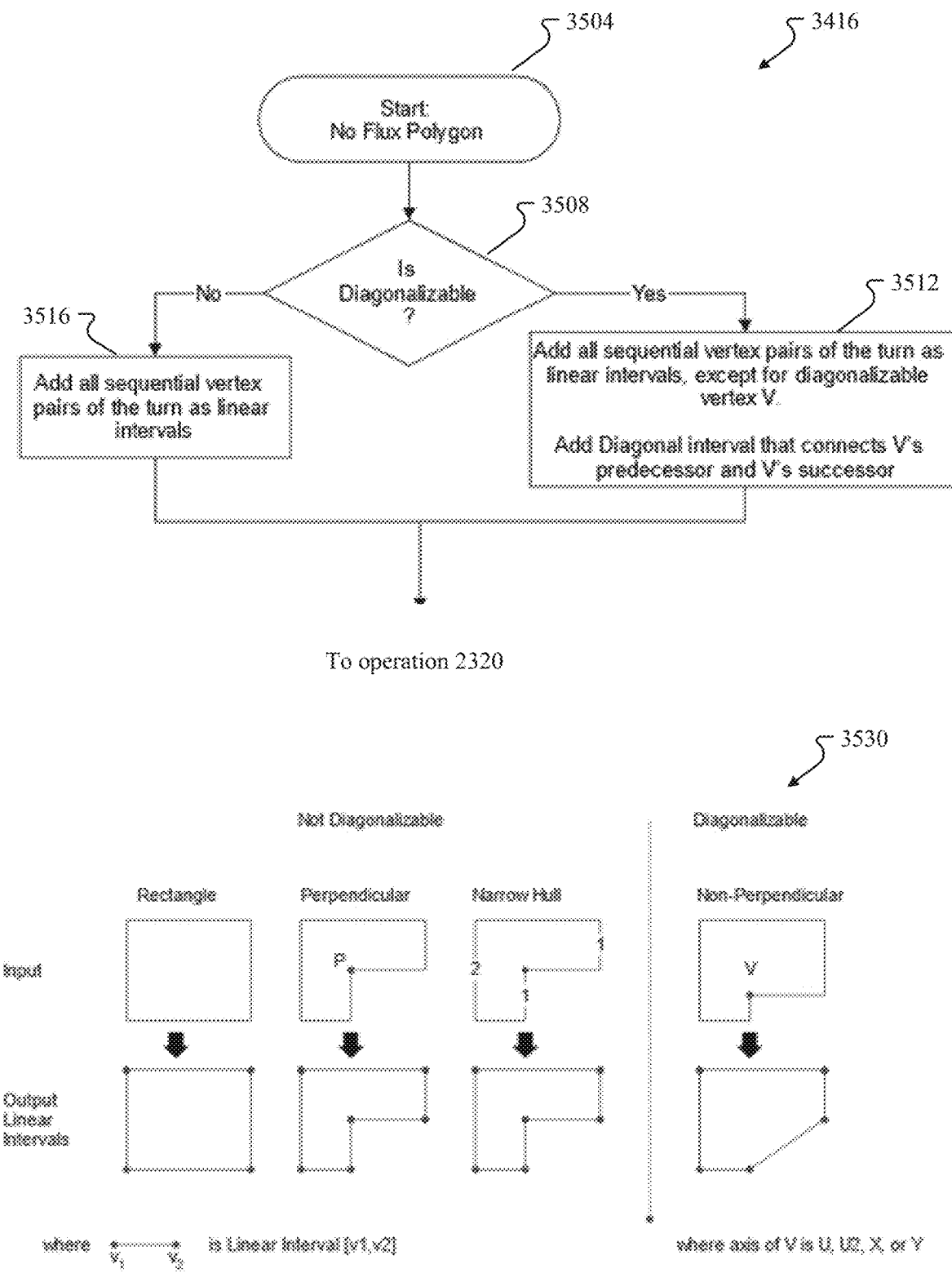
FIG. 35 illustrates a method that further details an operation in FIG. 34 according to at least one example embodiment.

FIG. 35 illustrates a method that further details operation 3416, which analyzes the no-flux polygon at operation 3504 and ends by proceeding to operation 2320.

In operation 3508, the method determines whether the no flux polygon is diagonalizable (i.e., whether a diagonal line or diagonal lines can be applied to the no flux polygon). Graphic 3530 illustrates example no flux polygons labeled as inputs and linear intervals output from the inputs that are used for the linear contour of the polygon in operation 2320. As shown, a diagonalizable non-flux interval may be considered as a vertex V of the polygon that has U, U2, X, and Y axis traits (as shown, a vertex with a P axis trait is not diagonalizable).

If a non-flux interval of a polygon is diagonalizable, the method proceeds to operation 3512 which adds all sequential vertex pairs of the turn as linear intervals of the linear contour except for the diagonalizable vertex V. Here, operation 3512 adds a diagonal interval that connects the vertex that immediately precedes vertex V to the vertex that immediately follows V (as shown in graphic 3530 with the input/output transition for the diagonalizable case). The diagonalized polygon is now part of the linear contour of the polygon generated by operation 2316.

If the no flux polygon is determined to be not diagonalizable in operation 3508, the method proceeds to operation 3516 where all sequential vertex pairs of the turn are added as linear intervals to the linear contour of the polygon (as shown in graphic 3530 with the input/output transition for the non-diagonalizable cases).

Figure 36:
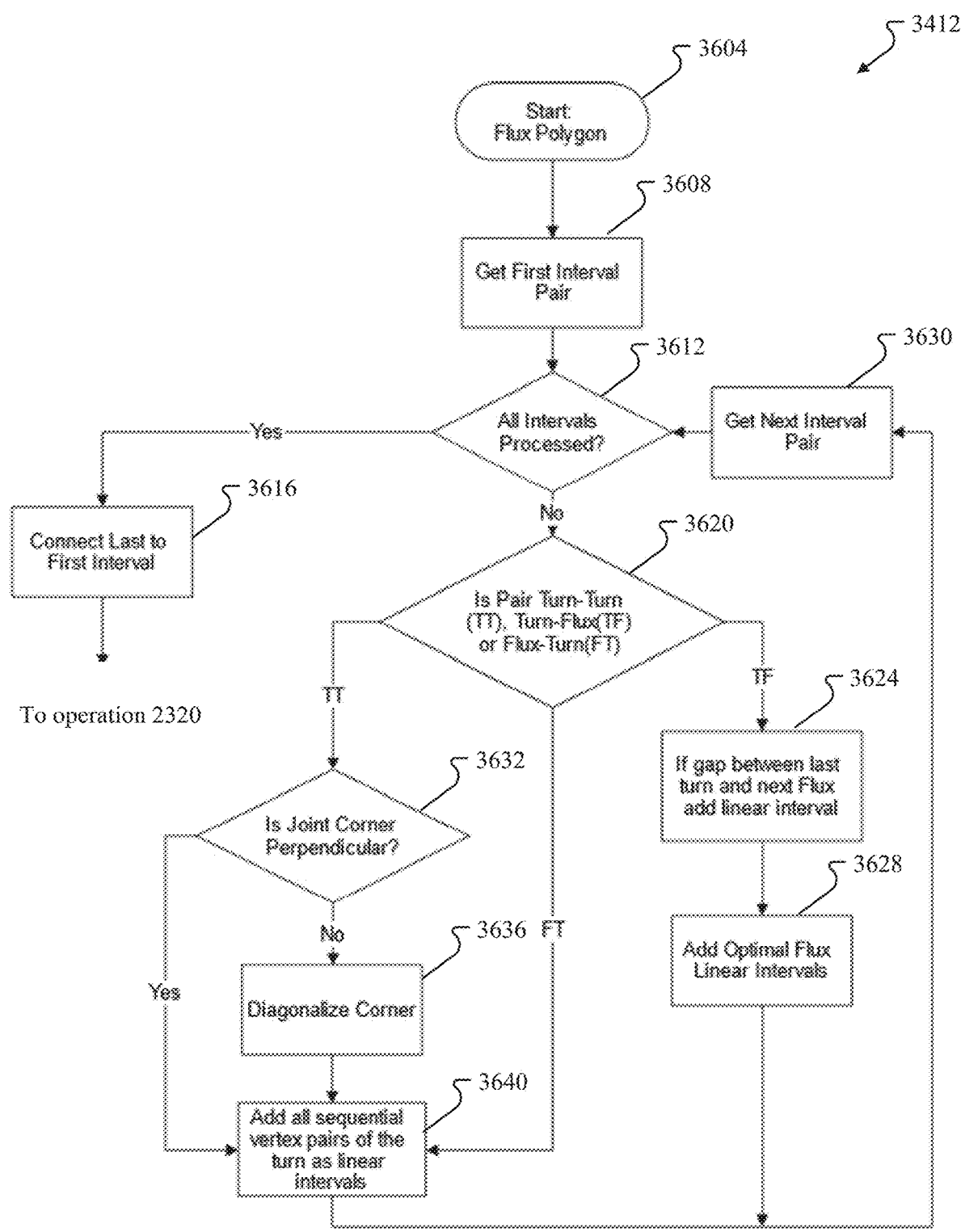
FIG. 36 illustrates a method that provides further details for an operation in FIG. 34 according to at least one example embodiment.

FIG. 36 illustrates a method that provides further details for operation 3412 from FIG. 34, which relates to processing flux intervals of the turn-flux polygon. As shown, the method begins with a flux interval of the turn/flux form of the polygon at operation 3604 and ends by proceeding to operation 2320.

Operation 3608 includes obtaining a first pair of intervals (e.g., two sequential intervals encountered while moving in a CCW direction over the polygon). Here, it should be appreciated that in a polygon in turn/flux form, an interval can be either a turn or a flux and that two fluxes cannot be adjacent to one another (recall that a flux may correspond to segments that span two or more sequential vertices while a turn corresponds to segments that spans four or more vertices). Therefore, there are three interval pair possibilities: Turn-Turn (TT), Turn-Flux (TF), and Flux-Turn (FT).

Operation 3612 determines whether all intervals have been processed. If so, the method proceeds to operation 3616 and connects a last interval (most recently processed turn or flux) to a first interval (first processed turn or flux)

before proceeding to operation 2320, thereby indicating that the method has iterated through all flux and turn intervals of the polygon. If not, the method proceeds to operation 3620 to determine whether the obtained interval pair is a TT pair, a TF, pair, or an FT pair. Thereafter, the method proceeds to the appropriate branch.

If the interval pair is a TF pair, the method proceeds to operation 3624 and adds a linear interval to the TF pair, for example, when a gap exists between the last turn interval added to the linear contour and the next flux (if no gap exists, operation 3624 is skipped).

Operation 3628 includes adding linear intervals to the linear contour of the polygon using flux vertices within the TF pair. Operation 3628 is described in more detail below with reference to FIG. 37. Thereafter, the method proceeds to operation 3630 to get the next interval pair before returning to operation 3612.

If operation 3620 determines that the interval pair is an FT pair, the method proceeds to operation 3640 and adds all sequential vertex pairs of the turn as linear intervals for the linear contour of the polygon before moving to operation 3630 to obtain a next interval pair.

If operation 3620 determines that the interval pair is a TT pair, then operation 3632 determines whether a joint corner of the TT pair is perpendicular. Operation 3632 is described in more detail below with reference to FIG. 45. If the joint corner of the TT pair is perpendicular, the method proceeds to operation 3640 to add the TT pair of intervals to the linear contour of the polygon. If not, the method proceeds to operation 3636 to diagonalize the corner of the TT pair of intervals before adding the TT pair with the diagonalized corner to the linear contour in operation 3640.

Figure 37:
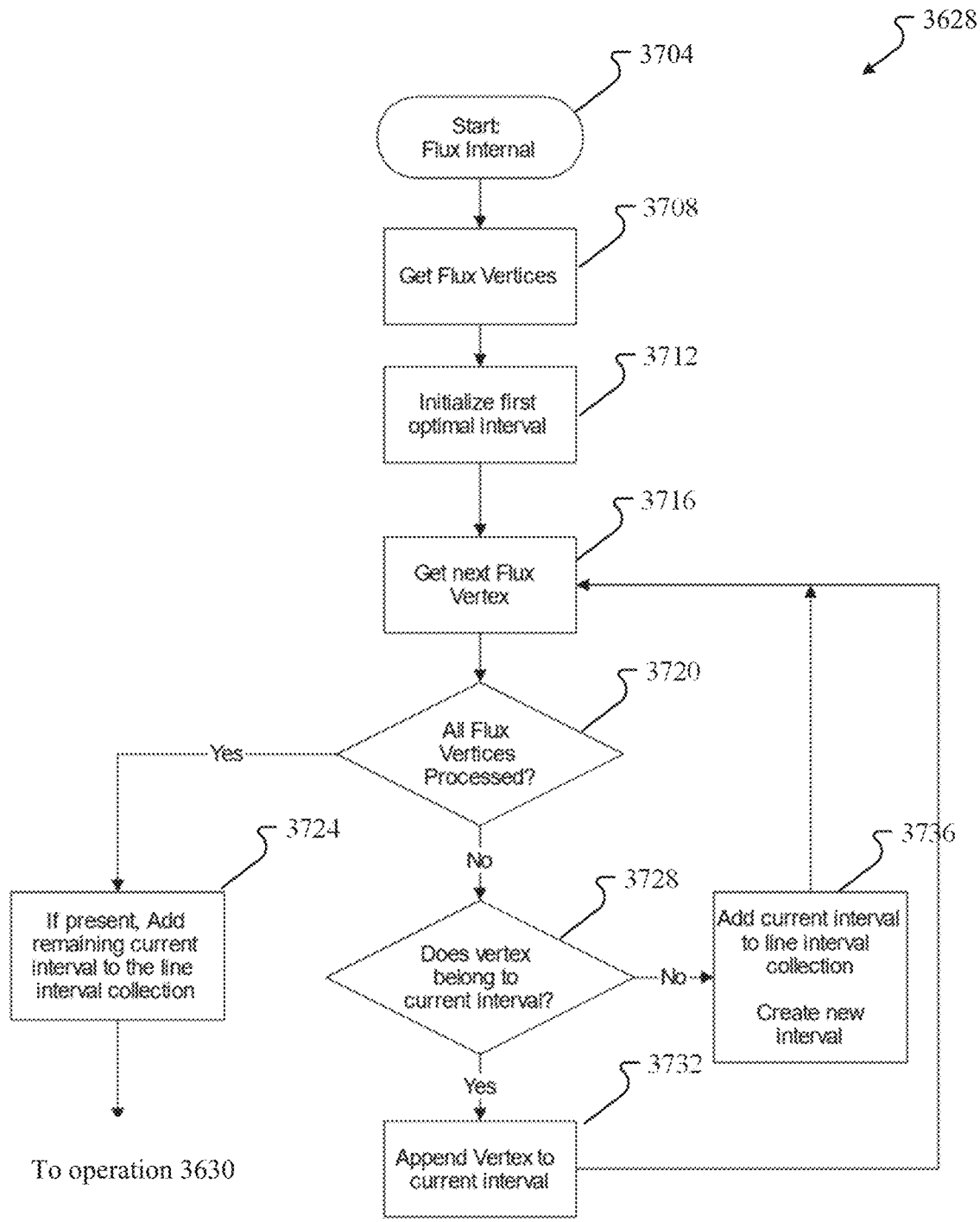
FIG. 37 illustrates a method that provides further details for an operation in FIG. 36 according to at least one example embodiment.

FIG. 37 illustrates a method that provides further detail for operation 3628 in FIG. 36, which relates to building the linear contour of the polygon from flux intervals. As shown, the method begins with a flux interval at operation 3704 and ends by proceeding to operation 3630 in FIG. 36.

Operation 3708 includes obtaining a set of flux vertices which is described in more detail below with reference to FIGS. 38-40. In general, the set of flux vertices includes vertices that are then analyzed for inclusion into a linear interval of the linear contour of the polygon. The linear contour of the polygon may comprise more than one linear interval. Thus, a linear interval is considered as part of the linear contour of the polygon.

Operation 3712 includes initializing a linear interval (e.g., an optimal linear interval for inclusion in the linear contour of the polygon).

Operation 3716 includes obtaining a next flux vertex from the set of flux vertices obtained in operation 3708.

Operation 3720 includes determining whether all flux vertices in the set of flux vertices from operation 3708 have been processed. If so, the method proceeds to operation 3724 to add a remaining part (if any) of a current linear interval to the linear interval collection for inclusion in the linear contour of the polygon before proceeding to operation 3612. If not, the method proceeds to operation 3728, which includes determining whether the flux vertex belongs to a current linear interval under construction. If so, the method proceeds to operation 3732 and appends the flux vertex to a current linear interval (i.e., includes the flux vertex in a line that is part of the linear contour of the polygon). If not, the method proceeds to operation 3736 and adds the current linear interval to the collection of linear intervals and initiates a new linear interval before returning to operation 3716. As may be appreciated, operation 3728 is described in more detail below with reference to FIGS. 41 to 44B.

Figure 38:
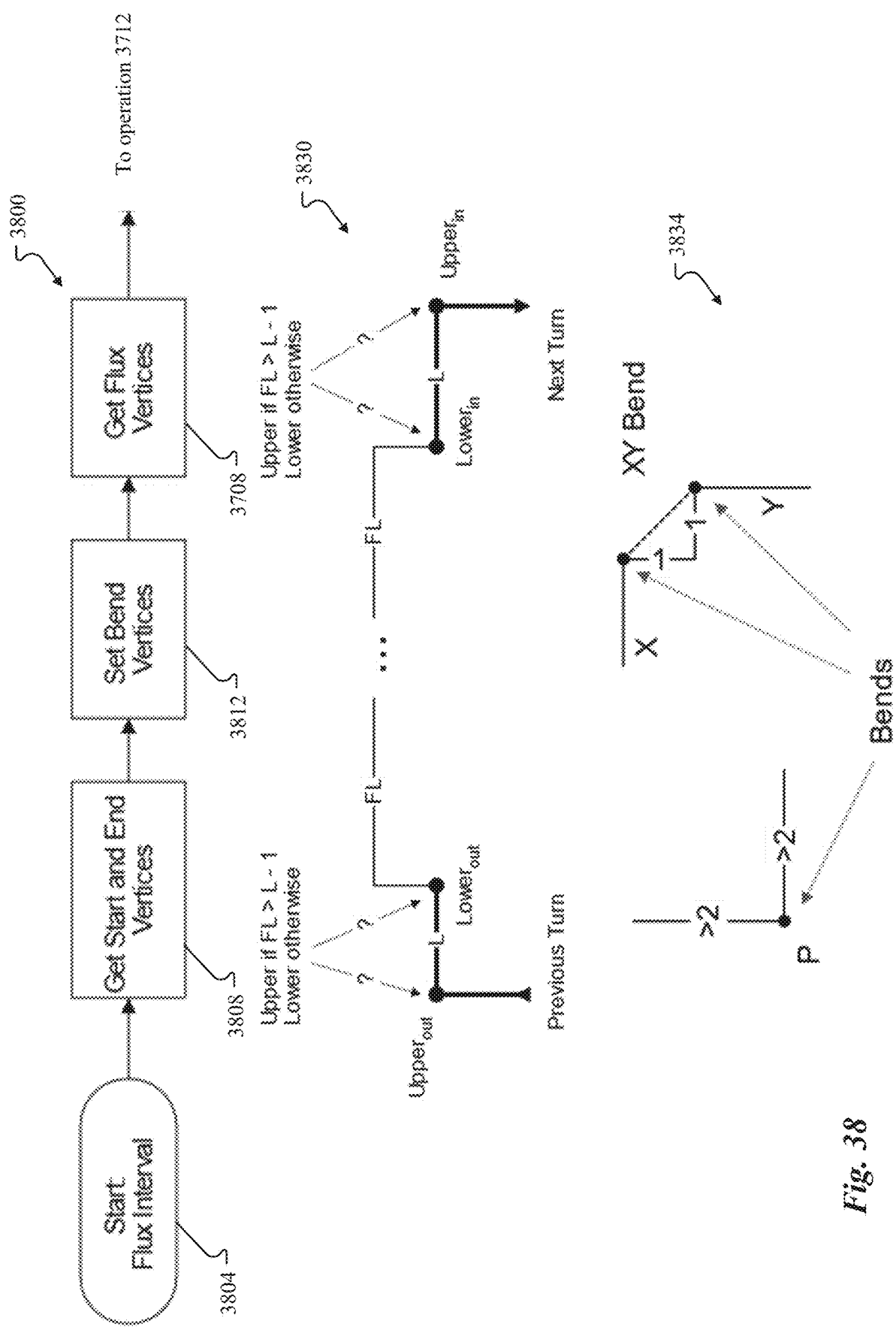
FIGS. 38-40 illustrate methods and examples that provide further details for an operation in FIG. 37 according to at least one example embodiment.
Figure 39:
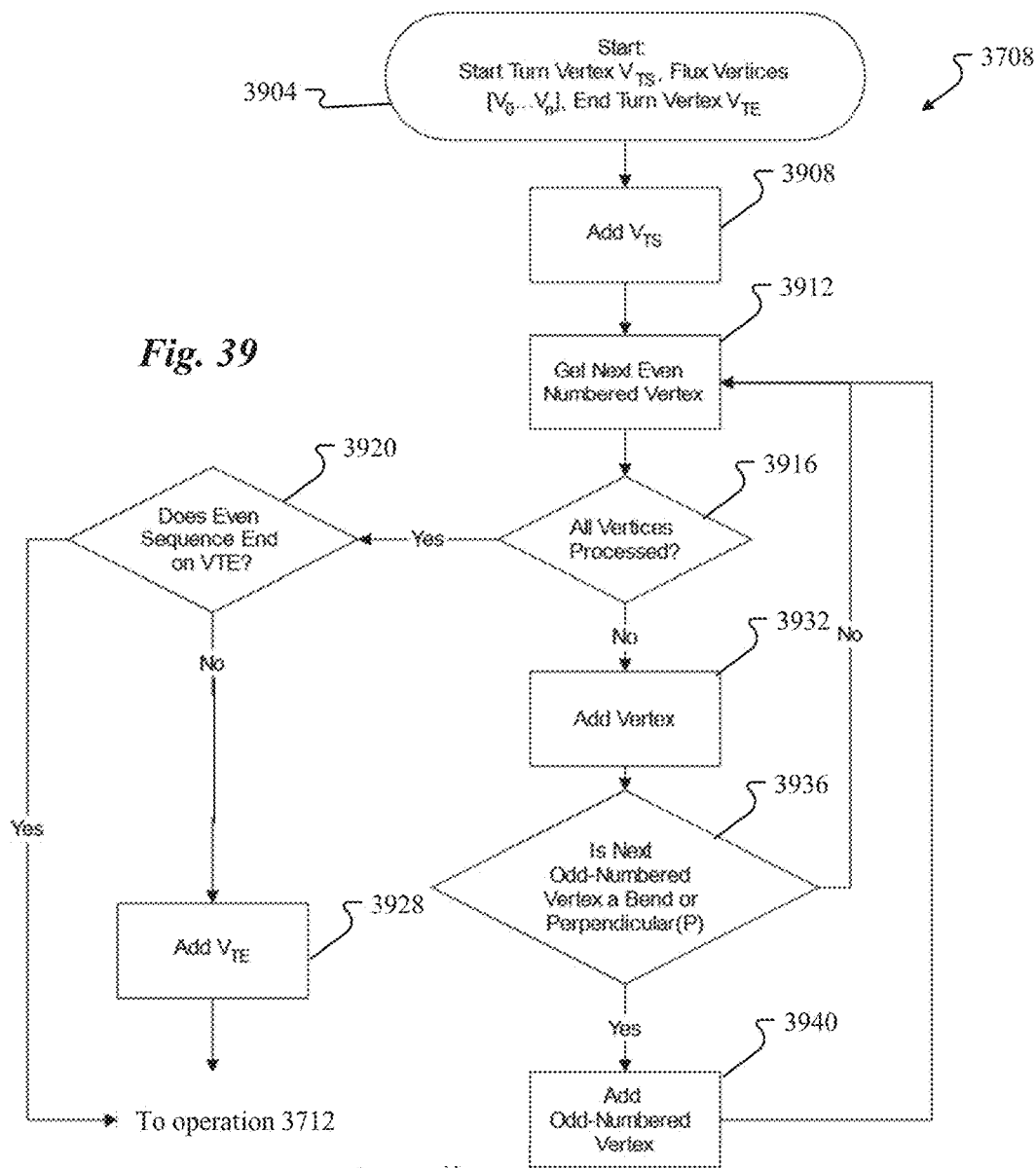
Figure 40:
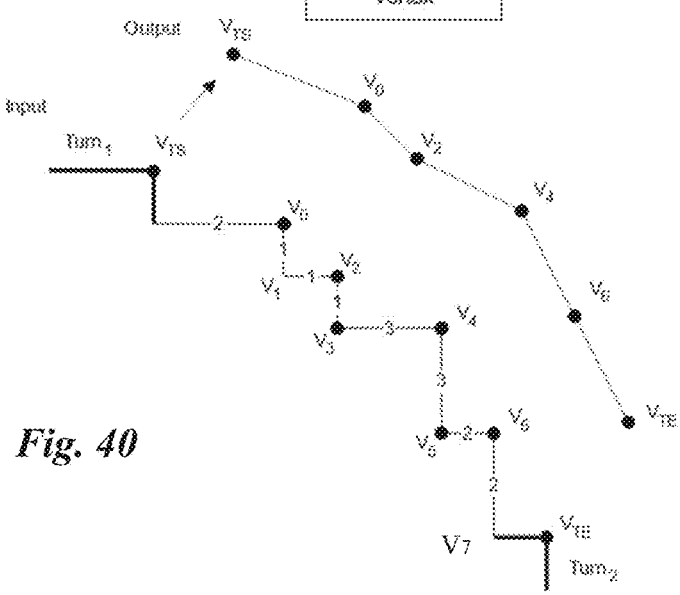

FIGS. 38-40 illustrate methods and examples that provide further details for operation 3708 in FIG. 37.

FIG. 38 illustrates a method 3800 that relates to obtaining certain information useful for carrying out operation 3708 in FIG. 37. The method 3800 begins with a flux interval (a set of flux vertices) at operation 3804 and ends by proceeding to operation 3712 in FIG. 37.

Operation 3808 includes obtaining start and end vertices of the flux interval (recall that FIGS. 37 and 38 relate to operations for a TF pair of intervals). Graphic 3830 illustrates how to obtain start and end vertices of the flux interval. As may be appreciated from graphic 3830, each flux interval (thin lines) in this example is bound by two turn intervals (Previous Turn and Next Turn). Each turn interval (thick lines) has an upper and lower vertex (Upper$_{out}$, Lower$_{out}$; Upper$_{in}$, Lower$_{in}$). If the nearest Flux Length (FL) is greater than the Turn Length (L)–1, then the upper vertex is selected. Otherwise, the lower vertex is selected. This logic applies for both bounding turns so that the flux interval has a start vertex at one turn and an end vertex at the next turn.

Operation 3812 includes setting bend vertices (if any), an example of which is illustrated by graphic 3834. In between the start and end flux vertices, if any vertex has a Perpendicular Axis trait (P trait) or if vertices form an XY Bend (e.g., a vertex with a U axis trait), then operation 3812 sets the indicated vertices as a bend. Bends are automatically included in the set of flux vertices from operation 3708 and bends cause termination of a linear interval as discussed in more detail below with reference to FIGS. 41 to 44B.

Operation 3708 occurs subsequent to operation 3812 and is described in more detail below with reference to FIGS. 39 and 40.

FIGS. 39 and 40 illustrate a method and an example that provides further details for and/or understanding for operation 3708 in FIGS. 37 and 38, which relates to forming a set of flux vertices that are later analyzed to generate a linear interval of a linear contour of the polygon.

As shown in FIGS. 39 and 40, the method begins with considering a start turn vertex VTS, flux vertices V0 . . . Vn, and an end turn vertex VTE and ends by returning to operation 3630 in FIG. 36. The start turn vertex VTS and end turn vertex VTE may be determined in accordance with FIG. 38.

Operation 3908 includes adding the start turn vertex VTS to a set of flux vertices that will be analyzed for inclusion in the linear contour of the polygon.

Operation 3912 includes obtaining a next even numbered flux vertex, which is the first flux vertex V0 in FIG. 40.

Operation 3916 includes determining whether all vertices in the set of vertices from VTS to VTE are processed. If so, the method proceeds to operation 3920.

Operation 3920 includes determining whether vertex VTE corresponds to an even numbered vertex in the set of flux vertices. If so, the method proceeds to operation 3712 in FIG. 37. If not, the method proceeds to operation 3928 where vertex VTE is added as a vertex to the set of flux vertices and the method proceeds to operation 3712.

If, in operation 3916, all flux vertices in the set of flux vertices from VTS to VTE are not processed for inclusion into the set of flux vertices, the method proceeds to 3932 and adds the next even numbered vertex from operation 3912 to the set of flux vertices.

Operation 3936 includes determining whether the next odd-numbered vertex is a bend as in FIG. 38 or has a perpendicular axis P trait as in FIG. 38. If not, the method proceeds back to operation 3912 to get the next even numbered vertex. If so, the method proceeds to operation

3940 and adds the odd-numbered vertex to the set of vertices to be analyzed as part generating a linear contour for the polygon.

FIGS. 41-44B illustrate additional details for operation 3728 in FIG. 37, which relates to constructing a linear interval as part of the linear contour of the polygon by determining whether a vertex (e.g., a flux vertex) belongs to a linear interval that is currently under construction for inclusion in the linear contour of the polygon.

In general, operation 3728 relates to determining whether a vertex should be part of a linear interval for inclusion into the linear contour of the polygon generated by operation 2316 of FIG. 23. As may be appreciated, the decision in operation 3728 is made using a current state of the linear interval under construction and a length of a next vertex, which can be accomplished in O(n) time. Notably, the process does not use metric distance decisions (e.g., linear regressions, etc.) of which points to include in a linear interval. If a next vertex belongs to the current state, the vertex is added to the state (possibly evolving the state). If not, then the current linear interval terminates and a new linear interval is initiated.

With reference to the charts in FIG. 41 and the state machine in FIG. 42, a vertex can append to the current linear interval if the vertex is not a bend and matches or expands into one of the linear patterns shown in chart 4100. In chart 4100, A and B correspond to lengths between vertices (recall that a length of one may correspond to a length and/or width of one pixel of the digital input polygon), and "n" and "m" correspond to different sequential frequencies of state A (e.g., how many times a length of A is sequentially encountered over a set of sequential vertices). In this example, m differs from n by +1 or −1 but not both. In all patterns, state B is not allowed to be encountered multiple times in a row. As discussed in more detail below with reference to FIGS. 42 to 44B, if two B states are encountered in a row, state A and B swap so that state B becomes state A and state A becomes state B.

Chart 4104 illustrates how the four patterns in chart 4100 result from the four fractional possibilities of a standard linear equation y=mx+b, where m is the slope Δy/Δx (in this case b=0). For chart 4104, define: 1) r=frac(m) where frac(m) is the fractional part of m (e.g., if m=10.345, r=0.345; 2) rc=1−r; 3) ratio=max(r/rc, rc/r); 4) f=frac(ratio).

FIG. 42 illustrates a state machine 4200 for the patterns shown in FIG. 41 with conditions 0 through 6 listed as shown in FIG. 42. The state machine 4200 detects the linear sequences as allowed linear patterns for the linear contour of the polygon. The state machine 4200 starts with the first vertex length (in terms of segments) as A in state A. If A is a value other than 1, then the linear pattern axis is the axis of that length (see FIG. 28). If A is 1, then the axis is U and can subsequently evolve to the X or Y axis. Each subsequent vertex introduces a new length along the Axis. If the new length is one different from A, then set B to that length. Once B is set, then the axis of the linear pattern must be either X or Y. If any subsequent vertex satisfies the state machine 4200, the vertex is added to the linear interval. If a new vertex is a bend, has a length that differs by more than 1 compared to A or B, fails to satisfy any transition condition of the current state, or changes axis (from X to Y or Y to X), the current linear interval under construction terminates and a new linear interval begins.

Figure 43:
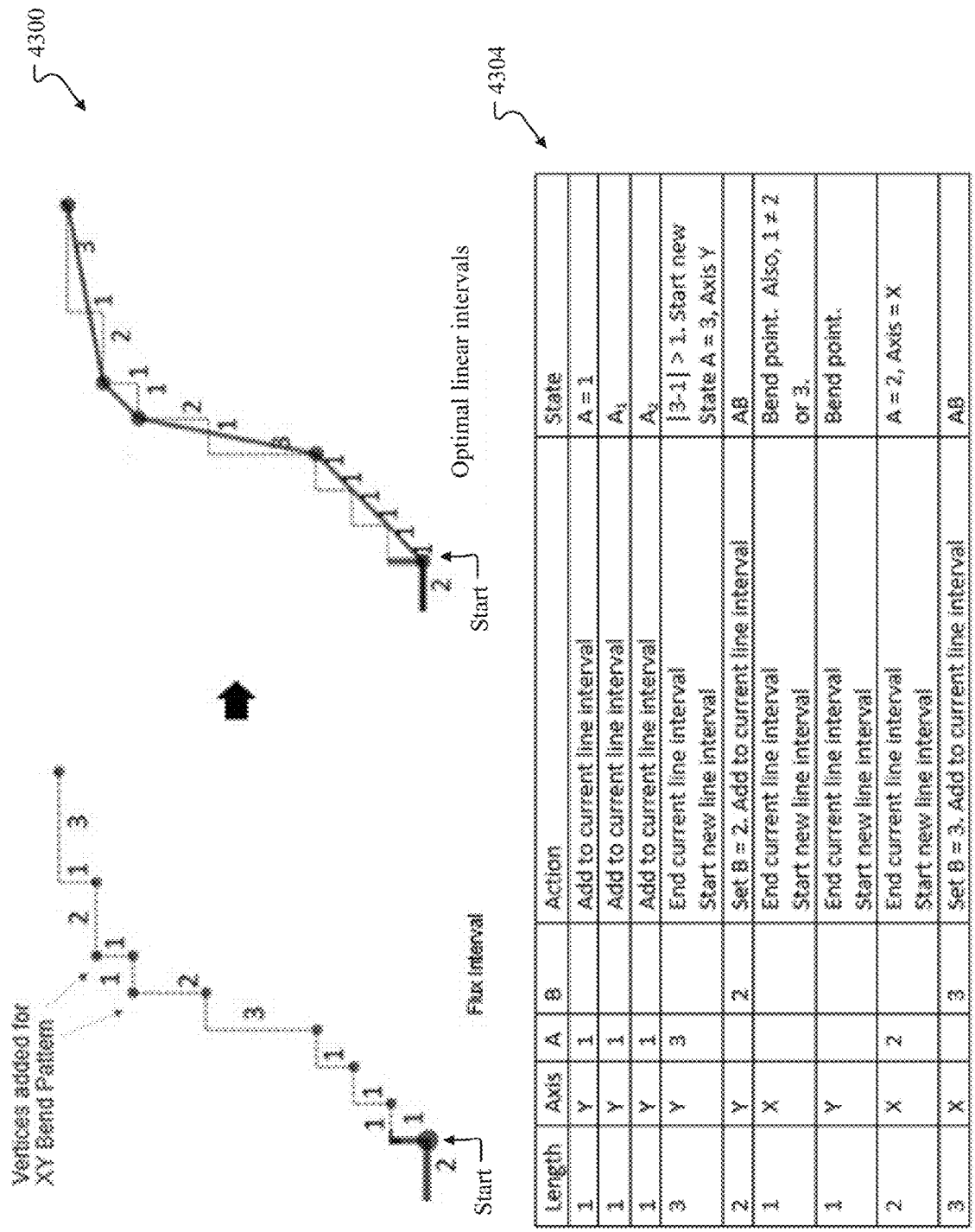

FIG. 43 illustrates an example with graphic 4300 and chart 4304 for constructing a linear interval using the state machine 4200 have six states with four patterns from chart 4100. The example begins with a flux interval. Lengths between each vertex are shown in terms of a number of segments between each vertex. Here, it should be appreciated that operation 3708 generates the flux vertices of the flux interval while operations 3728, 3732, and 3736 are performed to generate the optimal linear interval portion of graphic 4300, where each linear interval is located between two dots in the graphic (4 total linear intervals shown).

Chart 4304 shows the distance between two vertices of a flux interval in terms of segments (recall that a segment is a unit of length that spans between two vertices in the vertex form of the polygon), the axis of direction (X or Y), the state of the input A or B, the action that occurs, and the current state within the state machine 4200. The chart 4304 shows various conditions for adding a vertex to a linear interval and for terminating a linear interval in accordance with the state machine 4200. Graphic 4300 further illustrates how vertices are added for an XY bend pattern as in FIG. 38.

FIGS. 44A and 44B illustrate charts 4400 and 4404 for describing how one progresses through the state machine 4200. The charts 4400 and 4404 illustrate inputs to the state machine (i.e., lengths between vertices under consideration), states for A and B, values for n and m, various notes associated with each input, and the overall pattern of the states. In the example of FIGS. 44A and 44B, the inputs (lengths between flux vertices) are shown as being 1 and 2, but these values are merely for the sake of explanation and the inputs may vary according to the turn/flux form of the polygon.

Here, it should be appreciated that FIGS. 41 to 44B and related text describe one possible approach for obtaining a linear contour of a polygon based on a turn/flux form of the polygon. However, other suitable approaches may be used to accomplish the same or similar outcome. For example, one may adjust the patterns on which the state machine is based in order to devise a new state machine that arrives at a same linear contour as that shown in FIG. 43, for example.

FIG. 45 illustrates an example graphic 4500 useful for carrying out operation 3632 from FIG. 36.

When turns are adjacent to one another in a turn/flux form polygon (i.e., a TT pair), the joint between the two turns can be diagonal or perpendicular. Thus, if a joint of a TT pair matches one of the seven patterns in the graphic 4500, operation 3632 assigns the joint as perpendicular. Otherwise, operation 3632 assigns the joint as a diagonal.

FIG. 45 further illustrates an example graphic 4504 that shows how operation 2316 resolves a highly pixelated polygon (left side) to form an accurate linear contour (right side). That is, graphic 4504 shows how the problem illustrated in FIG. 21 is solved for a highly pixelated "V" character. As shown, the optimal linearity algorithm solves the corner interpretation problem of FIG. 21 in that the highly pixelated turn/flux form 'V' is transformed into ten linear intervals [0,1], [1,2] . . . [9,0]. Intervals: [7,8] [8,9] [0,1] [2,3] [3,4] came from the turn intervals of the polygon while intervals [1,2] [4,5] [6,7] [9,0] come from the flux intervals of the polygon. The optimal linearity result collection always forms a closed polygon. Flux interval [6,7], for example is a diagonalization of the flanking turn intervals.

Example embodiments will now be discussed with respect to generating the final contour (e.g., optimal contour) of the polygon based on the linear contour of the polygon. That is, operations discussed below further detail operation 2320 from FIG. 23. As noted for FIG. 23, operation 2320 transforms the linear contour of the polygon from operation 2316 to the polygon's final contour, which may be an optimal contour. An optimal contour contains the minimum amount information that equivalently (or near equivalently) represents the input digital polygon.

Figure 46:
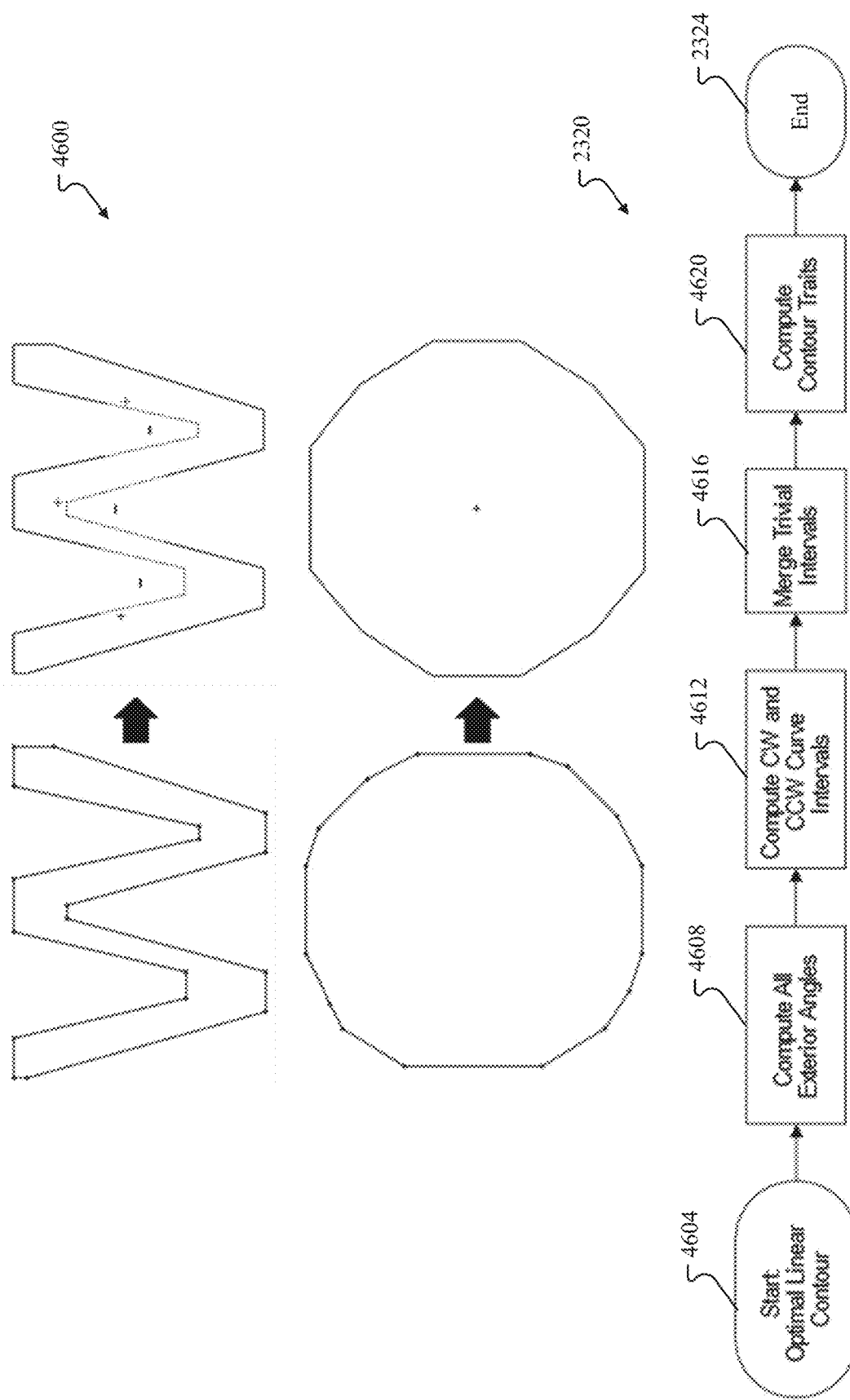
FIG. 46 illustrates a graphic where the 'W' is reduced to three specific concave intervals and three specific convex intervals according to at least one example embodiment.

FIG. 46 illustrates a graphic 4600 where the 'W' is reduced to three specific concave curve intervals and three specific convex curve intervals. Meanwhile, the circle is reduced to one convex interval. The optimal contour normalizes the curves in the circle to better represent the symmetry and apex of each of the linear intervals. The discussion that follows explains how.

FIG. 46 further illustrates general method for operation 2320, which begins at operation 4604 with the linear contour of the polygon generated in operation 2316 and ends with operation 2324 from FIG. 23.

Operation 4608 includes determining or computing all exterior angles of the linear contoured polygon. Operation 4608 is described in more detail below with reference to FIG. 47.

Operation 4612 includes determining or computing CW and CCW curve intervals of linear contoured polygon. Operation 4612 is described in more detail below with reference to FIGS. 48 and 49.

Operation 4616 includes merging trivial intervals determined in operation 4612. Operation 4616 is described in more detail below with reference to FIGS. 50-54.

Operation 4620 includes determining or computing contour traits of the final contour of the polygon. Operation 4620 is described in more detail below with reference to FIG. 55.

Figures 47, 48:
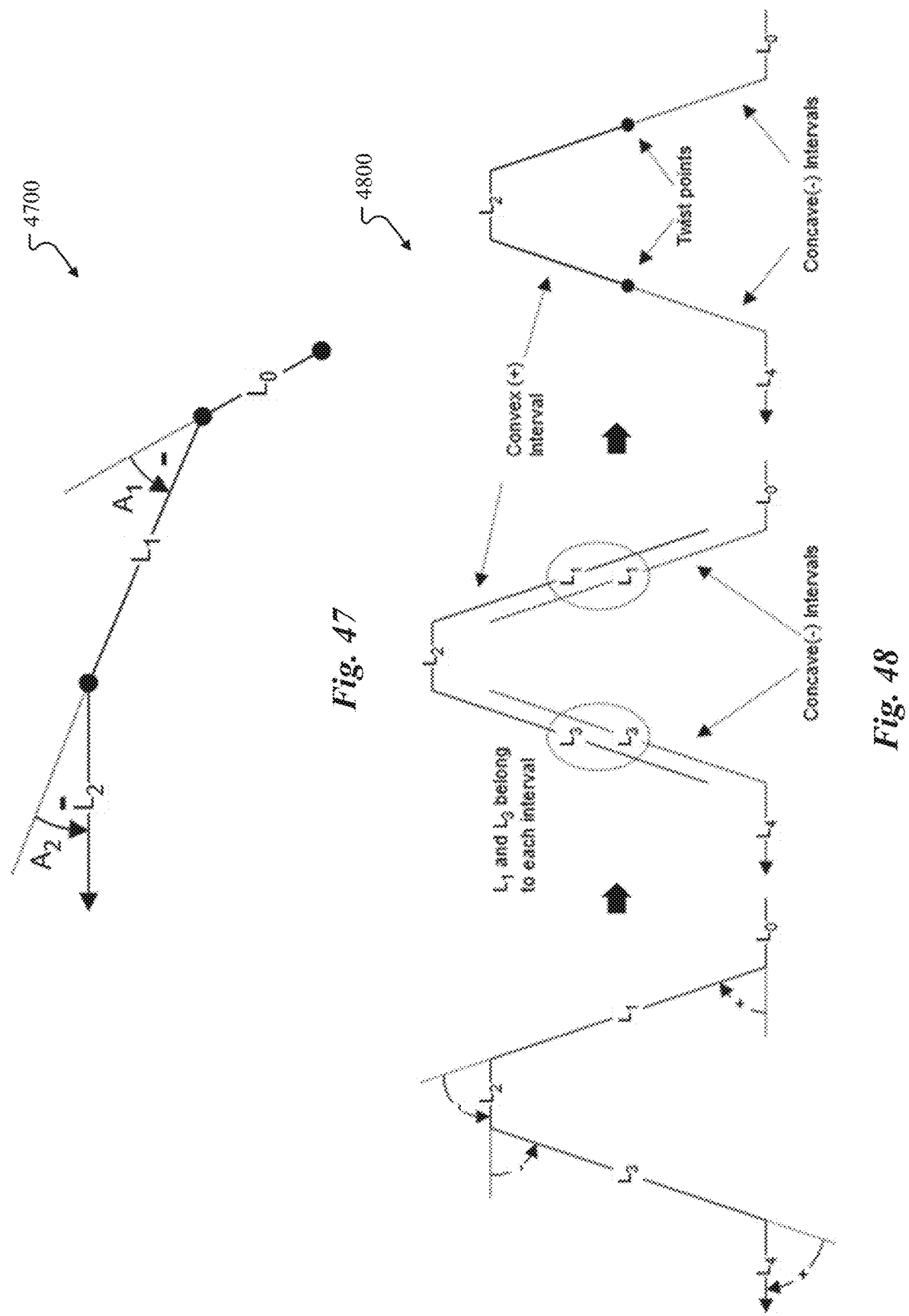
FIG. 47 illustrates a graphic for an operation in FIG. 46 according to at least one example embodiment.
FIG. 48 illustrates a graphic for an operation in FIG. 46 according to at least one example embodiment.

FIG. 47 illustrates a graphic 4700 for operation 4608 to compute exterior angles of the linearly contoured polygon. As shown, for each linear interval L0, L1, L2 in the linear contour of the polygon, operation 4608 computes a CW/CCW exterior angle (A1, A2) between a respective linear interval and a next linear interval. The shortest distance or smallest angle between an extension of one linear interval and the next linear interval determines whether to move CCW or CW toward the next linear interval. Per the convention used in the examples discussed above, CCW is assigned – and CW is assigned +.

Once the external angles of the linearly contoured polygon are assigned + or –, all angles assigned + may be grouped together and all angles assigned – may be grouped together. The transition from CW to CCW occurs on a linear interval where the linear interval is simultaneously the end of one curve interval and start of the next. A twist point resides on this shared line.

With reference to graphic 4600 in FIG. 46 and graphic 4800 in FIG. 48, consider the top middle of the 'W' shown in graphic 4800. The – to + transition of angles imply a change in convexity and each transition may be associated with a curve interval. Here, a curve interval should be understood as one or more sequential linear intervals that have been assigned + or – in accordance with the process noted above. Two transitions are illustrated in FIG. 48. Linear intervals $L_0$ and $L_1$ form a concave curve interval while linear intervals $L_1$, $L_2$, $L_3$ form a subsequent convex curve interval. Linear intervals $L_2$, $L_3$, $L_4$ form another concave curve interval. The concave and convex curve intervals share lines $L_1$ and $L_3$, meaning that there is overlap between two curve intervals. Overlapping curve intervals merge and form twist points as indicated. Here, it should be appreciated that any change in concavity between two sequential linear intervals will have a previous one with overlap. For example, linear interval $L_4$ is added to the same curve interval as $L_3$ because $L_4$ changes concavity compared to $L_3$.

Figure 49:
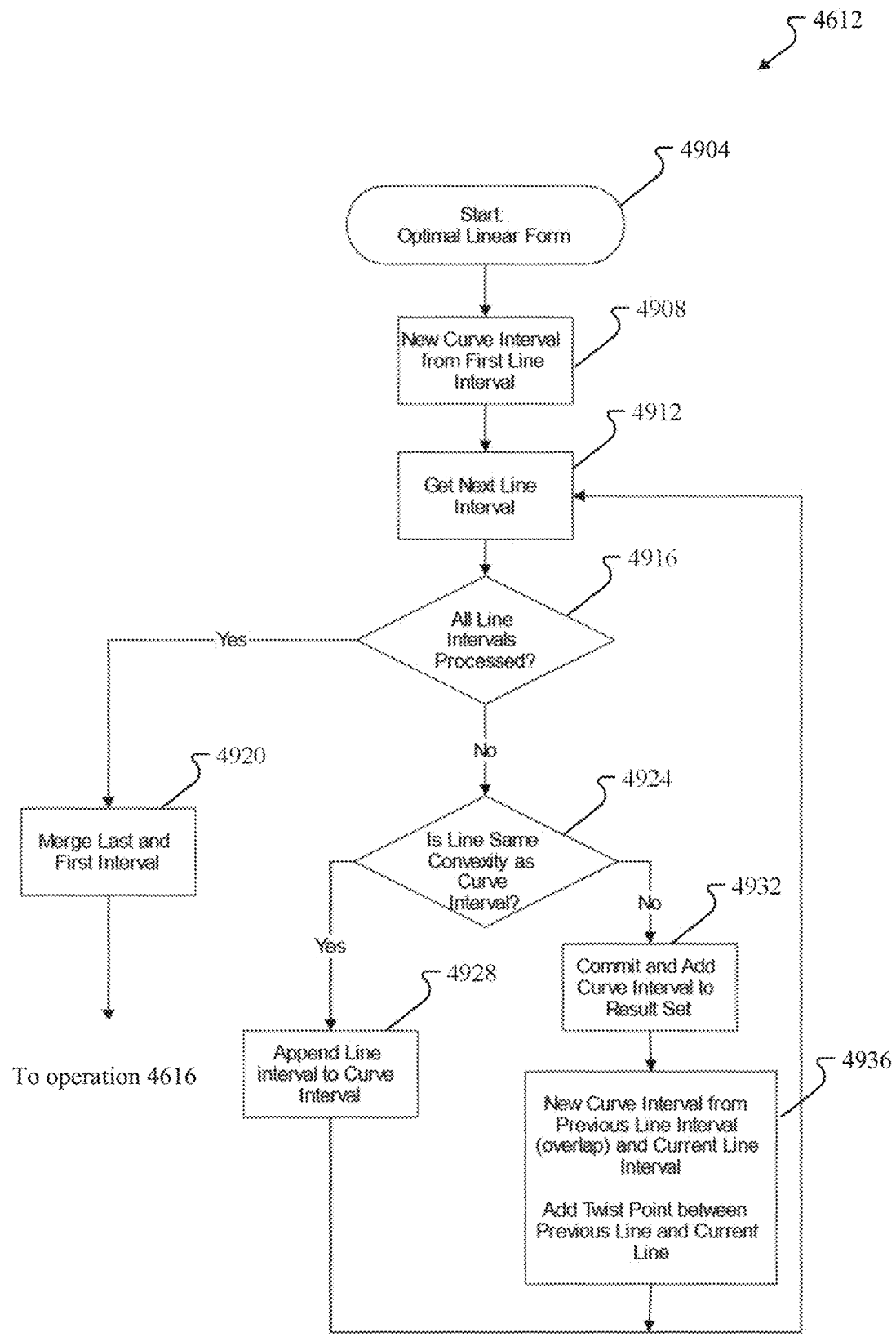
FIG. 49 illustrates a method that provides further details for an operation in FIG. 46 according to at least one example embodiment.

FIG. 49 illustrates a method that provides further detail for operation 4612 in FIG. 46 and for the graphic 4800 in FIG. 48. As shown, the method begins with the linear contour form of the polygon obtained in operation 2316 from FIG. 23 and ends by proceeding to operation 4616 in FIG. 46. FIG. 49 will be explained with reference to the graphic 4800 in FIG. 48.

Operation 4908 includes obtaining a curve interval from a linear interval of the linear contour form of the polygon. For example, operation 4908 selects one of the linear intervals ($L_0$) from a hull the linear contour of the polygon and determines the sign (+ or –) associated with that linear interval. The method may move CCW so that operation 4912 obtains a next linear interval ($L_1$). The linear intervals in operation 4908 and in 4912 may be sequential linear intervals for the linear contour of the polygon where, as noted above, each linear interval may become a curve interval that is +(convex) or – (concave).

Operation 4916 includes determining whether all linear intervals of the linear contour polygon are processed. If so, then the most recently processed curve interval and the first processed curve interval may be merged in operation 4920 before the method proceeds to operation 4616 in FIG. 46. FIG. 50 illustrates examples for merger in more detail.

If, in operation 4916, all linear intervals of the linear contour of the polygon have not yet been processed, then the method proceeds to operation 4924. Operation 4924 includes determining whether a linear interval corresponds to a curve interval that has a same convexity as the curve interval from operation 4908. For example, operation 4924 determines whether a sign (+ or –) of the linear interval ($L_0$) in operation 4908 matches a sign (+ or –) of the linear interval ($L_1$) in operation 4912. If so, then the method proceeds to operation 4928 to append the linear interval ($L_1$) from operation 4912 to the linear interval ($L_0$) from operation 4908 to form a curve interval. If not, then the method proceeds to operation 4932 to commit the linear interval ($L_0$) from operation 4908 (now a curve interval with a + or –) to the final set of curve intervals that makeup the final contour of the polygon. Thereafter, operation 4936 includes obtaining a curve interval from the previous linear interval ($L_1$) that overlaps the current linear interval ($L_2$) and adding a twist point between the previous linear interval ($L_1$) and the current linear interval ($L_2$). The method then returns to operation 4912.

FIG. 50 illustrates a graphic 5000 showing six possible merge scenarios for operation 4920 in FIG. 49. The shapes in the left column of graphic 5000 correspond to inputs of operation 4920 while the shapes in the right column of graphic 5000 correspond to outputs of operation 4920.

Figure 51:
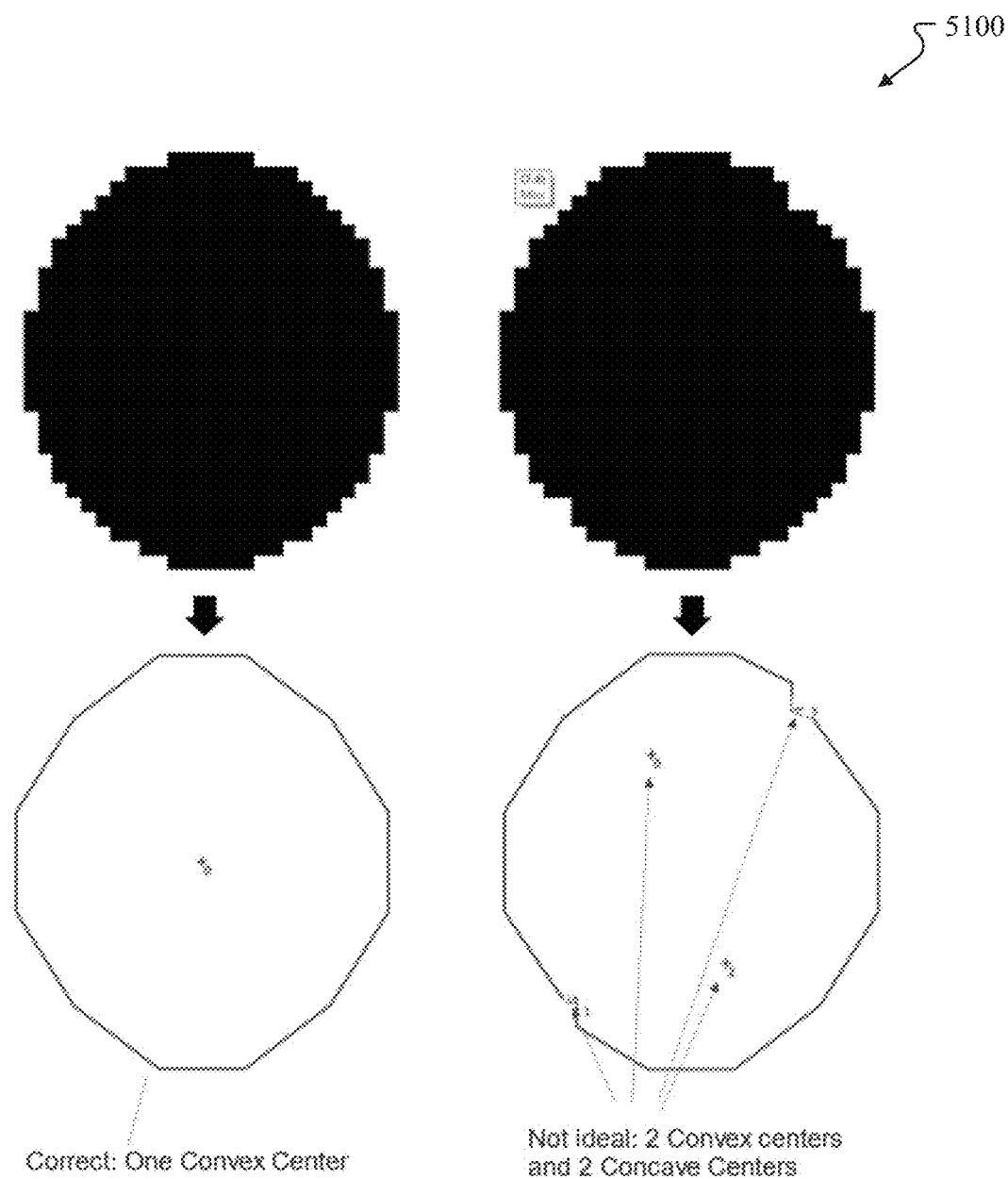

FIGS. 51 to 54 illustrate graphics and methods that provide additional details for operation 4616 in FIG. 46, which relates to merging trivial curve intervals. Graphic 5100 in FIG. 51 illustrates two different digital input polygons at the top and their corresponding final contours at the bottom. Comparing the left column of the graphic 5100 to the right column of the graphic 5100, one may appreciate that a slight variation in part of the input digital polygon (e.g., due to noise) results in a non-ideal final contour. In other words, both input polygons should resolve to a circle contour. However, the one on the right has two pixels missing on its boundary. Pixel noise, therefore, may have an effect on the concavity determination of a boundary. As discussed in more detail below, the methods described herein have already provided the convex and concave series information that can be used to uniquely identify these anomalies and remove them. The additional information needed to remove the anomalies relates to the notion of size (height, area, dominant convex length, etc.) of the anomaly to remove. Thus, example embodiments employ a size limit to solve the problem.

Figure 52:
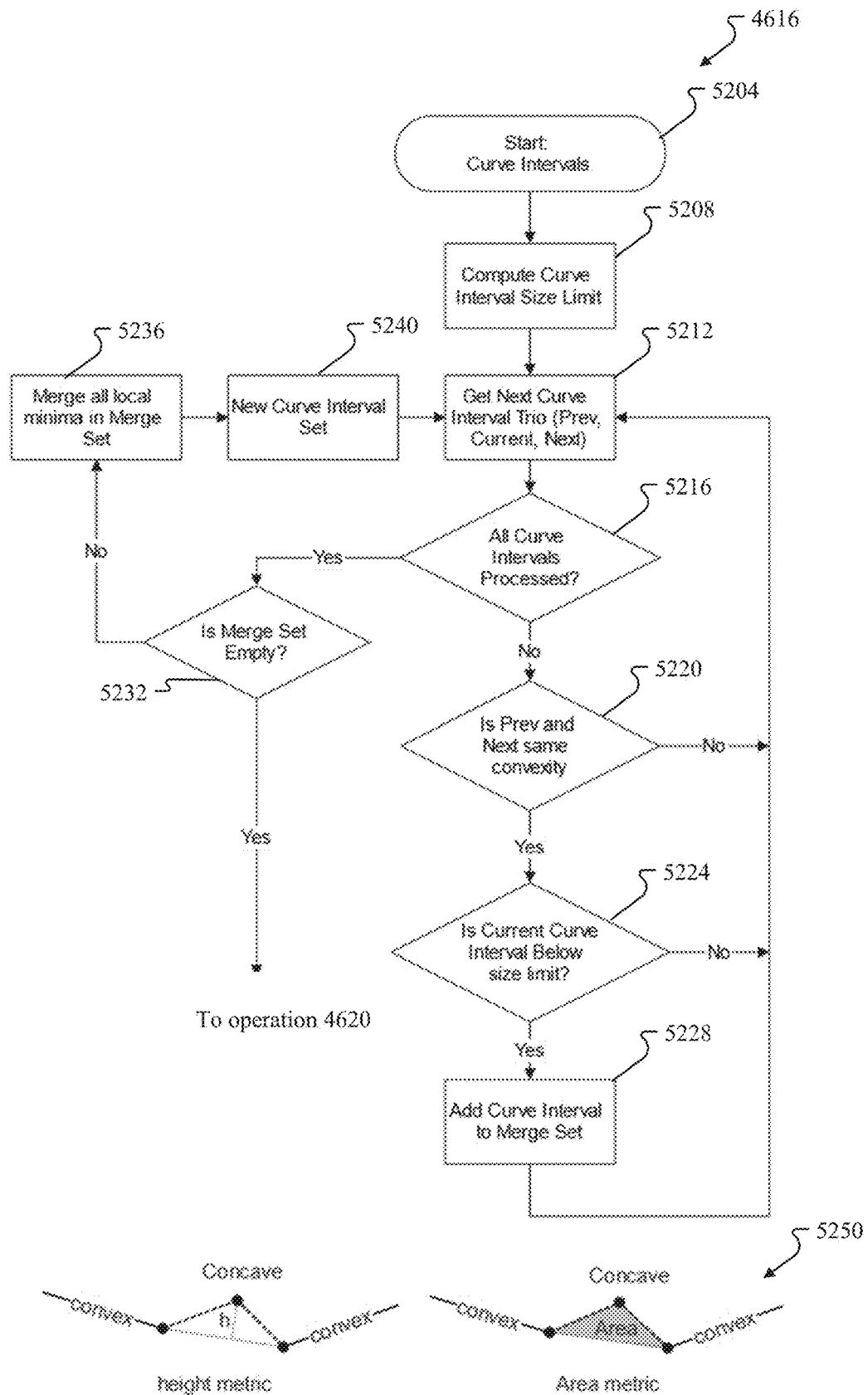

FIG. 52 illustrates a method that provides further details for operation 4616 in FIG. 46, which relates to merging trivial intervals.

As illustrated in FIG. 52, the method begins at 5204 with the curve intervals from operation 4612 and ends by proceeding to operation 4620 in FIG. 46.

Operation 5208 includes computing a curve interval size limit. Graphic 5250 illustrates size limit methods that can be used to filter unwanted curve intervals. In general, the curve interval size limit is a design parameter based on empirical evidence and/or preference (e.g., the type of application to which the method 2300 is applied). For example, a curve interval may be removed if height h (in terms of segments, for example) is less that a given threshold. In addition, each curve interval's arc length (which is available at this point), could be used to determine the relative significance of h or Area.

Operation 5212 includes obtaining a next curve interval trio, which corresponds to a current curve interval under consideration, a previous curve interval, and a next curve interval.

Operation 5216 includes determining whether all curve intervals in the curve interval polygon have been processed. If so, the method proceeds to operation 5232. If all curve intervals have not been processed, the method proceeds to operation 5220.

Operation 5220 includes determining whether the previous curve interval and the next curve interval from operation 5212 have a same convexity (as indicated by the + or − of each curve interval). If so, the method proceeds to operation 5224. If not, the method returns to operation 5212.

Operation 5224 includes determining whether the current curve interval from operation 5212 is below the size limit computed in operation 5208. If so, the method proceeds to operation 5228 and adds the current curve interval to a set of curve intervals to be merged (the merge set). If not, the method proceeds to operation 5212.

Operation 5232 includes determining whether the merge set is empty (i.e., the set of curve intervals formed at operation 5240 by iterating through the method of FIG. 52). If so, the method proceeds to operation 4620. If not, the method proceeds to operation 5236 to merge all local minima in the merge set. Operation 5236 is discussed in more detail below with reference to FIG. 53. Thereafter, the method proceeds to operation 5240 to start a new curve interval set (a new merge set) before returning to operation 5212.

Figure 53:
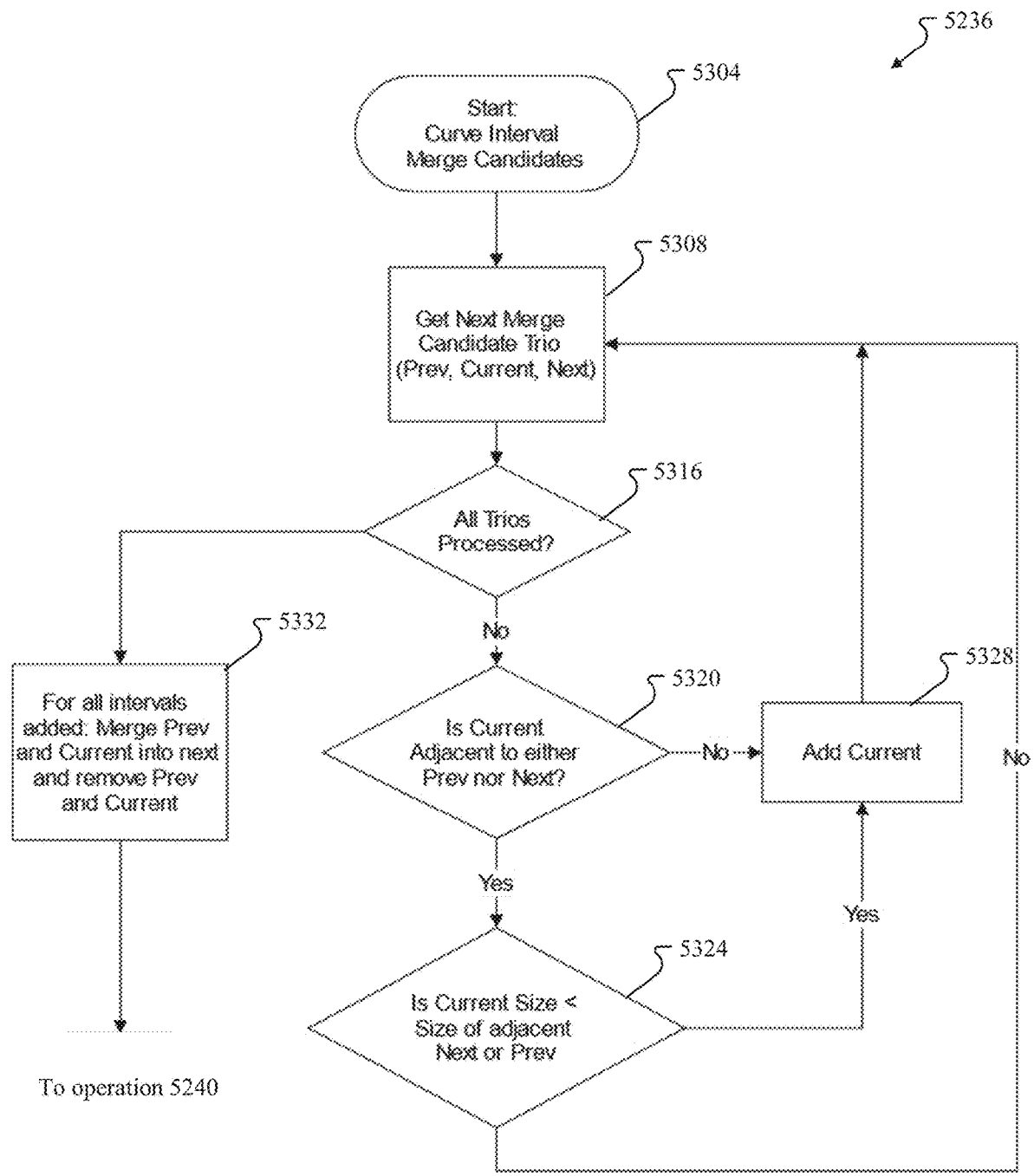

FIG. 53 illustrates a method that provides further details for operation 5236 in FIG. 52, which relates to merging local minima of curve intervals in a merge set of curve intervals.

As shown, the method begins at operation 5304 with the curve interval merge candidates in the merge set formed in FIG. 52 and ends by proceeding to operation 5240 in FIG. 52.

Operation 5308 includes obtaining a next merge candidate trio from the merge set, which may include previous, current, and next curve intervals.

Operation 5316 includes determining whether all trios of curve intervals in the merge set are processed. If so, the method proceeds to operation 5332. If not, the method proceeds to operation 5320.

Operation 5320 includes determining whether the current curve interval is adjacent to either the previous curve interval or the next curve interval. If so, the method proceeds to operation 5324. If not, the method proceeds to operation 5328 where the current curve interval is added to the set of curve intervals to be merged.

Operation 5324 includes determining whether a size of the current curve interval is less than a size of the adjacent next curve interval or previous curve interval. If so, the method proceeds to operation 5328 and adds the current curve interval to the set of curve intervals to be merged. If not, the method proceeds back to operation 5308.

If, in operation 5316, all trios are processed, the method proceeds to operation 5332, which includes merging, for all curve intervals added to the set in operation 5328, previous and current curve intervals into a respective next curve interval for inclusion in the final contour of the polygon and removing the previous and current curve intervals from the final contour of the polygon.

FIG. 54 illustrates graphic 5400 as an example that shows how to merge curve intervals in accordance with the methods described above with reference to FIGS. 51 to 53. In this example, say curve intervals 3, 4, 5, and 7 meet the trivial size criteria (i.e., these curve intervals have lengths in terms of segments that are less than a reference length). Operation 5236 above seeks to pick which curve intervals to merge together. Starting from 7 backwards:

7 is not adjacent to 5 or 3→add 7;

5 is not adjacent to 7 but is adjacent to 4. Pick smaller size or 4 and 5→add 5;

4 is adjacent to 3 and 5. 4 not smaller size than either. Skip 4

3 is adjacent to 4 and not adjacent to 7. 3 smaller size than 4→add 3

For each of the added curve intervals above, merge that curve interval with its successor and predecessor and remove that curve interval and the predecessor. For example, for curve interval 7: 7's successor is 0 and predecessor is 6. Join 6 to 0 and remove 6 and 7.

Figure 55:
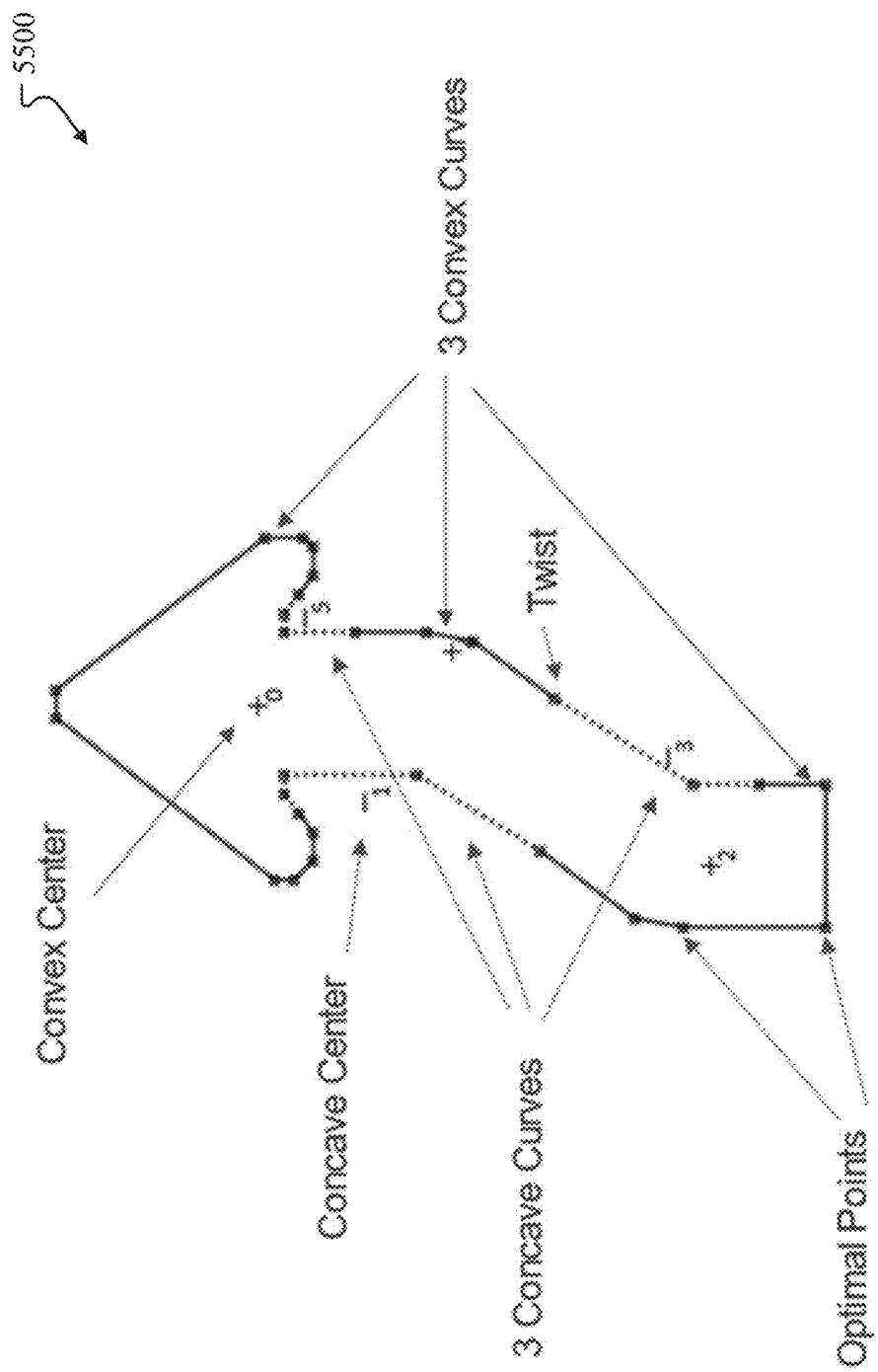
FIG. 55 illustrates a graphic for computing contour traits according to at least one example embodiment.

FIG. 55 illustrates a graphic 5500 for computing contour traits as in operation 4620 of FIG. 46. The graphic 5500 shows that the arrow contains six curve intervals 0-5.

Once trivial curve intervals have been merged in accordance with the operations described above, the method computes a final set of information for the final or optimal contour of the polygon as follows:

1) Set of sequential curves:
   Unambiguous curvature: Convex or Concave. In graphic 5500, there are 3 convex curves (solid lines) and 3 concave curves (dashed lines)
   (ii) Arc Center. In graphic 5500, 3 convex centers (+) and 3 concave centers (○)
   (iii) Arc length
   (iv) Angle turn degree (spiral)
   (v) Start Point, Angle
   (vi) End Point, Angle 2) Twists. In graphic 5500, 6 twists between each Concave/Convex junction.

3) Convex Form: (0-4): 0 non-Convex, 1-4 degree of convexity.

4) Optimal set of points for detailed in-curve comparison.

This information may be used for one or more downstream processing techniques, such as object identification, character recognition, and/or the like.

In view of the above, it should be appreciated that generating a contour of a digital input polygon (e.g., an optimal contour) in accordance with inventive concepts has many practical applications in that the contoured polygon may be further processed for use in fields like: computer vision, optical character recognition (OCR), autonomous vehicle environment sensing (e.g., correctly identifying objects surrounding the vehicle), topography and cartography (e.g., generic shape matching, automated testing, document production, user test generations, quizzes, videos, geographic information system (GIS) mapping, machine learning an AI for identifying objections in an image, cryptography, robotics, mathematics, cellular automata, topology, discrete mathematics, digital signal processing, and/or the like.

Figure 56:
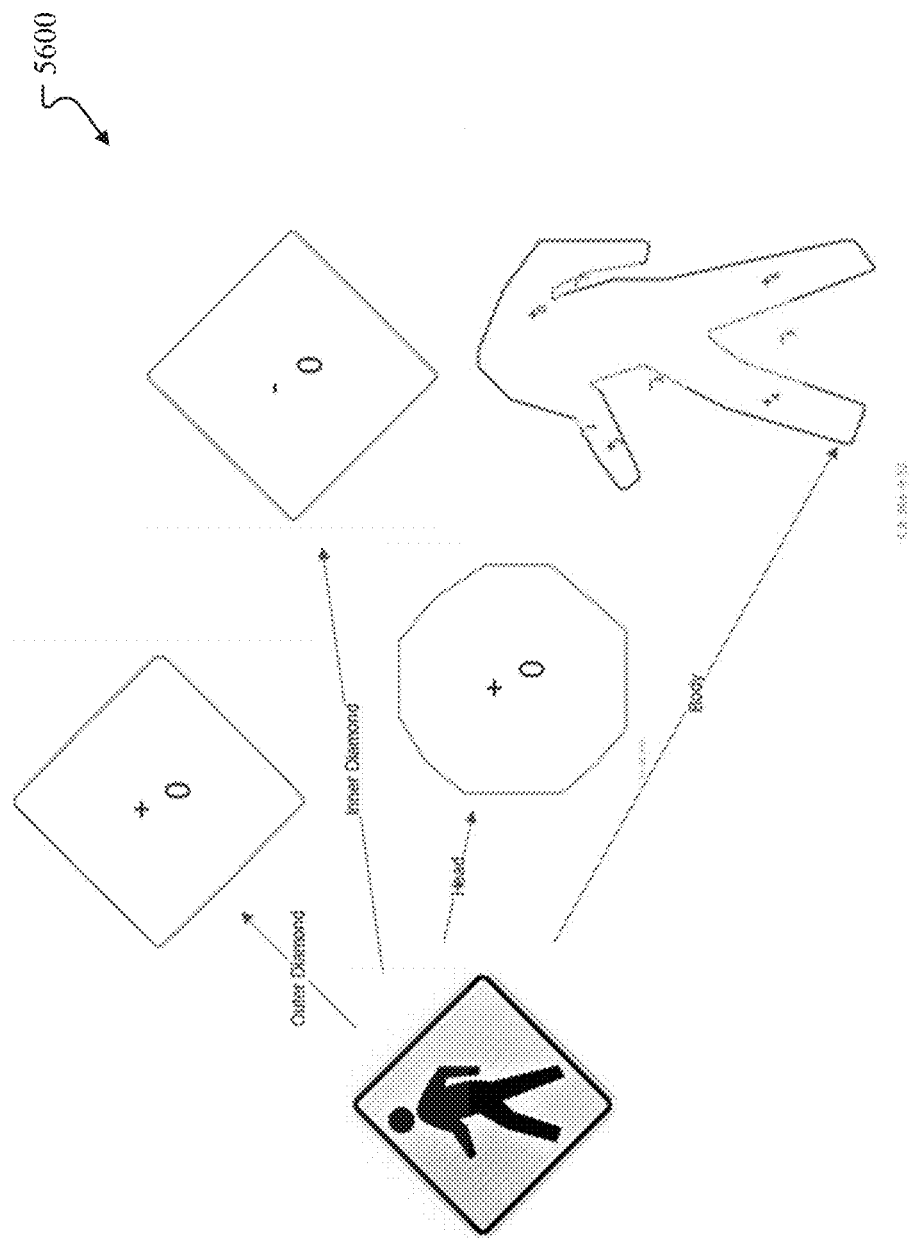
FIG. 56 illustrates a graphic for describing an application of inventive concepts according to at least one example embodiment.

FIG. 56 illustrates a graphic 5600 for describing one such application of example embodiments. Using the methods described herein, it is possible to efficiently interpret complex images such as road signs. Consider the Crosswalk road sign in graphic 5600 where the inner and outer diamonds and the head of the person each have one curve interval and where the body of the person has seven curve intervals. Method according to inventive concepts define the four illustrated output polygons. A downstream algorithm (e.g., object detection algorithm) can now make efficient decisions based on diamond outlines of the sign (outer (+0) and inner (−0)) because the head and body are contained within the diamond outline. The head has a convex/circular shape (+0) and the body has 8 matchable contours (half convex and half concave).

Here, it should be appreciated that variations may be possible within the methods described above for arriving at a final contour of a polygon. For example, inventive concepts are useful regardless of whether the hull is oriented CW or CCW as long as the CW angle convention is consistent. In addition, other bend patterns such as for example $X(U)_nY$ could be added prior to the linear pattern interpretation. Still further, other patterns could determine Turn/Turn joint Perpendicularity other than the ones listed. The criteria that determine whether an interval is trivial or not can vary based on the application. Criteria such as height, area, flanking curve lengths and the associated thresholds can vary to achieve a desired result.

Clockwise blocks and counterclockwise conventions are equivalent. Furthermore, any encoding permutation of the state machine would also be an equivalent implementation of inventive concepts.

As may be appreciated, methods described herein run over any 2D surface to identify all clusters and polygons. In scanning all pixels in a 2D image, the entirety of the method is bound to run in a maximum of $O(n^2)$. If, however, the user selects a boundary of a cluster, then the method can easily be adapted to trace only that polygon outline. In this mode, the algorithm will run in $O(n)$ time.

When deciding which point to break linearity, the algorithm always proceeds in the direction of orientation. The algorithm could add an additional pass in the opposite direction and pick the midpoint of the linear pattern breaks in each direction.

Further, it should be appreciated that if the input polygon at operation 2308 orients the hull and holes in the same direction (e.g., CCW or CW), then the convexity determination will change so that convexity depends on if the contour is a hull or hole of the input polygon. In addition, fewer states may be used for the state machine 4200, but may not represent the complete set of patters from FIG. 41. In addition, example embodiments have been discussed where the starting vertex of a polygon is the upper-left most vertex of the polygon, but example embodiments are not limited thereto and the starting vertex may be any other suitable vertex of the polygon (e.g., any vertex on the hull of the polygon).

Figure 57:
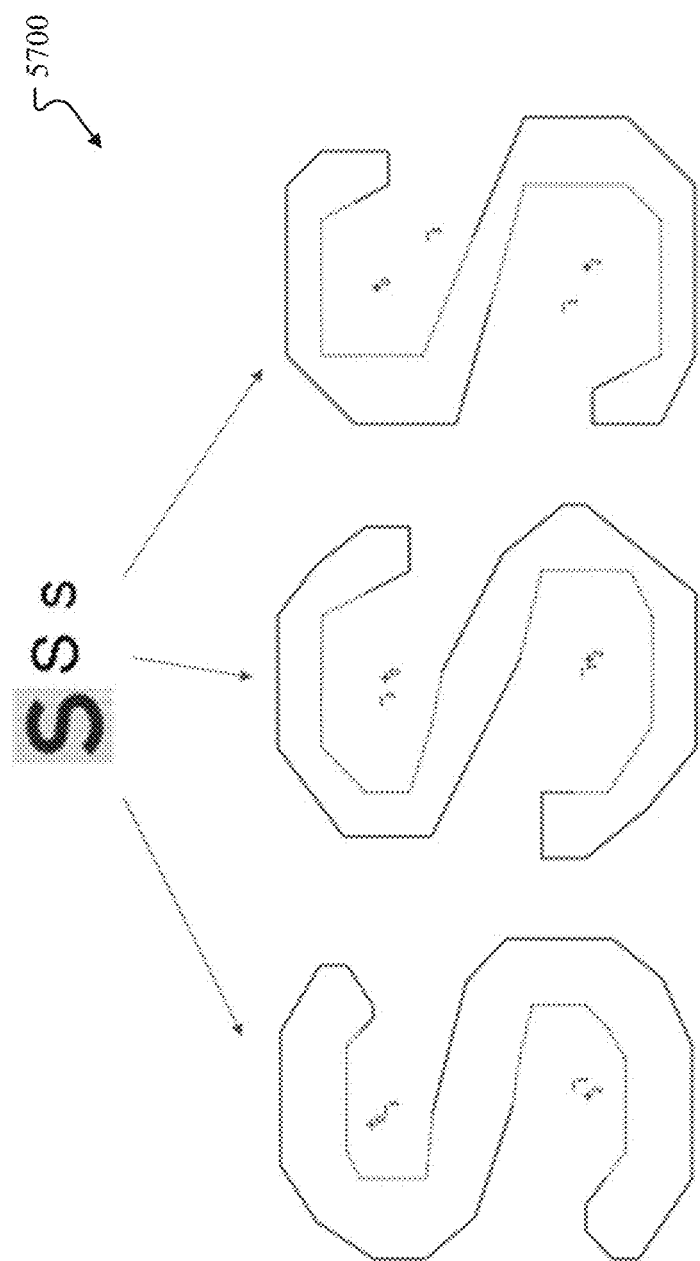
FIG. 57 illustrates a graphic that shows how efficiently methods according to example embodiments interpret character symbols according to at least one example embodiment.

Similarly, FIG. 57 illustrates a graphic 5700 that shows how efficiently methods according to example embodiments interpret character symbols like the letter "S". For all three variations of the letter, the final contour of each letter as output by operation 2320 are nearly the same. A downstream character recognition algorithm may make efficient decisions based on the fact that the S has four contours (two convex, two concave) with center patterns as shown. The S may further be identified by each contour's start, end, length, and arc length (as compared to other characters).

Figure 58:
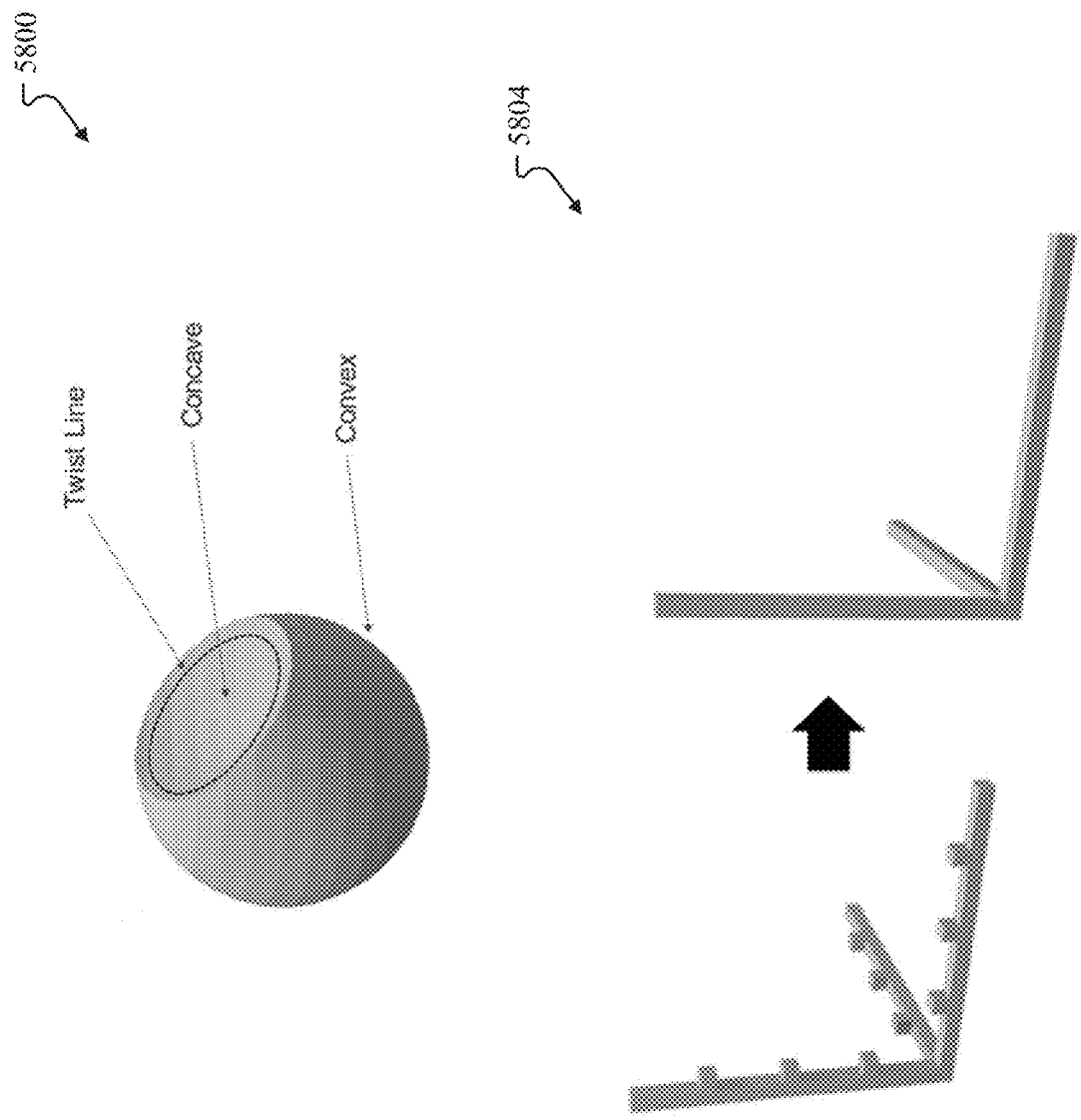
FIG. 58 illustrates graphics that relate to a hypercube variation of inventive concepts according to at least one example embodiment.

FIG. 58 illustrates graphics 5800 and 5804, which relate to a hypercube variation of the above-described concepts. Here, the final or optimal contour of the 3D shape 5800 follows the dimensionality of the digital input shape. In general, the optimal contour entities evolve as twist=(n−1) flat; concave=n-flat; convex=n-flat. For general hyper cube n in graphic 5804, reduce any pixels lying on any dimensional axis to boundary pixels that guarantee change in dimensional axis between start and end.

Figure 59:
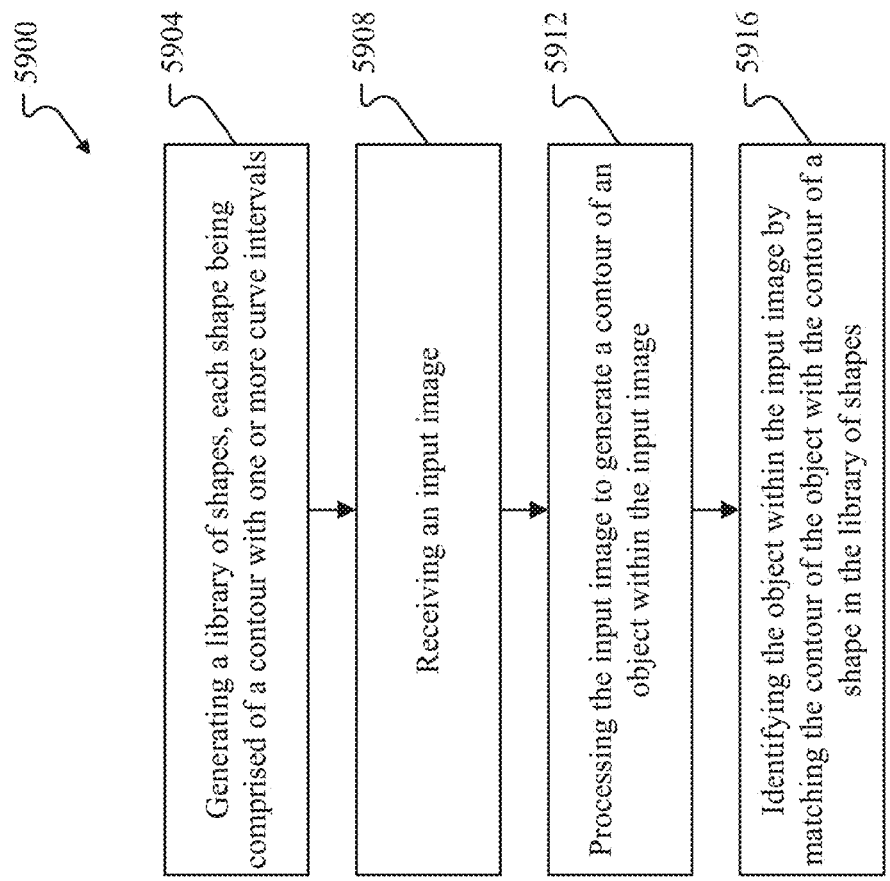
FIG. 59 illustrates a method according to at least one example embodiment.

FIG. 59 illustrates a method 5900 according to at least one example embodiment. FIG. 59 may relate to identifying objects within a capture scene or image.

Operation 5904 includes generating a library of shapes or reference polygons with each shape or reference polygon being comprised of a contour with one or more curve intervals that form a final contoured polygon as generated by the method 2300. For example, as noted in FIG. 57, each "S" shape (regardless of font, pixilation noise, etc.) has four curve intervals 0 to 3 with the concavities and convexities illustrated. In this case, the library may contain any suitable information (e.g., number and ordering of concavities and convexities, concavity and concavity centers, twist points, relative curve interval lengths, and/or the like) generated by the method 2300 in order to resolve an "S" from an input image as an "S" in an output image. In at least one embodiment, operation 5904 includes "learning" the library shapes by sampling a digitized version of acceptable quality for each shape to generate the final polygonal contour for each shape, where the digitized version of a shape is one or more polygons generated in the same as or similar manner as described with reference FIGS. 1-17 and then saved in the library. As may be appreciated, the library may contain "learned" shapes (i.e., polygon contours) for all other characters of the alphabet (in any language) and shapes for any other object desired to be identified in an input image. Having a library of learned shapes or reference polygons allows the method 5900 to reliably perform object identification in operation 5916. The library of shapes may be stored in memory.

Operation 5908 includes receiving an input image. The input image may be a screenshot of a display, a scanned copy of a document, a scene captured by a camera, or any other suitable image that contains objects to be identified.

Operation 5912 includes processing the input image to generate a contour of an object within the input image. For example, the contour may be obtained by first generating one or more digital polygons for the object (as in FIGS. 1-17). The contour of the object may then be obtained in accordance with method 2300 described with reference to FIGS. 18 to 58. The contour of the object may include one or more curve intervals that makeup the final contour(s) of one or more polygons of the object.

Operation 5916 includes identifying the object within the input image by matching the contour generated in operation 5912 with a shape in the library of shapes from operation 5904. For example, operation 5916 compares the traits of the curve intervals of the object (e.g., number and ordering of concavities and convexities, concavity and convexity centers, twist points, relative curve interval lengths, twist points, and/or the like) with the traits of the curve intervals of the shapes in the library. If the traits of the curve intervals of the object sufficiently match the traits of curve intervals of a shape in the library, then the object is identified as that shape. Any combination of contour traits may be used to reject or match shapes together. Thereafter, the method may output the result to a display to indicate to a user or processing entity the identity of the object (e.g., a character of text, a road sign, an obstacle on a roadway, a building, and/or any suitable animate or inanimate object).

Figure 60:
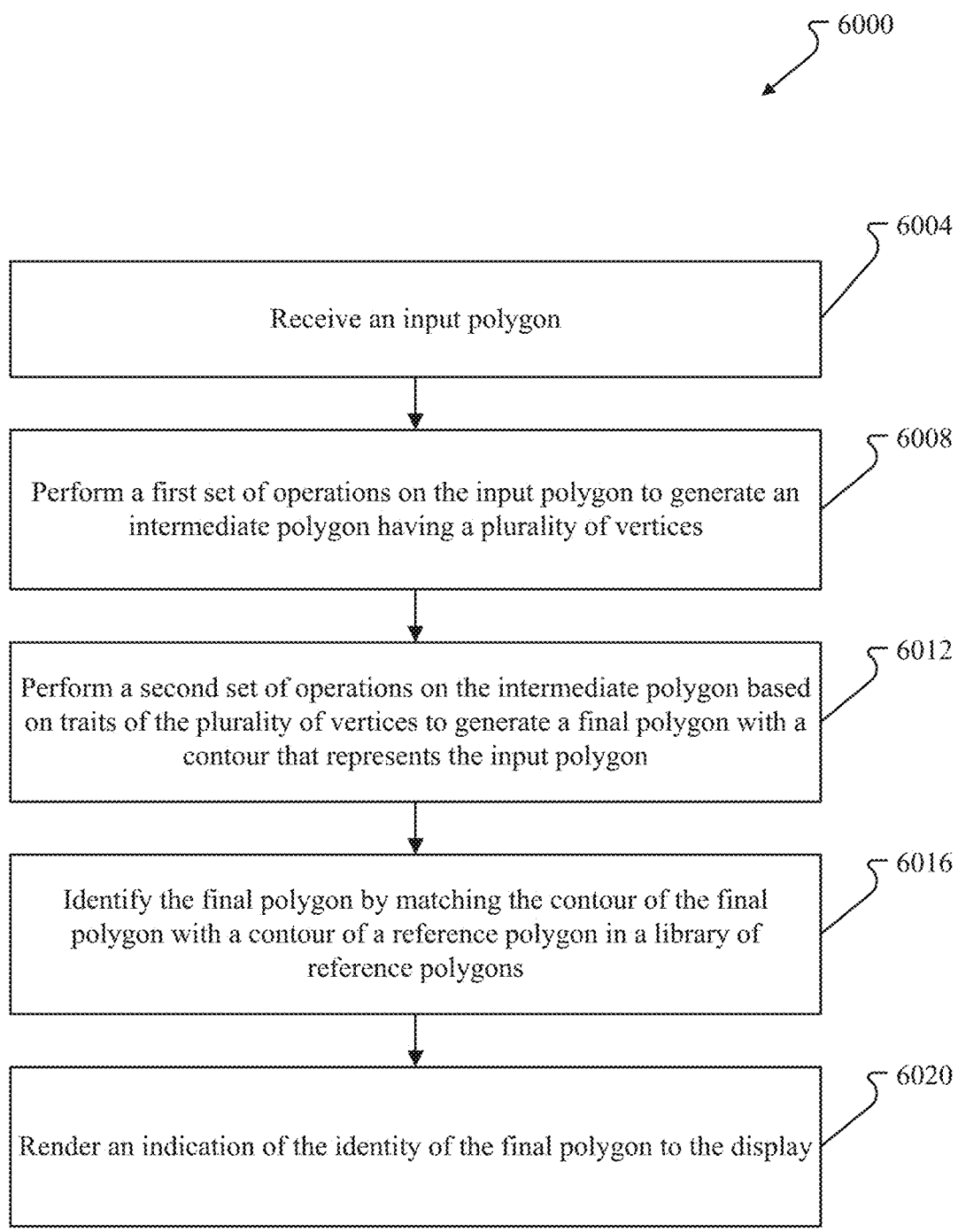
FIG. 60 illustrates a method according to at least one example embodiment.

FIG. 60 illustrates a method 6000 according to at least one example embodiment.

Operation 6004 includes receiving an input polygon. The input polygon may be a digitized version of a polygon within a captured image formed according to the description of FIGS. 1-17. Thus, the input polygon may comprise of a plurality of segments connected by a plurality of points with some of the plurality of segments extending in a first direction (e.g., x-direction) and remaining ones of the plurality of segments extending in a second direction (e.g., y-direction) perpendicular to the first direction. The input polygon comprises an outer polygon (or hull) and may or may not include one or more inner polygons (or holes).

Operation 6008 includes performing a first set of operations on the input polygon to generate an intermediate polygon having a plurality of vertices where a number of the plurality of vertices are fewer than a number of the plurality of points. For example, the first set of operations includes reducing the number of the plurality of points to the number of the plurality of vertices by combining sequential segments that extend in a same direction and removing points from the combined sequential segments. Here, it should be appreciated that operation 6008 may correspond to operation 2308 in FIG. 23 that generates the vertex form of the input polygon.

Operation 6012 includes performing a second set of operations on the intermediate polygon based on traits of the plurality of vertices to generate a final polygon with a contour that represents the input polygon. The contour of the final polygon includes at least one section (e.g., curve interval) that extends in a third direction different than the first direction and the second direction.

The second set of operations may include generating, based on the traits of the plurality of vertices, one or more turn intervals for the intermediate polygon and one or more flux intervals for the intermediate polygon. As noted in the discussion of FIGS. 18-59, the traits of the plurality vertices include an orientation of each vertex, where the orientation of each vertex being based on a shortest angle between a segment that enters the vertex and a segment that exits the vertex. In addition, the orientation of each vertex indicates a concavity state of the vertex (e.g., whether the vertex is part of a concave or convex portion of the intermediate polygon). As further noted in the discussion of FIGS. 18-59, at least two sequential vertices that have a same orientation forms a turn interval, and at least two sequential vertices that have alternating orientations that are not a turn interval form a flux interval. That is, the second set of operations may include generating a turn/flux form of the intermediate polygon based on traits of the plurality of vertices as in operation 2312 of FIG. 23.

In at least one example embodiment, the second set of operations includes forming a linear interval for each flux interval based on vertices within a respective flux interval where each linear interval in combination with each turn interval forms a linear contour of the input polygon. The linear interval may be formed for each flux interval based on a state machine (e.g., state machine 4200). In one example, the state machine uses lengths of sequential segments within the flux interval as inputs and the state machine has at least six possible states with each state being used to detect one of four patterns of the inputs.

In view of the above, it should be appreciated that the second set of operations may include generating a linear contour of the intermediate polygon based on the turn/flux form of the intermediate polygon, as in operation 2316 of FIG. 23.

The second set of operations in operation 6012 may further include generating the final polygon based on the linear contour of the input polygon by generating curve intervals from one or more sequential linear intervals of the linear contour of the input polygon. Thus, the second set of operations may include generating the final polygon based on the linear contour of the intermediate polygon as in operation 2320 of FIG. 23. In at least one example embodiment, the final polygon contains a minimum amount of information that represents the input polygon. However, example embodiments are not limited thereto, and the final polygon may contain more than the minimum amount of information to represent the input polygon. In any event, the information about the final, contoured, polygon may include a number of curve intervals of the final polygon, sequences of concavities and convexities of the curve intervals, centers of curve intervals with concavities and convexities, lengths of the curve intervals, relative lengths of certain ones of the curve intervals, twist points of the curve intervals, and/or the like.

Here, it should be appreciated that the operations of FIG. 60 (and FIG. 59 and any other method described herein) may be performed by processing circuitry. In one embodiment, the processing circuitry comprises an Application Specific Integrated Circuit (ASIC) and/or a memory comprising instructions and a processor that executes the instructions.

Operation 6016 includes identifying the final polygon from operation 6012. For example, the final polygon may be identified by matching the contour of the final polygon with a contour of a reference polygon in a library of reference polygons (e.g., the library from FIG. 59). The final polygon may be identified in the same or similar manner as described for identifying an object in operation 5916. For example, operation 6016 compares information about the final, contoured, polygon to information the reference polygons where such information for both the final polygon and the reference polygon may include a number of curve intervals of the final polygon, sequences of concavities and convexities of the curve intervals, centers of curve intervals with concavities and convexities, lengths of the curve intervals, relative lengths of certain ones of the curve intervals, twist points of the curve intervals, and/or other suitable information gleaned from the final polygon as generated in operation 2320 of FIG. 23.

Operation 6020 includes rendering an indication of the identity of the final polygon to a display, for example, a display of an output device 128. For example, if the input polygon relates to a character of the alphabet, then operation 6020 may identify the character and output the character as a stand-alone character or as part of a text string of other characters from an image that included the input polygon.

Figure 61A:
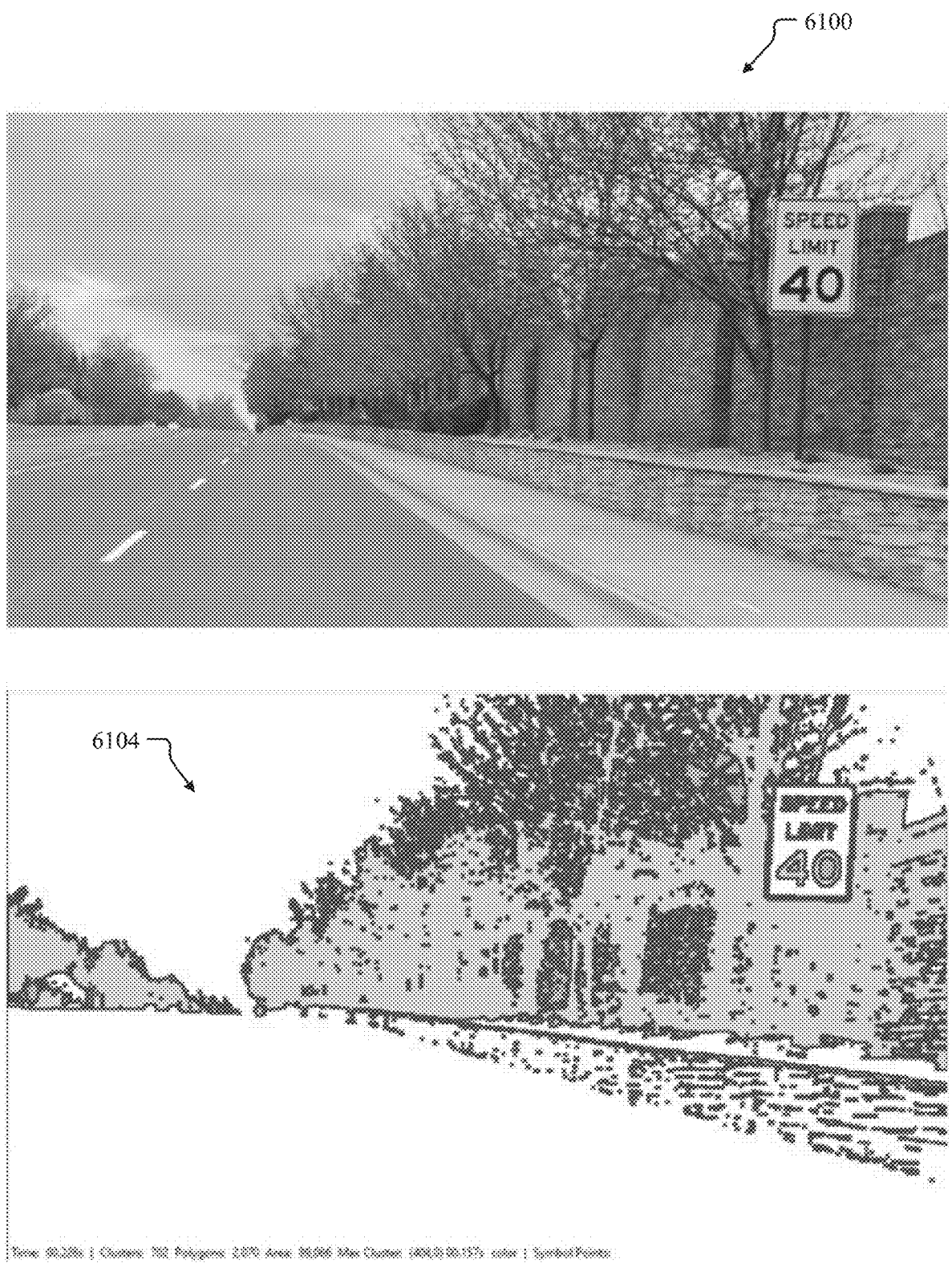
FIGS. 61A and 61B illustrate graphics that show how methods according to example embodiments process an object within a captured scene.
Figure 61B:
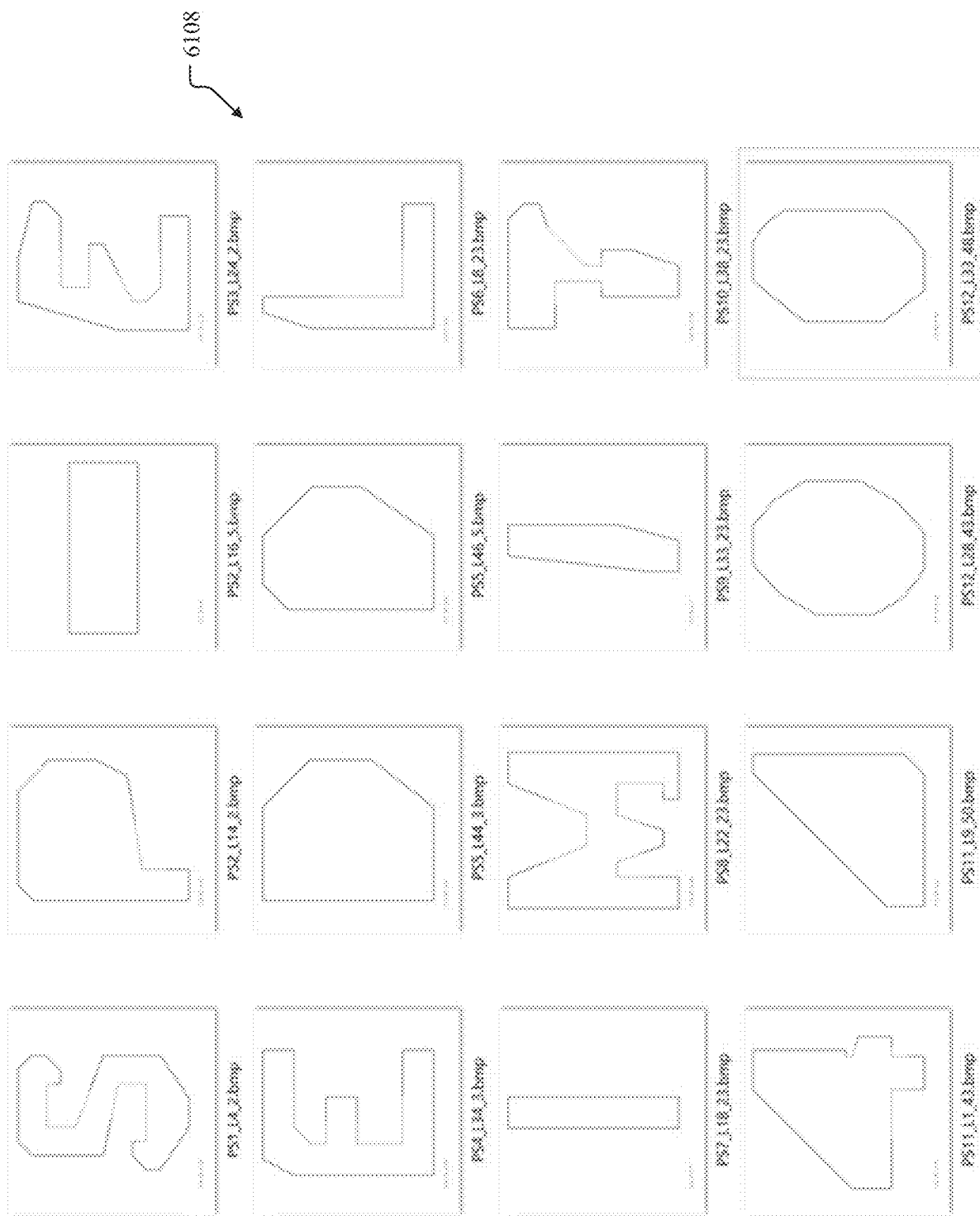

FIGS. 61A and 61B illustrate graphics that show how methods according to example embodiments process an object within a captured scene. Graphic 6100 illustrates the initial capture scene of a road including a speed limit sign among other objects. Graphic 6104 illustrates a digitized version of graphic 6104. This digitized version may be generated by processing the graphic 6100 in accordance with FIGS. 1-17 and related text. In this example, methods according to example embodiments identified 2070 polygons in 0.226 seconds with a standard 1-9 processor. Graphic 6108 illustrates the various polygon contours generated for the speed limit sign in accordance with operations described above with reference to FIGS. 18-60. As shown, a polygon contour is created for each character of the speed limit sign. In the case of the characters P, D, 4, and 0, the method generates two contours for each character: one outer polygon and one inner polygon. In accordance with inventive concepts, the contours in graphic 6108 may be matched with contours of reference polygons in a library in order to identify the characters of the sign as "SPEED LIMIT 40." As may be appreciated, this ability to quickly process scenes surrounding a vehicle is useful for autonomous or semi-autonomous driving.

In view of FIGS. 1 to 61B, it should be appreciated that example embodiments relate to a method that includes processing an image of an object to generate a final polygon having a contour that represents the object, and identifying the object based on a library of polygons having contours generated in the same manner as the contour of the final polygon that represents the object. Processing the image of the object may include performing a first set of operations on a digitized version of the object to generate an intermediate polygon having a plurality of vertices. Processing the image of the object may also include performing a second set of operations on the intermediate polygon based on traits of the plurality of vertices to generate the contour of the final polygon that represents the object. The digitized version of the object comprises a plurality of segments connected by a plurality of points, some of the plurality of segments extending in a first direction and remaining ones of the plurality of segments extending in a second direction perpendicular to the first direction. The contour of the final polygon may include one or more sections (curve intervals) that extend in a third direction different from the first direction and the second direction. In addition, a number of the plurality of vertices may be fewer than a number of the plurality of points.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

For purposes of explanation, numerous details are set forth in order to provide a thorough understanding of the present embodiments. It should be appreciated however that the techniques herein may be practiced in a variety of ways beyond the specific details set forth herein.

Furthermore, while the exemplary embodiments illustrated herein may show the various components of the system collocated, it is to be appreciated that the various components of the system can be located at distant portions of a distributed network, such as a communications network and/or the Internet, or within a dedicated secure, unsecured and/or encrypted system. Thus, it should be appreciated that the components of the system can be combined into one or more devices, or collocated on a particular node/element(s) of a distributed network, such as a communications network. As will be appreciated from the description, and for reasons of computational efficiency, the components of the system can be arranged at any location within a distributed network without affecting the operation of the system.

Furthermore, it should be appreciated that the various links, including communications channel(s), connecting the elements (which may not be shown) can be wired or wireless links, or any combination thereof, or any other known or later developed element(s) that is/are capable of supplying and/or communicating data and/or signals to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

While the above-described flowcharts/operational flows have been discussed in relation to a particular exemplary sequence of events, it should be appreciated that changes to this sequence can occur without materially effecting the operation of the embodiment(s). Additionally, the exact sequence of events need not occur as set forth in the exemplary embodiments, but rather the steps can be performed by one or the other device(s) in the system. Additionally, the exemplary techniques illustrated herein are not limited to the specifically illustrated embodiments but can also be utilized with the other exemplary embodiments and each described feature is individually and separately claimable.

As will be appreciated by one skilled in the art, aspects of the present disclosure may be embodied as a system, method, and/or computer program product. Thus, aspects of the present disclosure may be embodied entirely in hardware, entirely in software (including, but not limited to, firmware, program code, resident software, microcode), or in a combination of hardware and software. All such embodiments may generally be referred to herein as a circuit, a module, or a system. In addition, aspects of the present invention may be in the form of a computer program product embodied in one or more computer readable media having computer readable program code embodied thereon.

A computer readable medium as described herein may be a computer readable storage medium, examples of which include, but are not limited to, an electronic, magnetic, optical, electromagnetic, infrared, or semiconductor system, apparatus, or device, or any suitable combination thereof. As used herein, a computer readable storage medium may be any non-transitory, tangible medium that can contain or store a program for use by or in connection with an instruction execution system, apparatus, device, computer, computing system, computer system, or any programmable machine or device that inputs, processes, and outputs instructions, commands, or data. A non-exhaustive list of specific examples of a computer readable storage medium include an electrical connection having one or more wires, a portable computer diskette, a floppy disk, a hard disk, a random access memory (RAM), a read-only memory (ROM), a USB flash drive, an non-volatile RAM (NVRAM or NOVRAM), an erasable programmable read-only memory (EPROM or Flash memory), a flash memory card, an electrically erasable programmable read-only memory (EEPROM), an optical fiber, a portable compact disc read-only memory (CD-ROM), a DVD-ROM, an optical storage device, a magnetic storage device, or any suitable combination thereof. A computer readable storage medium can be any computer readable medium that is not a computer readable signal medium such as a propagated data signal with computer readable program code embodied therein.

Program code may be embodied as computer-readable instructions stored on or in a computer readable storage medium as, for example, source code, object code, interpretive code, executable code, or combinations thereof. Any standard or proprietary, programming or interpretive language can be used to produce the computer-executable instructions. Examples of such languages include C, C++, C#, Pascal, JAVA, JAVA Script, BASIC, Smalltalk, Visual Basic, and Visual C++.

Transmission of program code embodied on a computer readable medium can occur using any appropriate medium including, but not limited to, wireless, wired, optical fiber cable, radio frequency (RF), or any suitable combination thereof.

The program code may execute entirely on a user's/operator's/administrator's computer, partly on such a computer, as a stand-alone software package, partly on the user's/operator's/administrator's computer and partly on a remote computer, or entirely on a remote computer or server. Any such remote computer may be connected to the user's/operator's/administrator's computer through any type of network, including a local area network (LAN) or a wide area network (WAN), or the connection may be made to an external computer (for example, through the Internet using an Internet Service Provider).

Additionally, the systems, methods and protocols described herein can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a smartphone, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein include, but are not limited to, at least one of Qualcomm® Snapdragon® 800 and 801, Qualcomm® Snapdragon® 610 and 615 with 4G LTE Integration and 64-bit computing, Apple® A7, A8, A8X, A9, A9X, or A10 processors with 64-bit architecture, Apple® M7, M8, M9, or M10 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARIV1926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer, workstation or mobile device platforms, e.g., smartphones or mobile phones or vehicles. Alternatively, the disclosed system may be implemented partially in hardware using standard logic circuits or a VLSI design. Whether software or hardware is used to implement the systems in accordance with this invention is dependent on the speed and/or efficiency requirements of the system, the particular function, and the particular software or hardware systems or microprocessor or microcomputer systems being utilized. The methods illustrated herein however can be readily implemented in hardware and/or software using any known or later developed systems or structures, devices and/or software by those of ordinary skill in the applicable art from the functional description provided herein and with a general basic knowledge of the computer and image processing arts.

Moreover, the disclosed methods may be readily implemented in software executed on programmed general-purpose computer, a special purpose computer, mobile device, smartphone, a microprocessor, or the like. In these instances, the systems and methods of this invention can be implemented as program embedded on personal computer such as JAVA® or CGI script, as a resource residing on a server or graphics workstation, as a routine embedded in a dedicated image processing system, as a plug-in, or the like. The system can also be implemented by physically incorporating the system and method into a software and/or hardware system, such as the hardware and software systems of an image processor.

While this technology has been described in conjunction with a number of embodiments, it is evident that many alternatives, modifications and variations would be or are apparent to those of ordinary skill in the applicable arts. Accordingly, it is intended to embrace all such alternatives, modifications, equivalents, and variations that are within the spirit and scope of this disclosure.

It should be appreciated that inventive concepts cover any embodiment in combination with any one or more other embodiment, any one or more of the features disclosed herein, any one or more of the features as substantially disclosed herein, any one or more of the features as substantially disclosed herein in combination with any one or more other features as substantially disclosed herein, any one of the aspects/features/embodiments in combination with any one or more other aspects/features/embodiments, use of any one or more of the embodiments or features as disclosed herein. It is to be appreciated that any feature described herein can be claimed in combination with any other feature(s) as described herein, regardless of whether the features come from the same described embodiment. In addition, example embodiments may include one or more means that perform or otherwise implement one or more of the methods described herein.

Example embodiments may be configured according to the following:

(1) A device, comprising:
 at least one processor; and
 memory including instructions that when executed by the at least one processor, cause the at least one processor to:
  scan an input image including pixels that have either a first state or a second state opposite the first state;

initiate a first cluster and a first polygon that belongs to the first cluster upon encountering a first pixel of the input image that has the first state;

execute a first set of operations to form the first polygon;

generate an indication of one or more characteristics of the input image based on at least the first cluster; and output the indication.

(2) The device of (1), wherein the at least one processor iteratively executes the first set of operations to form the first polygon.

(3) The device of one or more of (1) to (2), wherein the instructions include instructions that cause the at least one processor to:

determine that at least one key used to form the first polygon does not include an unused edge or contain an unused solid point;

continue scanning the input image; and initiate a second cluster and a second polygon that belongs to the second cluster upon encountering a second pixel of the input image that is in the first state.

(4) The device of one or more of (1) to (3), wherein the instructions include instructions that cause the at least one processor to:

iteratively execute the first set of operations to form the second polygon that completely defines or partially defines the second cluster of the input image; and generate the indication based on the first cluster and the second cluster.

(5) The device of one or more of (1) to (4), wherein the instructions include instructions that cause the at least one processor to:

determine that at least one key used to form the first polygon includes an unused edge or contains an unused solid point;

initiate a second cluster and a second polygon that belongs to the first cluster based on the unused edge or the unused solid point; and iteratively execute the first set of operations to form the second polygon, wherein the first polygon and the second polygon combine to completely define the first cluster.

(6) The device of one or more of (1) to (5), wherein the instructions include instructions that cause the at least one processor to:

generate the input image from a source image by converting each pixel of the source image to have the first state or the second state based on pixel values of each pixel of the source image.

(7) The device of one or more of (1) to (6), wherein the first state corresponds to one of black coloring or white coloring, and wherein the second state corresponds to the other of black coloring or white coloring.

(8) The device of one or more of (1) to (7), wherein the first set of operations includes:

determining that a Moore neighborhood of the first pixel includes at least one other pixel having the first state;

retrieving a key from a plurality of keys based on a shape formed by the first pixel and the at least one other pixel; and using the key and one or more other keys in the plurality of keys to form the first polygon.

(9) The device of one or more of (1) to (8), wherein the instructions include instructions that cause the at least one processor to generate the plurality of keys, a number of the plurality of keys being based on a number of pixels in the Moore neighborhood of the first pixel.

(10) The device of one or more of (1) to (9), wherein the number of the plurality of keys is at least 256.

(11) A method, comprising:

scanning an input image including pixels that have either a first state or a second state opposite the first state;

initiating a first cluster and a first polygon that belongs to the first cluster upon encountering a first pixel of the input image that has the first state;

executing a first set of operations to form the first polygon;

generating an indication of one or more characteristics of the input image based on at least the first cluster; and outputting the indication.

(12) The method of (11), wherein executing the first set of operations iteratively executes the first set of operations to form the first polygon.

(13) The method of one or more of (11) to (12), further comprising:

determining that at least one key used to form the first polygon does not include an unused edge or contain an unused solid point;

continuing to scan the input image;

initiating a second cluster and a second polygon that belongs to the second cluster upon encountering a second pixel of the input image that is in the first state;

iteratively executing the first set of operations to form the second polygon that completely defines or partially defines the second cluster; and generating the indication based on the first cluster and the second cluster.

(14) The method of one or more of (11) to (13), further comprising:

determining that at least one key used to form the first polygon includes an unused edge or contains an unused solid point;

initiating a second polygon that belongs to the first cluster based on the unused edge or the unused solid point; and iteratively executing the first set of operations to form the second polygon.

(15) The method of one or more of (11) to (14), wherein the first polygon and the second polygon combine to fully define the first cluster.

(16) The method of one or more of (11) to (15), further comprising:

generating the input image from a source image by converting each pixel of the source image to have the first state or the second state based on pixel values of each pixel of the source image.

(17) The method of one or more of (11) to (16), wherein the first state corresponds to one of black coloring or white coloring, and wherein the second state corresponds to the other of black coloring or white coloring.

(18) The method of one or more of (11) to (17), wherein the first set of operations includes:

determining that a Moore neighborhood of the first pixel includes at least one other pixel having the first state;

retrieving a key from a plurality of keys based on a shape formed by the first pixel and the at least one other pixel; and using the key and one or more other keys in the plurality of keys to form the first polygon that includes the first pixel and the at least one other pixel.

(19) The method of one or more of (11) to (18), further comprising:

generating the plurality of keys, a number of the plurality of keys being based on a number of pixels in the Moore neighborhood of the first pixel.

(20) A system, comprising:

a display;

at least one processor; and memory including instructions that when executed by the at least one processor, cause the at least one processor to:

scan an input image including pixels that have either a first state or a second state opposite the first state;

initiate a first cluster and a first polygon that belongs to the first cluster upon encountering a first pixel of the input image that has the first state;

execute a first set of operations to form the first polygon;

generate an indication of one or more characteristics of the input image based on at least the first cluster; and output the indication to the display.

Additional aspects of the technology are directed toward:

A device, comprising:

processing circuitry configured to:

receive an input polygon, the input polygon being comprised of a plurality of segments connected by a plurality of points, some of the plurality of segments extending in a first direction and remaining ones of the plurality of segments extending in a second direction perpendicular to the first direction;

perform a first set of operations on the input polygon to generate an intermediate polygon having a plurality of vertices, a number of the plurality of vertices being fewer than a number of the plurality of points; and perform a second set of operations on the intermediate polygon based on traits of the plurality of vertices to generate a final polygon with a contour that represents the input polygon, the contour including at least one section that extends in a third direction different than the first direction and the second direction.

Any of the above aspects, wherein the first set of operations includes reducing the number of the plurality of points to the number of the plurality of vertices by combining sequential segments that extend in a same direction and removing points from the combined sequential segments.

Any of the above aspects, wherein the second set of operations includes generating, based on the traits of the plurality of vertices, one or more turn intervals for the intermediate polygon and one or more flux intervals for the intermediate polygon.

Any of the above aspects, wherein the traits of the plurality vertices include an orientation of each vertex, the orientation of each vertex being based on a shortest angle between a segment that enters the vertex and a segment that exits the vertex, the orientation of each vertex indicating a concavity state of the vertex.

Any of the above aspects, wherein at least two sequential vertices that have a same orientation forms a turn interval, and wherein at least two sequential vertices that have alternating orientations that are not a turn interval form a flux interval.

Any of the above aspects, wherein the second set of operations includes forming a linear interval for each flux interval based on vertices within a respective flux interval, wherein each linear interval in combination with each turn interval forms a linear contour of the input polygon.

Any of the above aspects, wherein the linear interval is formed for each flux interval based on a state machine.

Any of the above aspects, wherein the state machine uses lengths of sequential segments within the flux interval as inputs.

Any of the above aspects, wherein the state machine has at least six possible states, each state being used to detect one of four patterns of the inputs.

Any of the above aspects, wherein the second set of operations includes generating the final polygon based on the linear contour of the input polygon.

Any of the above aspects, wherein generating the final polygon based on the linear contour of the input polygon includes generating curve intervals from one or more sequential linear intervals of the linear contour of the input polygon.

Any of the above aspects, wherein the final polygon contains a minimum amount of information that represents the input polygon.

Any of the above aspects, wherein the processing circuitry renders the final polygon to a display.

Any of the above aspects, wherein the processing circuitry comprises an Application Specific Integrated Circuit (ASIC) or a memory comprising instructions and a processor that executes the instructions.

A system, comprising:

a display; and processing circuitry to:

receive an input polygon, the input polygon being comprised of a plurality of segments connected by a plurality of points, some of the plurality of segments extending in a first direction and remaining ones of the plurality of segments extending in a second direction perpendicular to the first direction;

perform a first set of operations on the input polygon to generate an intermediate polygon having a plurality of vertices, a number of the plurality of vertices being fewer than a number of the plurality of points;

perform a second set of operations on the intermediate polygon based on traits of the plurality of vertices to generate a final polygon with a contour that represents the input polygon, the contour including at least one section that extends in a third direction different than the first direction and the second direction;

identify the final polygon by matching the contour of the final polygon with a contour of a reference polygon in a library of reference polygons; and render an indication of the identity of the final polygon to the display.

Any of the above aspects, wherein the processing circuitry comprises an Application Specific Integrated Circuit (ASIC).

Any of the above aspects, wherein the second set of operations includes:

generating a turn/flux form of the intermediate polygon based on traits of the plurality of vertices;

generating a linear contour of the intermediate polygon based on the turn/flux form of the intermediate polygon; and generating the final polygon based on the linear contour.

A method, comprising:

processing an image of an object to generate a final polygon having a contour that represents the object; and identifying the object based on a library of polygons having contours generated in the same manner as the contour of the final polygon that represents the object.

Any of the above aspects, wherein processing the image of the object includes:

performing a first set of operations on a digitized version of the object to generate an intermediate polygon having a plurality of vertices; and performing a second set of operations on the intermediate polygon based on traits of the plurality of vertices to generate the contour of the final polygon that represents the object.

Any of the above aspects, wherein the digitized version of the object comprises a plurality of segments connected by a plurality of points, some of the plurality of segments extending in a first direction and remaining ones of the plurality of segments extending in a second direction perpendicular to the first direction, wherein the contour of the final polygon includes one or more sections that extend in a third direction different from the first direction and the second direction.

Any of the above aspects, wherein a number of the plurality of vertices is fewer than a number of the plurality of points.

A non-transitory computer-readable information storage media having stored thereon instructions, that when executed by one or more processors and/or graphics processing units, cause to be performed a method comprising:
receive an input polygon, the input polygon being comprised of a plurality of segments connected by a plurality of points, some of the plurality of segments extending in a first direction and remaining ones of the plurality of segments extending in a second direction perpendicular to the first direction;
perform a first set of operations on the input polygon to generate an intermediate polygon having a plurality of vertices, a number of the plurality of vertices being fewer than a number of the plurality of points; and
perform a second set of operations on the intermediate polygon based on traits of the plurality of vertices to generate a final polygon with a contour that represents the input polygon, the contour including at least one section that extends in a third direction different than the first direction and the second direction.

Any of the above aspects, wherein the first set of operations includes reducing the number of the plurality of points to the number of the plurality of vertices by combining sequential segments that extend in a same direction and removing points from the combined sequential segments.

Any of the above aspects, wherein the second set of operations includes generating, based on the traits of the plurality of vertices, one or more turn intervals for the intermediate polygon and one or more flux intervals for the intermediate polygon.

Any of the above aspects, wherein the traits of the plurality vertices include an orientation of each vertex, the orientation of each vertex being based on a shortest angle between a segment that enters the vertex and a segment that exits the vertex, the orientation of each vertex indicating a concavity state of the vertex.

Any of the above aspects, wherein at least two sequential vertices that have a same orientation forms a turn interval, and wherein at least two sequential vertices that have alternating orientations that are not a turn interval form a flux interval.

Any of the above aspects, wherein the second set of operations includes forming a linear interval for each flux interval based on vertices within a respective flux interval, wherein each linear interval in combination with each turn interval forms a linear contour of the input polygon.

Any of the above aspects, wherein the linear interval is formed for each flux interval based on a state machine.

Any of the above aspects, wherein the state machine uses lengths of sequential segments within the flux interval as inputs.

Any of the above aspects, wherein the state machine has at least six possible states, each state being used to detect one of four patterns of the inputs.

Any of the above aspects, wherein the second set of operations includes generating the final polygon based on the linear contour of the input polygon.

Any of the above aspects, wherein generating the final polygon based on the linear contour of the input polygon includes generating curve intervals from one or more sequential linear intervals of the linear contour of the input polygon.

Any of the above aspects, wherein the final polygon contains a minimum amount of information that represents the input polygon.

Any of the above aspects, wherein the processing circuitry renders the final polygon to a display.

Any of the above aspects, wherein the processing circuitry comprises an Application Specific Integrated Circuit (ASIC) or a memory comprising instructions and a processor that executes the instructions.

A non-transitory computer-readable information storage media having stored thereon instructions, that when executed by one or more processors and/or graphics processing units, cause to be performed a method for output on a display comprising:
receive an input polygon, the input polygon being comprised of a plurality of segments connected by a plurality of points, some of the plurality of segments extending in a first direction and remaining ones of the plurality of segments extending in a second direction perpendicular to the first direction;
perform a first set of operations on the input polygon to generate an intermediate polygon having a plurality of vertices, a number of the plurality of vertices being fewer than a number of the plurality of points;
perform a second set of operations on the intermediate polygon based on traits of the plurality of vertices to generate a final polygon with a contour that represents the input polygon, the contour including at least one section that extends in a third direction different than the first direction and the second direction;
identify the final polygon by matching the contour of the final polygon with a contour of a reference polygon in a library of reference polygons; and
render an indication of the identity of the final polygon to the display.

Any of the above aspects, wherein the processing circuitry comprises an Application Specific Integrated Circuit (ASIC).

Any of the above aspects, wherein the second set of operations includes:
generating a turn/flux form of the intermediate polygon based on traits of the plurality of vertices;
generating a linear contour of the intermediate polygon based on the turn/flux form of the intermediate polygon; and
generating the final polygon based on the linear contour.

A non-transitory computer-readable information storage media having stored thereon instructions, that when executed by one or more processors and/or graphics processing units, cause to be performed a method comprising:
processing an image of an object to generate a final polygon having a contour that represents the object; and
identifying the object based on a library of polygons having contours generated in the same manner as the contour of the final polygon that represents the object.

Any of the above aspects, wherein processing the image of the object includes:
performing a first set of operations on a digitized version of the object to generate an intermediate polygon having a plurality of vertices; and
performing a second set of operations on the intermediate polygon based on traits of the plurality of vertices to generate the contour of the final polygon that represents the object.

Any of the above aspects, wherein the digitized version of the object comprises a plurality of segments connected by a plurality of points, some of the plurality of segments extending in a first direction and remaining ones of the plurality of segments extending in a second direction perpendicular to the first direction, wherein the contour of the final polygon includes one or more sections that extend in a third direction different from the first direction and the second direction.

Any of the above aspects, wherein a number of the plurality of vertices is fewer than a number of the plurality of points.

A device, comprising:
one or more means configured to:
receive an input polygon, the input polygon being comprised of a plurality of segments connected by a plurality of points, some of the plurality of segments extending in a first direction and remaining ones of the plurality of segments extending in a second direction perpendicular to the first direction;
perform a first set of operations on the input polygon to generate an intermediate polygon having a plurality of vertices, a number of the plurality of vertices being fewer than a number of the plurality of points; and
perform a second set of operations on the intermediate polygon based on traits of the plurality of vertices to generate a final polygon with a contour that represents the input polygon, the contour including at least one section that extends in a third direction different than the first direction and the second direction.

Any of the above aspects, wherein the first set of operations includes reducing the number of the plurality of points to the number of the plurality of vertices by combining sequential segments that extend in a same direction and removing points from the combined sequential segments.

Any of the above aspects, wherein the second set of operations includes generating, based on the traits of the plurality of vertices, one or more turn intervals for the intermediate polygon and one or more flux intervals for the intermediate polygon.

Any of the above aspects, wherein the traits of the plurality vertices include an orientation of each vertex, the orientation of each vertex being based on a shortest angle between a segment that enters the vertex and a segment that exits the vertex, the orientation of each vertex indicating a concavity state of the vertex.

Any of the above aspects, wherein at least two sequential vertices that have a same orientation forms a turn interval, and wherein at least two sequential vertices that have alternating orientations that are not a turn interval form a flux interval.

Any of the above aspects, wherein the second set of operations includes forming a linear interval for each flux interval based on vertices within a respective flux interval, wherein each linear interval in combination with each turn interval forms a linear contour of the input polygon.

Any of the above aspects, wherein the linear interval is formed for each flux interval based on a state machine.

Any of the above aspects, wherein the state machine uses lengths of sequential segments within the flux interval as inputs.

Any of the above aspects, wherein the state machine has at least six possible states, each state being used to detect one of four patterns of the inputs.

Any of the above aspects, wherein the second set of operations includes generating the final polygon based on the linear contour of the input polygon.

Any of the above aspects, wherein generating the final polygon based on the linear contour of the input polygon includes generating curve intervals from one or more sequential linear intervals of the linear contour of the input polygon.

Any of the above aspects, wherein the final polygon contains a minimum amount of information that represents the input polygon.

Any of the above aspects, wherein the processing circuitry renders the final polygon to a display.

Any of the above aspects, wherein the processing circuitry comprises an Application Specific Integrated Circuit (ASIC) or a memory comprising instructions and a processor that executes the instructions.

A system, comprising:
a display; and
one or more means configured to:
receive an input polygon, the input polygon being comprised of a plurality of segments connected by a plurality of points, some of the plurality of segments extending in a first direction and remaining ones of the plurality of segments extending in a second direction perpendicular to the first direction;
perform a first set of operations on the input polygon to generate an intermediate polygon having a plurality of vertices, a number of the plurality of vertices being fewer than a number of the plurality of points;
perform a second set of operations on the intermediate polygon based on traits of the plurality of vertices to generate a final polygon with a contour that represents the input polygon, the contour including at least one section that extends in a third direction different than the first direction and the second direction;
identify the final polygon by matching the contour of the final polygon with a contour of a reference polygon in a library of reference polygons; and
render an indication of the identity of the final polygon to the display.

Any of the above aspects, wherein the means comprises an Application Specific Integrated Circuit (ASIC).

Any of the above aspects, wherein the second set of operations includes:
generating a turn/flux form of the intermediate polygon based on traits of the plurality of vertices;
generating a linear contour of the intermediate polygon based on the turn/flux form of the intermediate polygon; and
generating the final polygon based on the linear contour.

A system comprising:
means for processing an image of an object to generate a final polygon having a contour that represents the object; and
means for identifying the object based on a library of polygons having contours generated in the same manner as the contour of the final polygon that represents the object.

Any of the above aspects, wherein processing the image of the object includes:
performing a first set of operations on a digitized version of the object to generate an intermediate polygon having a plurality of vertices; and
performing a second set of operations on the intermediate polygon based on traits of the plurality of vertices to generate the contour of the final polygon that represents the object.

Any of the above aspects, wherein the digitized version of the object comprises a plurality of segments connected by a plurality of points, some of the plurality of segments extending in a first direction and remaining ones of the plurality of segments extending in a second direction perpendicular to the first direction, wherein the contour of the final polygon includes one or more sections that extend in a third direction different from the first direction and the second direction.

Any of the above aspects, wherein a number of the plurality of vertices is fewer than a number of the plurality of points.

A system comprising:
processing circuitry configured to:
process an image of an object to generate a final polygon having a contour that represents the object; and
identify the object based on a library of polygons having contours generated in the same manner as the contour of the final polygon that represents the object.

Any of the above aspects, wherein processing the image of the object includes:
performing a first set of operations on a digitized version of the object to generate an intermediate polygon having a plurality of vertices; and
performing a second set of operations on the intermediate polygon based on traits of the plurality of vertices to generate the contour of the final polygon that represents the object.

Any of the above aspects, wherein the digitized version of the object comprises a plurality of segments connected by a plurality of points, some of the plurality of segments extending in a first direction and remaining ones of the plurality of segments extending in a second direction perpendicular to the first direction, wherein the contour of the final polygon includes one or more sections that extend in a third direction different from the first direction and the second direction.

Any of the above aspects, wherein a number of the plurality of vertices is fewer than a number of the plurality of points.

A system on a chip (SoC) including any one or more of the above aspects.

Any one or more of the features as described herein.

Any one or more of the features as substantially described herein.

Any one or more of the features in combination with any one or more of the other features described herein.

What is claimed is:

1. A device, comprising:
processing circuitry and memory to:
receive an input polygon, the input polygon being comprised of a plurality of segments connected by a plurality of points, some of the plurality of segments extending in a first direction and remaining ones of the plurality of segments extending in a second direction perpendicular to the first direction;
perform a first set of operations on the input polygon to generate an intermediate polygon having a plurality of vertices, a number of the plurality of vertices being fewer than a number of the plurality of points, wherein the first set of operations includes reducing the number of the plurality of points to the number of the plurality of vertices by combining sequential segments that extend in a same direction and removing points from the combined sequential segments; and
perform a second set of operations on the intermediate polygon based on traits of the plurality of vertices to generate a final polygon with a contour that represents the input polygon, the contour including at least one section that extends in a third direction different than the first direction and the second direction, wherein the second set of operations includes generating, based on the traits of the plurality of vertices, one or more turn intervals for the intermediate polygon and one or more flux intervals for the intermediate polygon, wherein the traits of the plurality vertices include an orientation of each vertex, the orientation of each vertex being based on a shortest angle between a segment that enters the vertex and a segment that exits the vertex, the orientation of each vertex indicating a concavity state of the vertex, and at least two sequential vertices that have a same orientation forms a turn interval, and at least two sequential vertices that have alternating orientations that are not a turn interval form a flux interval.

2. The device of claim 1, wherein the second set of operations includes forming a linear interval for each flux interval based on vertices within a respective flux interval, wherein each linear interval in combination with each turn interval forms a linear contour of the input polygon.

3. The device of claim 2, wherein the linear interval is formed for each flux interval based on a state machine.

4. The device of claim 3, wherein the state machine uses lengths of sequential segments within the flux interval as inputs.

5. The device of claim 4, wherein the state machine has at least six possible states, each state being used to detect one of four patterns of the inputs.

6. The device of claim 2, wherein the second set of operations includes generating the final polygon based on the linear contour of the input polygon.

7. The device of claim 2, wherein generating the final polygon based on the linear contour of the input polygon includes generating curve intervals from one or more sequential linear intervals of the linear contour of the input polygon.

8. The device of claim 1, wherein the final polygon contains a minimum amount of information that represents the input polygon.

9. The device of claim 1, wherein the processing circuitry renders the final polygon to a display.

10. The device of claim 1, wherein the processing circuitry comprises an Application Specific Integrated Circuit (ASIC) or a memory comprising instructions and a processor that executes the instructions.

11. The device of claim 1, wherein a turn is as a sequence of consecutive vertices that have a same orientation.

12. The device of claim 11, wherein a segment is a unit of length between two sequential vertices of a polygon in vertex form, and a flux or flux interval corresponds to a collection of segments that span two or more sequential vertices and a turn or turn interval corresponds to a collection of segments that spans four or more vertices.

13. A non-transitory computer-readable information storage media having stored thereon instructions, that when executed by one or more processor, perform a method comprising:
receiving an input polygon, the input polygon being comprised of a plurality of segments connected by a plurality of points, some of the plurality of segments extending in a first direction and remaining ones of the plurality of segments extending in a second direction perpendicular to the first direction;
performing a first set of operations on the input polygon to generate an intermediate polygon having a plurality of vertices, a number of the plurality of vertices being fewer than a number of the plurality of points, wherein the first set of operations includes reducing the number of the plurality of points to the number of the plurality of vertices by combining sequential segments that extend in a same direction and removing points from the combined sequential segments; and performing a second set of operations on the intermediate polygon based on traits of the plurality of vertices to generate a final polygon with a contour that represents the input polygon, the contour including at least one section that extends in a third direction different than the first direction and the second direction, wherein the second set of operations includes generating, based on the traits of the plurality of vertices, one or more turn intervals for the intermediate polygon and one or more flux intervals for the intermediate polygon, wherein the traits of the plurality vertices include an orientation of each vertex, the orientation of each vertex being based on a shortest angle between a segment that enters the vertex and a segment that exits the vertex, the orientation of each vertex indicating a concavity state of the vertex, and at least two sequential vertices that have a same orientation forms a turn interval, and at least two sequential vertices that have alternating orientations that are not a turn interval form a flux interval.

14. The media of claim 13, wherein the second set of operations includes forming a linear interval for each flux interval based on vertices within a respective flux interval, wherein each linear interval in combination with each turn interval forms a linear contour of the input polygon.

15. The media of claim 14, wherein the linear interval is formed for each flux interval based on a state machine.

16. The media of claim 15, wherein the state machine uses lengths of sequential segments within the flux interval as inputs.

17. The media of claim 16, wherein the state machine has at least six possible states, each state being used to detect one of four patterns of the inputs.

18. The media of claim 14, wherein the second set of operations includes generating the final polygon based on the linear contour of the input polygon.

19. The media of claim 14, wherein generating the final polygon based on the linear contour of the input polygon includes generating curve intervals from one or more sequential linear intervals of the linear contour of the input polygon.

20. The media of claim 13, wherein the final polygon contains a minimum amount of information that represents the input polygon.

21. The media of claim 13, wherein the processing circuitry renders the final polygon to a display.

22. The media of claim 13, wherein a turn is as a sequence of consecutive vertices that have a same orientation.

23. The media of claim 22, wherein a segment is a unit of length between two sequential vertices of a polygon in vertex form, and a flux or flux interval corresponds to a collection of segments that span two or more sequential vertices and a turn or turn interval corresponds to a collection of segments that spans four or more vertices.

* * * * *